United States Patent
Rönneke et al.

(10) Patent No.: US 11,405,854 B2
(45) Date of Patent: Aug. 2, 2022

(54) SERVICE GAP CONTROL FOR A WIRELESS DEVICE

(71) Applicant: Telefonaktiebolaget LM Ericsson (publ), Stockholm (SE)

(72) Inventors: Hans Bertil Rönneke, Kungsbacka (SE); Mikael Wass, Sätila (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 104 days.

(21) Appl. No.: 16/633,268

(22) PCT Filed: Jun. 20, 2018

(86) PCT No.: PCT/EP2018/066361
§ 371 (c)(1),
(2) Date: Jan. 23, 2020

(87) PCT Pub. No.: WO2019/029883
PCT Pub. Date: Feb. 14, 2019

(65) Prior Publication Data
US 2021/0136658 A1    May 6, 2021

Related U.S. Application Data

(60) Provisional application No. 62/543,572, filed on Aug. 10, 2017.

(51) Int. Cl.
*H04W 48/06* (2009.01)
*H04W 76/18* (2018.01)
(Continued)

(52) U.S. Cl.
CPC ............. *H04W 48/06* (2013.01); *H04W 8/02* (2013.01); *H04W 8/20* (2013.01); *H04W 76/18* (2018.02);
(Continued)

(58) Field of Classification Search
CPC ..... H04W 48/02; H04W 60/04; H04W 76/10; H04W 28/08; H04W 4/50
See application file for complete search history.

(56) References Cited

U.S. PATENT DOCUMENTS

| | | | |
|---|---|---|---|
| 2011/0199905 A1* | 8/2011 | Pinheiro | ................. H04W 4/50 370/235 |
| 2011/0201343 A1 | 8/2011 | Pinheiro et al. | |

(Continued)

FOREIGN PATENT DOCUMENTS

| | | | |
|---|---|---|---|
| CN | 102595638 B | * 12/2014 | ............ H04W 76/18 |
| JP | 2015002468 A | * 1/2015 | |

(Continued)

OTHER PUBLICATIONS

Author Unknown, "3rd Generation Partnership Project; Technical Specification Group Services and System Aspects; Service accessibility (Release 15)," 3GPP TS 22.011 V 15.1.0, Jun. 2017, 3GPP Organizational Partners, 32 pages.

(Continued)

*Primary Examiner* — Dung Hong
(74) *Attorney, Agent, or Firm* — Withrow & Terranova, PLLC

(57) ABSTRACT

Disclosed herein is a method of operation of a wireless device to provide service gap control in a wireless communication system, comprising: receiving a service gap parameter from a network entity in a mobility management sublayer non-access stratum message, the service gap parameter being indicative of a value for a service gap timer for the wireless device; and enforcing the service gap parameter at the wireless device in a non-access stratum layer. Also disclosed herein is a method of operation of a core network entity in a core network of a wireless communication system to provide service gap control, comprising: obtaining a service gap parameter for a wireless device, (Continued)

the service gap parameter being indicative of a value for a service gap timer for the wireless device; and sending the service gap parameter to the wireless device via a mobility management sublayer non-access stratum message.

26 Claims, 14 Drawing Sheets

(51) Int. Cl.
*H04W 76/27* (2018.01)
*H04W 8/02* (2009.01)
*H04W 8/20* (2009.01)
*H04W 76/28* (2018.01)
*H04W 76/50* (2018.01)
*H04W 84/04* (2009.01)

(52) U.S. Cl.
CPC ............ *H04W 76/27* (2018.02); *H04W 76/28* (2018.02); *H04W 76/50* (2018.02); *H04W 84/042* (2013.01)

(56) References Cited

U.S. PATENT DOCUMENTS

| | | | | |
|---|---|---|---|---|
| 2015/0223166 | A1* | 8/2015 | Keskitalo | H04W 52/0216 370/311 |
| 2016/0278096 | A1* | 9/2016 | Watfa | H04W 72/0486 |
| 2017/0086231 | A1* | 3/2017 | Kim | H04W 4/08 |
| 2017/0171909 | A1* | 6/2017 | Lau | H04L 67/306 |
| 2018/0098240 | A1* | 4/2018 | Griot | H04W 28/0247 |

FOREIGN PATENT DOCUMENTS

| | | |
|---|---|---|
| WO | 2016116174 A1 | 7/2016 |
| WO | 2018063800 A1 | 4/2018 |

OTHER PUBLICATIONS

Author Unknown, "3rd Generation Partnership Project; Technical Specification Group Core Network and Terminals; Numbering, addressing and identification (Release 15)," 3GPP TS 23.003 V 15.0.0, Jun. 2017, 3GPP Organizational Partners, 108 pages.

Author Unknown,"3rd Generation Partnership Project; Technical Specification Group Core Network and Terminals; Organization of subscriber data(Release 15)," 3GPP TS 23.008 V15.0.0, Jun. 2017, 3GPP Organizational Partners, 133 pages.

Author Unknown,"3rd Generation Partnership Project; Technical Specification Group Core Network and Terminals; Technical realization of the Short Message Service (SMS) (Release 14)," 3GPP TS 23.040 V 14.0.0, Mar. 2017, 3GPP Organizational Partners, 214 pages.

Author Unknown,"3rd Generation Partnership Project; Technical Specification Group Services and System Aspects; General Packet Radio Service (GPRS); Service description; Stage 2 (Release 14)," 3GPP TS 23.060 V 14.4.0, Jun. 2017, 3GPP Organizational Partners, 367 pages.

Author Unknown, "3rd Generation Partnership Project; Technical Specification Group Core Network and Terminals; Non-Access-Stratum (NAS) functions related to Mobile Station (MS) in idle mode (Release 15)," 3GPP TS 23.122 V 15.0.0, Jun. 2017, 3GPP Organization Partners, 53 pages.

Author Unknown, "3rd Generation Partnership Project; Technical Specification Group Services and System Aspects; Policy and charging control architecture (Release 15)," 3GPP TS 23.203 V 15.0.0, 3GPP Organizational Partners, 257 pages.

Author Unknown, "3rd Generation Partnership Project; Technical Specification Group Services and System Aspects; Architectural requirements(Release 15)," 3GPP TS 23.221 V 15.0.0, Sep. 2017, 3GPP Organizational Partners, 53 pages.

Author Unknown, "3rd Generation Partnership Project; Technical Specification Group Services and System Aspects; Network Sharing;Architecture and functional description (Release 15)," 3GPP TS 23.251 V 14.1.0, Sep. 2017, 3GPP Organizational Partners, 39 pages.

Author Unknown, "3rd Generation Partnership Project; Technical Specification Group Services and System Aspects; Functional stage 2 description of Location Services (LCS) (Release 14)," 3GPP TS 23.271 V14.2.0, Jun. 2017, 3GPP Organizational Partners, 183 pages.

Author Unknown, "3rd Generation Partnership Project; Technical Specification Group Services and System Aspects; Circuit Switched (CS) fallback in Evolved Packet System (EPS); Stage 2 (Release 15)," 3GPP TS 23.272 V15.0.0, Dec. 2017, 3GPP Organizational Partners, 103 pages.

Author Unknown, "3rd Generation Partnership Project; Technical Specification Group Services and System Aspects; General Packet Radio Service (GPRS) enhancements for Evolved Universal Terrestrial Radio Access Network (E-UTRAN) access (Release 15)," 3GPP TS 23.401 V15.0.0, Jun. 2017, 3GPP Organizational Partners, 386 pages.

Author Unknown, 3rd Generation Partnership Project;Technical Specification Group Services and System Aspects;Architecture enhancements for non-3GPP accesses (Release 15), 3GPP TS 23.402 V15.0.0, Jun. 2017, 3GPP Organizational Partners, 313 pages.

Author Unknown, "3rd Generation Partnership Project; Technical Specification Group Services and System Aspects; Architecture enhancements to facilitate communications with packet data networks and applications (Release 15)," 3GPP TS 23.682 V15.1.0, 3GPP Organizational Partners, Jun. 2017,118 pages.

Author Unknown, "3rd Generation Partnership Project; Technical Specification Group Core Network and Terminals; Non-Access-Stratum (NAS) protocol for Evolved Packet System (EPS); Stage 3 (Release 14)," 3GPP TS 24.301 V14.4.0, Jun. 2017, 3GPP Organizational Partners, 486 pages.

Author U Known, "3rd Generation Partnership Project; Technical Specification Group Core Network and Terminals; Non-Access Stratum (NAS) configuration Management Object (MO) (Release 14)," 3GPP TS 24.368 V 14.2.0, Jun. 2017, 3GPP Organizational Partners, 20 pages.

Author Unknown, "3rd Generation Partnership Project; Technical Specification Group Core Network and Terminals; Interworking between the Public Land Mobile Network (PLMN) supporting packet based services and Packet Data Networks (PDN)(Release 14)," 3GPP TS 29.061 V 14.4.0, Dec. 2017, 3GPP Organizational Partners, 171 pages.

Author Unknown, "3rd Generation Partnership Project; Technical Specification Group Core Network and Terminals; 3GPP Evolved Packet System (EPS); Evolved General Packet Radio Service (GPRS/Tunnelling Protocol tor Control plane (GTPv2-C); Stage 3 (Release 14)," 3GPP TS 29.274 V 14.4.0, Jun. 2017, 3GPP Organizational Partners, 369 pages.

Author Unknown, "3rd Generation Partnership Project; Technical Specification Group Services and System Aspects; Telecommunication management; Charging management; Packet Switched (PS) domain charging (Release 14)," 3GPP TS 32.251 V 14.3.0, Jun. 2017, 3GPP Organizational Partners, 186 pages.

Author Unknown, "3rd Generation Partnership Project; Technical Specification Group Services and System Aspects; 3GPP System Architecture Evolution (SAE); Security architecture (Release 15)," 3GPP TS 33.401 V 15.0.0, Jun. 2017, 3GPP Organizational Partners, 153 pages.

Author Unknown, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14)," 3GPP TS 36.300 V 14.3.0, Jun. 2017, 3GPP Organizational Partners, 331 pages.

Author Unknown, "3rd Generation Partnership Project; Technical Specification Group Radio Access Network; Evolved Universal Terrestrial Radio Access (E-UTRA); Radio Resource Control (RRC); Protocol specification (Release 14)," 3GPP TS 36.331 V 14.3.0, Jun. 2017, 3GPP Organizational Partners, 745 pages.

(56) References Cited

OTHER PUBLICATIONS

Author Unknown, "3rd Generation Partnership Project; Technical Specification Group Radio Access Network; Evolved Universal Terrestrial Radio Access Network (E-UTRAN); S1 Application Protocol (S1AP) (Release 14)," 3GPP TS 36.413 V 14.3.0, Jun. 2017, 3GPP Organizational Partners, 347 pages.
Ericsson et al., "C1-180757: Introduction of Service Gap Control; basics and feature negotiation," 3GPP TSG-CT WG1 Meeting #108, Jan. 22-26, 2018, Gothenburg, Sweden, 48 pages.
Ericsson, "C1-182290: Service Gap Control, attach without PDN connection," 3GPP TSG-CT WG1 Meeting #110, Apr. 16-20, 2018, Kunming, P.R. China, 14 pages.
Ericsson et al., "S2-171904: Update of APN rate control to support small data allowance plans," SA WG2 Meeting #120, March 37-31, 2017, Busan, South Korea, 51 pages.
Ericsson et al., "S2-174731: Proposed TEI15 discussion on support for small data allowance plans," TSG SA WG2 Meeting #122, Jun. 26-30, 2017, San José del Cabo, 2 pages.
Nokia et al., "S2-174300: Update of back-off timer to support Service Gap for small data," SA WG2 Meeting #122, Jun. 26-30, 2017, San Jose del Cabo, Mexico, 38 pages.
Examination Report for European Patent Application No. 18740107.0, dated Jun. 21, 2019, 4 pages.
Examination Report for European Patent Application No. 18740107.0, dated Dec. 6, 2019, 7 pages.
International Search Report and Written Opinion for International Application No. PCT/EP2018/066361, dated Aug. 24, 2018, 17 pages.
Official Action for Russian Patent Application No. 2020109477, dated Dec. 23, 2020, 15 pages.
Notice of Preliminary Rejection for Korean Patent Application No. 2020-7006151, dated Nov. 30, 2020, 10 pages.
Author Unknown, "3rd Generation Partnership Project; Technical Specification Group Services and System Aspects; Study on 3GPP PS Data Off; (Release 14)," 3GPP TS 23.702 V1.1.0, Oct. 2016, 3GPP Organizational Partners, 63 pages.
Examination Report for European Patent Application No. 18740107.0, dated May 14, 2020, 7 pages.
Ericsson, et al., "S2-174700: Proposed TEI15 discussion on support for small data allowance plans," TSG SA WG2 Meeting #122, Jun. 26-30, 2017, 2 pages.
Examination Report for European Patent Application No. 18740107.0, dated Jun. 23, 2021, 5 pages.
Grant of Patent for Korean Patent Application No. 10-2020-7006151, dated Aug. 13, 2021, 4 pages.

* cited by examiner

SERVICE GAP CONTROL FOR A WIRELESS DEVICE

This application is a 35 U.S.C. § 371 national phase filing of International Application No. PCT/EP2018/066361, filed Jun. 20, 2018, which claims the benefit of U.S. Provisional Application No. 62/543,572, filed Aug. 10, 2017, the disclosures of which are incorporated herein by reference in their entireties.

TECHNICAL FIELD

Embodiments presented herein relate to methods, wireless communication devices, computer programs, and a computer program product for providing a service gap control relating to a wireless device in a wireless communication system.

BACKGROUND

Service gap has been discussed for a while (see Ericsson et al., "S2-171904: Update of APN rate control to support small data allowance plans," SA WG2 Meeting #120, Mar. 27-31, 2017, Busan, South Korea; Nokia et al., "S2-174300: Update of back-off timer to support Service Gap for small data," SA WG2 Meeting #122, Jun. 26-30, 2017, San José del Cabo, Mexico; and Ericsson et al., "S2-174731: Proposed TEI15 discussion on support for small data allowance plans," TSG SA WG2 Meeting #122, Jun. 26-30, 2017, San José del Cabo, Mexico.

The intention is to put a limit on how often network resources are used for a User Equipment device (UE) or, more specifically, the frequency of Mobile Originated (MO) data connection requests such as e.g. MO User Plane (UP) data, MO Control Plane (CP) data (Data over Non Access Stratum (NAS) ("DoNAS")) and MO Short Message Service (SMS). This means the load from a large number of CIoT devices can be evened out and that the contribution to the network peak load from such CIoT devices can be reduced. That is, network resources are used in a more optimal way. Service gap would typically be used for "small data allowance plans" for CIoT subscriptions that are low revenue and where the applications are tolerant to potential service latency. With service gap control it is possible for an operator to add a large number of low revenue CIoT devices without having to worry about large network signaling capacity investments.

SUMMARY

Existing solutions in the above mentioned S2-174300 by Nokia et al. try to provide service gap control by passing a service gap parameter in the Session Management (SM) layer to the UE. The modem part of the UE would then just be a transparent transport of timer information to the application part of the UE. The application in the UE has no information at all about connected-idle transitions in the modem. As the agreed assumptions are in the above mentioned S2-174731 Ericsson et al., it is the idle-connected transitions that shall be a base for the service gap feature.

Embodiments of the present disclosure proposes to pass a service gap parameter in the Mobility Management (MM) sublayer in the NAS-layer to the UE, instead of as a parameter (e.g. a PCO parameter) within the SM sublayer as indicated in S2-174300. The service gap parameter is a value or an indication of a value for a service gap timer for the UE. For example, the service gap parameter may specify the minimum time between two consecutive MO data connection requests. It may e.g. be used for starting a Service gap timer in the UE if the parameter has been received in Attach Accept or TAU Accept. The service gap parameter may be received from HSS. For example, the service gap parameter may specify a Service Gap timer, which e.g. may indicate the expiration time for a started service gap timer. The modem part of the UE (the NAS-layer) would then be both the receiver and the user of the service gap timer information in the UE. Existing solutions in S2-174300 just passes the service gap parameter to the application layer (outside the NAS-layer), which application layer could even be implemented at a different chip than the NAS-layer in the UE. That is, where there is no knowledge of IDLE to CONNECTED transitions in the application layer.

Note that the NAS layer is distinct from the application layer conveying application layer messages and distinct from the access stratum layer conveying access related messages. The NAS is a functional layer in, e.g., the UMTS and LTE, protocol stacks between the core network and the UE. The NAS layer is responsible for managing the establishment of communication sessions and for maintaining continuous communication with the UE as it moves. The MM sublayer is a sublayer of the NAS layer that, e.g., has the functionality of providing mobility services to the UE (e.g., attach, detach, service request, etc.). As described herein, it is preferred that the MM sublayer, among other things, conveys NAS messages that contain the service gap parameter.

The MM sublayer in the UE has control of when attempts to move from IDLE to CONNECTED mode are done. This comes to the NAS-layer as requests from the application in the UE. The NAS-layer can then keep a service gap timer and, if it hasn't expired, the NAS-layer will not allow any transition to CONNECTED mode to enable user data transmission. That is, the service gap can be enforced in the UE.

Also, the control of transmission of CP data (DoNAS) can be done (i.e., establishment of Radio Resource Control (RRC) CONNECTION in the Access Stratum (AS) layer), since it is the NAS-layer that requests the establishment of RRC CONNECTION in the AS-layer. That is, service gap enforcement is possible.

The NAS-layer keeps the service gap timer and will restart the service gap timer when a CONNECTED to IDLE transition occurs. To control DoNAS data, the NAS-layer also restarts the service gap timer every time the RRC CONNECTION is released after CP data/DoNAS data has been sent.

The systems and methods disclosed herein provide a number of advantages. For instance, the service gap can be handled and controlled within the modem part of a UE (i.e., the NAS-layer/MM-sublayer of the UE). The modem part of the UE would then be both the receiver and the user of the service gap timer information. The service gap timer can then be controlled and started based on information known in that part of the UE, i.e. CONNECTED-TO-IDLE transitions, paging for Mobile Terminated (MT) events, and other NAS/MM signaling.

Service gap controlled within the NAS-layer/MM-sublayer makes it possible to allow normal MM NAS signaling such as Tracking Area Update (TAU), Global Unique Temporary Identifier (ID) (GUTI) reallocation, etc. when a service gap is maintained, i.e. while a service gap timer is running. The NAS layer/MM-sublayer is also responsible for network originated paging which makes it possible to make the service gap selective to only MO requests.

A simplified interface to the application part of the UE is possible, e.g. "notification-when-start-send-data" and "notification-when-stop-send-data" based on start and stop of the service gap timer.

For a UE that supports the service gap control feature, there is no need to use the MM back-off timer feature which may require additional signaling when requests are rejected. (NOTE: For non-supporting UEs, the MM back-off timer feature can still be applied).

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1A:
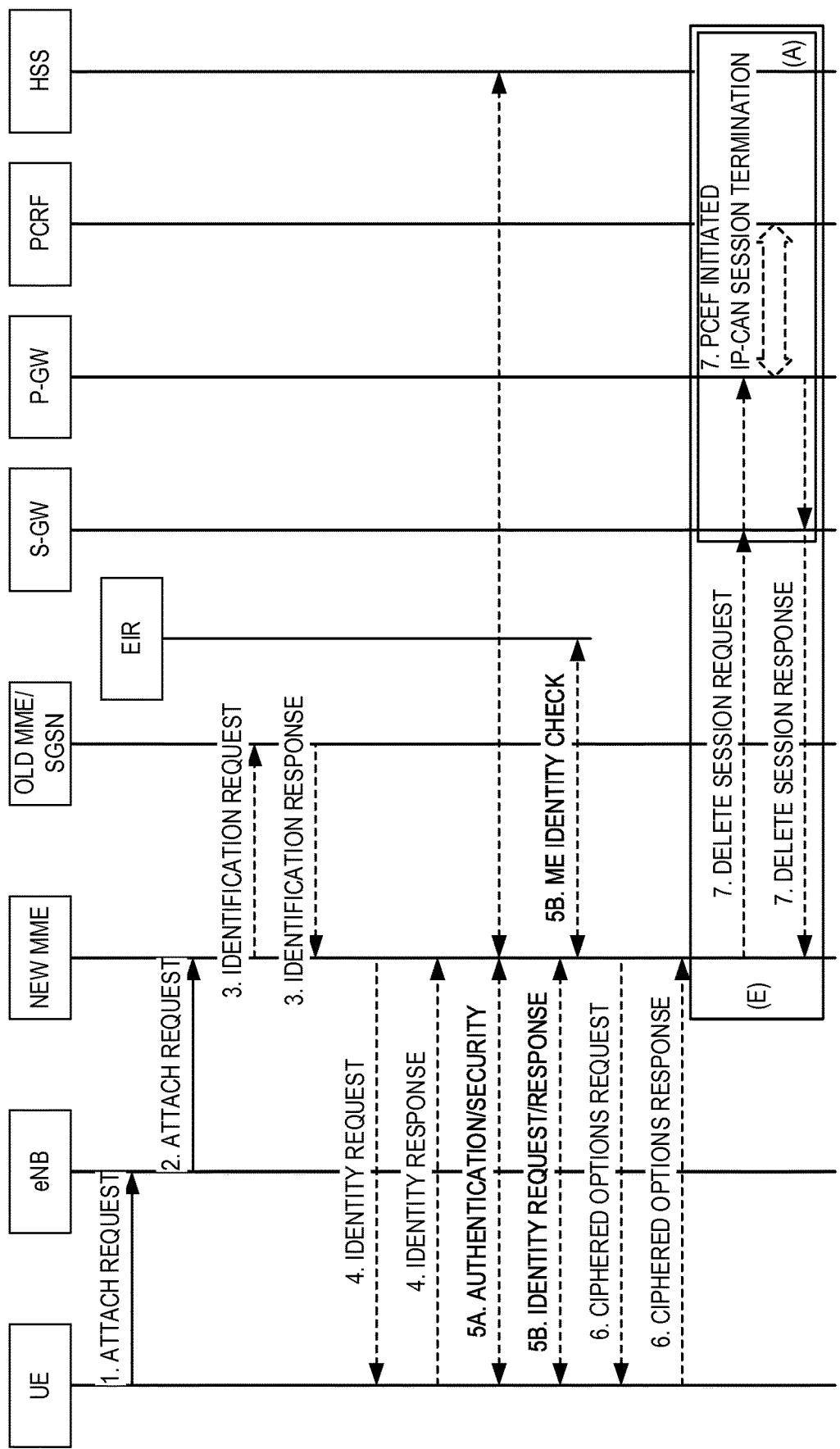
FIGS. 1A through 1D illustrate an attach procedure in accordance with some embodiments of the present disclosure.
Figure 1B:
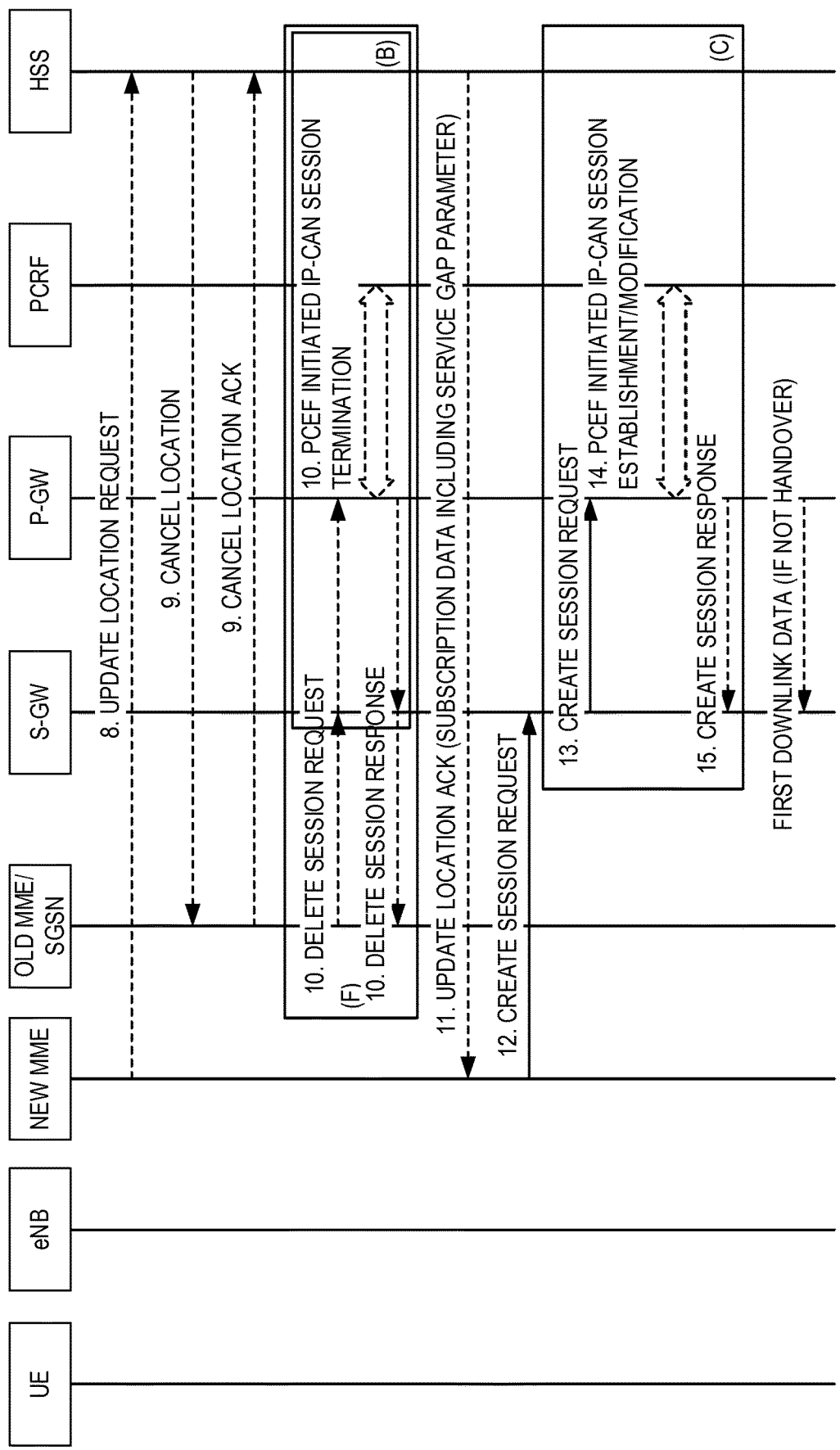
Figure 1C:
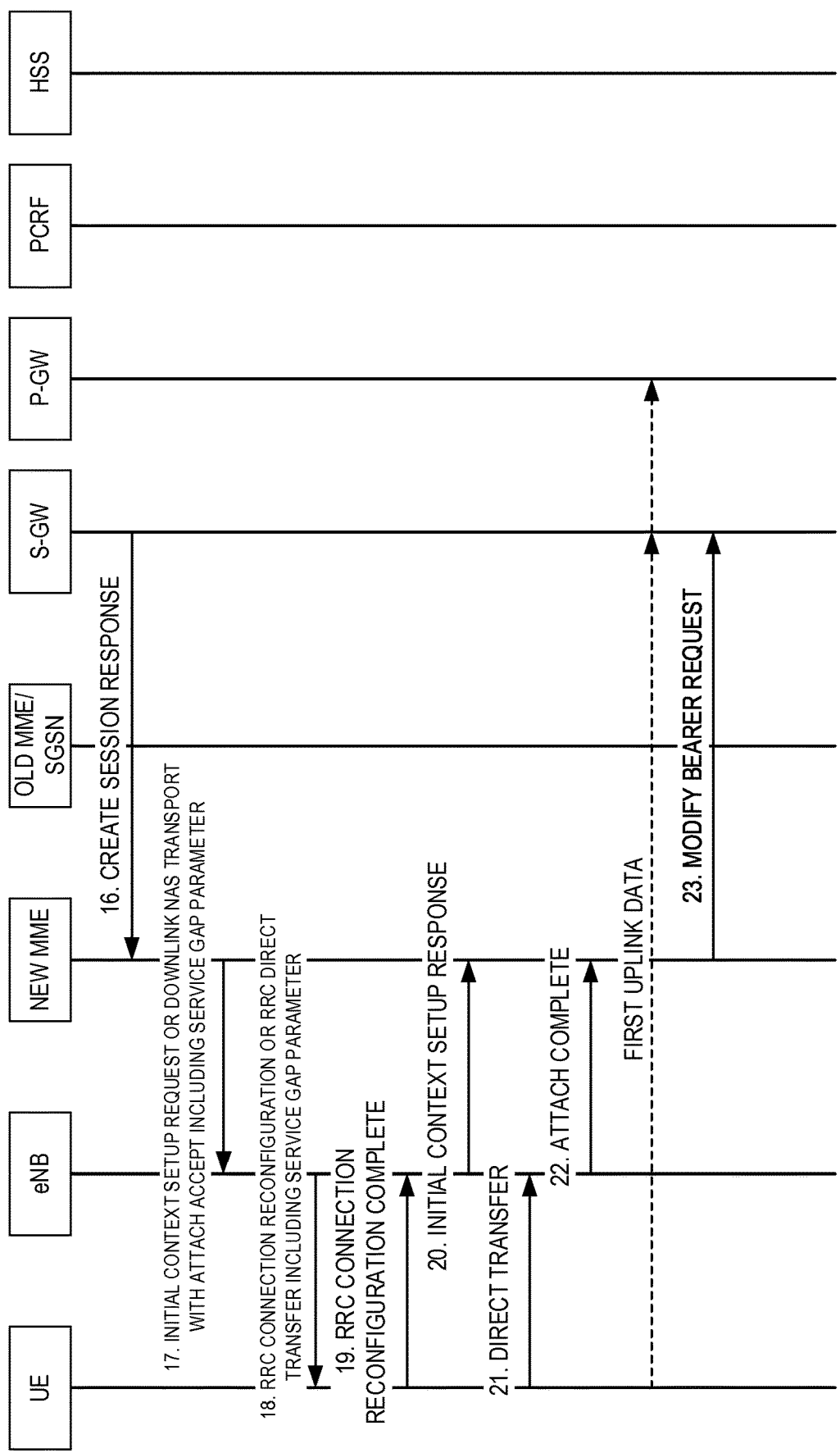
Figure 1D:
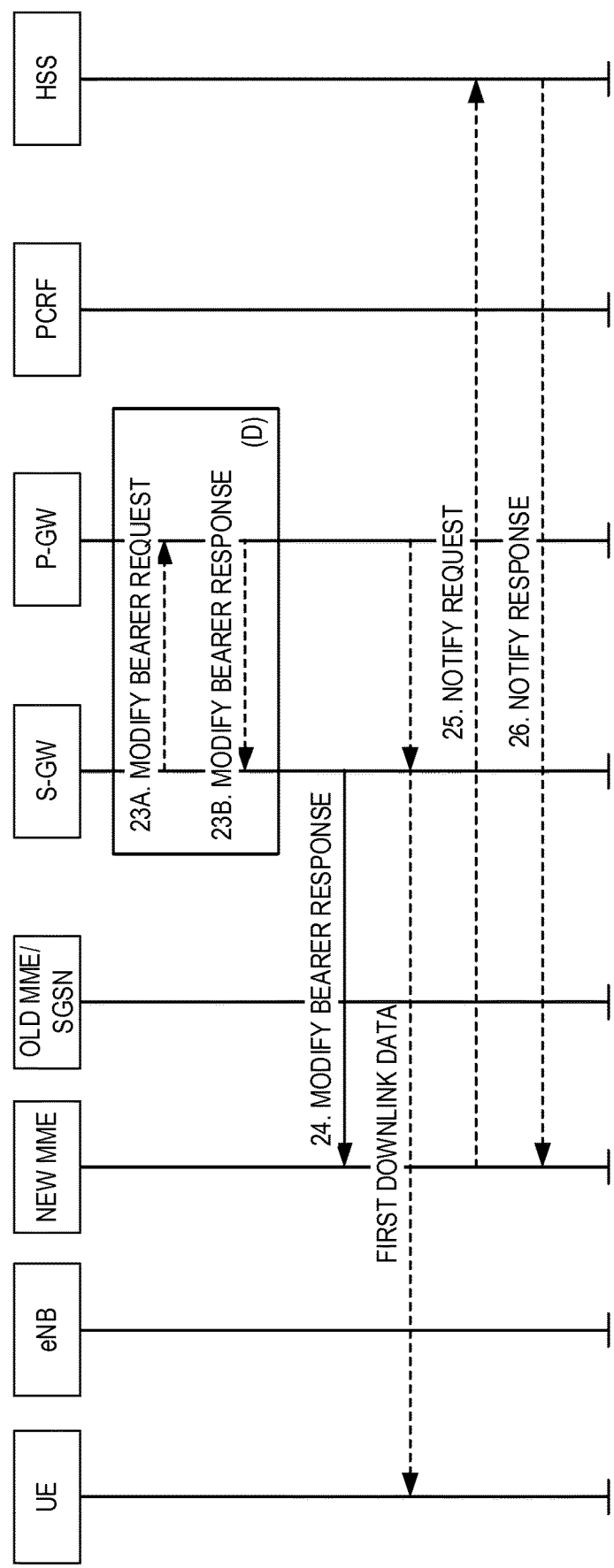

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" or "radio network node" is any node in a radio access network of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), a high-power or macro base station, a low-power base station (e.g., a micro base station, a pico base station, a Home eNB (HeNB), or the like), and a relay node.

Core Network Node: As used herein, a "core network node" is any type of node in a core network. Some examples of a core network node include, e.g., a MM Entity (MME), a Packet Data Network (PDN) Gateway (P-GW), a Service Capability Exposure Function (SCEF), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a UE in a 3GPP network, a MTC device, and a CIoT device.

Network Node: As used herein, a "network node" is any node that is either part of the radio access network or the core network of a cellular communications network/system.

Network Function: As used herein, a "network function" is any network function that is either part of the radio access network or the core network of a cellular communications network/system.

Network Entity: As used herein may either be a network node or a network function, e.g. a core network node or a core network function.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell;" however, particularly with respect to 5G NR concepts, beams may be used instead of cells and, as such, it is important to note that the concepts described herein are equally applicable to both cells and beams.

Service gap control is a feature primarily intended for CIoT devices to control that a minimum time elapses after MO user data has been communicated with a UE (i.e., MO UP data, MO CP data, or MO SMS). The intention is to put a limit on how often network resources are used for a UE. This means the load from a large number of CIoT devices can be evened out and that the contribution to the network peak load from such CIoT devices can be reduced. That is, network resources are used in a more optimal way. Service gap would typically be used for "small data allowance plans" for CIoT subscriptions that are low revenue and where the applications are tolerant to potential service latency.

Service gap is, in some embodiments, a subscription parameter. The service gap is enforced on a per UE level (i.e., common for all PDN connections) in the UE and in the MME, or similar mobility management entity. A service gap parameter is passed in the MM sublayer and treated within the NAS layer in the UE and MME or similar, as described in detail below. The MME or similar passes the service gap parameter to the UE in the attach accept message and/or TAU accept message. In some embodiments, the MME or similar passes the service gap parameter to the UE in the attach accept message and/or TAU accept message for UE that has indicated in the UE network capabilities that it supports the service gap feature.

Service gap applies to idle mode, i.e. it requires the UE to stay a minimum time in ECM-IDLE mode. If not running, the service gap timer shall be started each time a UE moves from ECM-CONNECTED to ECM-IDLE. The only exceptions are when the connection was initiated after a paging of an MT event, or after MO TAU signaling without any active flag set (i.e., active flag or signaling active flag), which shall not trigger start of a new service gap interval. In other words, as discussed above, the MME or similar passes the service gap parameter (e.g., the value for the service gap timer) to the UE, and the UE uses the service gap parameter in the NAS layer/MM sublayer. ECM-IDLE to ECM-CON- NECTED states and transitions, paging, and TAU are all part of the NAS layer/MM sublayer.

As an alternative embodiment, the MME or similar may be an Access and MM Function (AMF) in a 5G core network.

As an alternative embodiment, the decision to reset and start the service gap timer may be based on the reason used to establish the signaling connection, i.e. the RRC establishment cause, which indicates whether connection establishment is requested for MO signaling or MO data.

Detach shall be allowed at any time. When detach is done in ECM-CONNECTED (part of the NAS layer/MM sublayer), the service gap timer shall be started at the detach. Exceptions are when the connection was initiated after a paging of an MT event, or after MO TAU signaling without any active flag set (i.e., active flag or signaling active flag), which shall not trigger start of a new service gap interval. Detach at ECM-IDLE does not affect the service gap timer.

The UE shall enforce the service gap by not allowing MO UP data, MO CP data, and MO SMS connection requests and attach requests when a service gap timer is running (in the NAS layer/MM sublayer in the UE). In some embodiments, the application in the UE shall be informed by the NAS layer when data can be sent, i.e. notified when the service gap timer is started and stopped. Details are left for implementation (see Third Generation Partnership Project (3GPP) Technical Specification (TS) 24.301).

The MME or similar should enforce the service gap by rejecting MO UP data, MO CP data, and MO SMS connection requests and attach requests when a service gap timer is running (in the NAS layer/MM sublayer in the MME). In some embodiments, when rejecting MO data connection requests, the MME or similar shall include a MM back-off timer corresponding to the time left of the current service gap. In other words, in some embodiments, in addition to what the UE does, the MME will also send a MM back-off timer when the service gap timer is running if MO data connection requests are received in the MME. NOTE: For a well-behaving and supporting UE, this should not happen. But for a non-supporting or misbehaving UE this can happen.

In an alternative embodiment, the back-off timer may be a new MO data back-off timer. Such a back-off timer would have effect on (i.e., stop) MO UP data, MO CP data, and MO SMS. The MO data back-off timer would not affect other NAS signaling such as periodic or mobility TAUs (without active flag and without signaling active flag—since active flags may indicate that data will be transmitted). One exception is that the MO data back-off timer would affect (i.e., stop) attach requests after detach or power cycling (power cycling in the UE may be experienced in the MME or similar as a new attach request for a UE that is already registered as attached in the network). The advantage with this new MO data back-off timer compared to a prior art MM back-off timer is that it would allow MM to continue to work when the back-off timer is running. (The drawback is that it would require UEs to be supporting, i.e. not possible to use for all UEs.)

When the MME or similar starts the service gap timer, the MME shall preferably use a value that is a few seconds shorter than the service gap parameter received from the Home Subscriber Service (HSS) in the subscription information (i.e., used by the UE). This ensures that the MME doesn't reject any UE requests just before the service gap timer expires, e.g., because of slightly unsynchronized UE and MME timers.

Additional preferred aspects of service gap:
Service gap applies in roaming and non-roaming cases.
Service gap applies to MO data (i.e., MO CP data, MO UP data, and MO SMS).
When the service gap timer is running and the UE receives paging, the UE should respond as normal.
Service gap control applies to low priority (delayTolerant), normal traffic, and exception reporting (for NB-IoT).
   NOTE: The service gap should not be used for subscriptions with applications sensitive to service latency, e.g., when exception reporting is used or UEs using emergency services.
Service gap control should be effective for devices performing detach/reattach or full power cycling. That is, a running service gap timer in the UE and the MME should survive the detach or power cycling.
TAU with active flag or signaling active flag is not allowed when a service gap timer is running.
Attach during a surviving running service gap timer is not allowed. The service gap at Public Land Mobile Network (PLMN) selection:
   a) Reattach to the same PLMN: The service gap timer survives and controls the reattach.
   b) Attach or TAU to a different PLMN with the same Universal Subscriber Identity Module (USIM): The service gap timer survives and controls the attach/TAU to the new PLMN.
   c) USIM swap: The service gap timer is stopped and the service gap is reset.
Multiple uplink packets and downlink packets are allowed during one RRC connection for UE operating within its Access Point Name (APN) rate control limits.
The following procedures are considered "MO data connection requests" and are subject to the service gap control:
Evolved Universal Terrestrial Radio Access Network (E-UTRAN) initial attach, see 3GPP TS 23.401 V15.0.0, clause 5.3.2.1;
TAU procedures, see clauses under 3GPP TS 23.401 V15.0.0, clause 5.3.3;
UE triggered service request, see 3GPP TS 23.401 V15.0.0, clause 5.3.4.1;
S1-AP UE context resume request, see 3GPP TS 23.401 V15.0.0, clause 5.3.5A;
S1-AP initial UE message with a NAS data Protocol Data Unit (PDU), see 3GPP TS 23.401 V15.0.0, clause 5.3.4B.2;
MO Non-Internet Protocol Data Delivery (NIDD) procedure, see 3GPP TS 23.682, clause 5.13.4;
Short message MO, see 3GPP TS 23.040, clause 10.2.

Attach Procedure

E-UTRAN Initial Attach

As illustrated in FIGS. 1A-1D, a UE needs to register with the network to receive services that require registration. This registration is described as network attachment. The always-on Internet Protocol (IP) connectivity for UE/users of the Evolved Packet System (EPS) may be enabled by establishing a default EPS bearer during network attachment. The Policy and Charging Control (PCC) rules applied to the default EPS bearer may be predefined in the P-GW and are activated in the attachment by the P-GW itself. The attach procedure may trigger one or multiple dedicated bearer establishment procedures to establish dedicated EPS bearer(s) for that UE. During the attach procedure, the UE may request an IP address allocation. Terminals utilizing only Internet Engineering Task Force (IETF) based mechanisms for IP address allocation are also supported.

During the initial attach procedure the Mobile Equipment (ME) identity is obtained from the UE. The MME operator may check the ME identity with an Equipment Identity Register (EIR). The MME passes the ME identity (International Mobile Equipment Identity Software Version (IMEISV)) to the HSS and to the P-GW.

During the initial attach procedure, if the MME supports Single Radio Voice Call Continuity (SRVCC) and if any of the conditions described in step 8 in FIGS. 1A through 1D are satisfied, the MME informs the HSS with the UE SRVCC capability, e.g., for further IP Multimedia Subsystem (IMS) registration.

The E-UTRAN initial attach procedure is used for emergency attach by UEs that need to perform emergency services but cannot gain normal services from the network. These UEs are in limited service state as defined in 3GPP TS 23.122. Also, UEs that had attached for normal services and do not have emergency bearers established and are camped on a cell in limited service state (e.g., restricted Tracking Area (TA) or not allowed Closed Subscriber Group (CSG)) shall initiate the attach procedures indicating that the attach is to receive emergency services. UEs that camp normally on a cell, i.e. UEs that are not in limited service state, should initiate normal initial attach when not already attached and shall initiate the UE requested PDN connectivity procedure to receive emergency EPS bearer services.

NOTE 1: A UE that is emergency attached performs the initial attach procedure before being able to obtain normal services.

In order to limit load on the network, only when performing an E-UTRAN attach with a new PLMN (i.e., not the registered PLMN or an equivalent PLMN (ePLMN) of the registered PLMN), a UE configured to perform attach with International Mobile Subscriber Identity (IMSI) at PLMN change (see 3GPP TS 24.368) shall identify itself by its IMSI instead of any stored temporary identifier.

This procedure is also used to establish the first PDN connection over E-UTRAN when the UE already has active PDN connections over a non-3GPP access network and wants to establish simultaneous PDN connections to different APNs over multiple accesses.

NOTE 2: For a Proxy Mobile IPv6 (PMIP)-based S5/S8, procedure steps (A), (B), and (C) are defined in 3GPP TS 23.402. Steps 7, 10, 13, 14, 15, and 23A/B concern General Packet Radio Service Tunneling Protocol (GTP) based S5/S8.

NOTE 3: The Serving Gateways (S-GWs) and P-GWs involved in steps 7 and/or 10 may be different to those in steps 13-15.

NOTE 4: The steps in (D) are executed only upon handover from non-3GPP access or if presence reporting area information is received from the MME.

NOTE 5: More detail on procedure steps (E) is defined in the procedure steps (B) in clause 5.3.8.3.

NOTE 6: More detail on procedure steps (F) is defined in the procedure steps (B) in clause 5.3.8.4.

FIGS. 1A-1D illustrate the attach procedure. The steps of the attach procedure illustrated in FIGS. 1A through 1D will now be described as disclosed in 3GPP TS 23.401 V15.0.0, with the addition that the service gap feature of the present disclosure has been included.

Step 1: A UE, camping on an E-UTRAN cell reads the related system information broadcast.

An E-UTRAN cell for a PLMN that supports CIoT enhancements shall broadcast:

For the NB-IoT case:
  Whether it can connect to an MME which supports EPS attach without PDN connectivity.

For the Wideband E-UTRAN (WB-E-UTRAN) case:
  Whether it supports CP CIoT EPS optimization and it can connect to an MME which supports CP CIoT EPS optimization.
  Whether it supports UP CIoT EPS optimization and it can connect to an MME which supports UP CIoT EPS optimization.
  Whether it can connect to an MME which supports EPS attach without PDN connectivity.

If the PLMN does not advertise support of EPS attach without PDN connectivity and the UE can only attach without PDN connectivity, then the UE shall not attach to the PLMN in this cell and shall proceed as specified in 3GPP TS 23.122.

In the case of WB-E-UTRAN, if the PLMN does not support CP CIoT EPS optimization, and the UE only supports CP CIoT EPS optimization and cannot otherwise attach, then the UE shall not proceed with the attach to the PLMN in this cell and shall proceed as specified in 3GPP TS 23.122.

In case a service gap timer is running in the UE (see clause 4.3.x below), then the UE shall not attach to this PLMN or any other PLMN as long as the timer is running. Note that "clause 4.3.x" is a reference to the still unnamed new clause that the Change Request introduces (see below). It will likely be named as clause 4.3.30 in the next version of 3GPP TS 23.401.

If the UE can proceed to attach, it initiates the attach procedure by the transmission, to the eNB, of an attach request (IMSI or old GUTI, old GUTI type, last visited TA Identity (TAI) (if available), UE core network capability, UE specific Discontinuous Reception (DRX) parameters, extended idle mode DRX parameters, attach type, Evolved Packet System Session Management (ESM) message container (request type, PDN type, protocol configuration options, ciphered options transfer flag, header compression configuration), Key Set Identifier Access Security Management Entity ($KSI_{ASME}$), NAS sequence number, NAS Medium Access Control (MAC), additional GUTI, Packet Temporary Mobile Subscriber Identity (P-TMSI) signature, voice domain preference and UE's usage setting, preferred network behavior, Mobile Station (MS) network capability, support for restriction of use of enhanced coverage) message together with RRC parameters indicating the selected network and the old Globally Unique MME Identifier (GUMMEI).

In the RRC connection establishment signaling associated with the attach request, the UE indicates its support of the CIoT EPS optimizations, relevant for MME selection.

If the UE identifies itself with the old GUTI, the UE shall set the old GUTI type to indicate whether the old GUTI is a native GUTI or is mapped from a P-TMSI and Routing Area Identification (RAI). The old GUTI may be derived from a P-TMSI and RAI. IMSI shall be included if the UE does not have a valid GUTI or a valid P-TMSI available, or if the UE is configured to perform attach with IMSI at PLMN change and is accessing a new PLMN. The UE stores the Temporary Identity (TIN) in detached state. If the UE's TIN indicates "GUTI" or "RAT-related TMSI" and the UE holds a valid GUTI, then the old GUTI indicates this valid GUTI. If the UE's TIN indicates "P-TMSI" and the UE holds a valid P-TMSI and related RAI then these two elements are indicated as the old GUTI. Mapping a P-TMSI and RAI to a GUTI is specified in 3GPP TS 23.003. If the UE holds a valid GUTI and the old GUTI indicates a GUTI mapped from a P-TMSI and RAI, then the UE indicates the GUTI as additional GUTI. If the old GUTI indicates a GUTI mapped from a P-TMSI and RAI and the UE has a valid P-TMSI signature associated to it, the P-TMSI signature shall be included. The UE sets the voice domain preference and UE's usage setting according to its configuration, as described in 3GPP TS 23.401 V15.0.0 clause 4.3.5.9.

Alternatively, when a UE only supports E-UTRAN, if the UE has a GUTI available and the UE is accessing the same PLMN (or ePLMN), then it identifies itself with the old GUTI and sets the old GUTI type to "native," otherwise the UE configuration determines whether the UE identifies itself with its IMSI or the old GUTI.

The UE includes the extended idle mode DRX parameters information element if the UE needs to enable extended idle mode DRX.

If available, the last visited TAI shall be included in order to help the MME produce a good list of TAIs for any subsequent attach accept message. Selected network indicates the PLMN that is selected for network sharing purposes. The RRC parameter "old GUMMEI" takes its value from the "old GUTI" contained in the attach request. UE network capability is described in UE capabilities, see 3GPP TS 23.401 V15.0.0 clause 5.11.

If the UE has valid security parameters, the attach request message shall be integrity protected by the NAS-MAC in order to allow validation of the UE by the MME. $KSI_{ASME}$, NAS sequence number, and NAS-MAC are included if the UE has valid EPS security parameters. NAS sequence number indicates the sequential number of the NAS message. If the UE does not have a valid EPS security association, then the attach request message is not integrity protected. In this case the security association is established in step 5A. The UE network capabilities also indicate the supported NAS and AS security algorithms.

PDN type indicates the requested IP version (IPv4, IPv4/IPv6, IPv6). For a UE that supports CIoT EPS optimizations, the PDN type may also be "non-1P" Protocol Configuration Options (PCOs) are used to transfer parameters between the UE and the P-GW, and are sent transparently through the MME and the S-GW. The PCOs may include the address allocation preference indicating that the UE prefers to obtain an IPv4 address only after the default bearer activation by means of Dynamic Host Configuration Protocol Version 4 (DHCPv4). If the UE intends to send PCOs which require ciphering (e.g., Password Authentication Protocol (PAP)/Challenge Handshake Authentication Protocol (CHAP) usernames and passwords) or send an APN, or both, the UE shall set the ciphered options transfer flag and send PCO or APN or both only after authentication and NAS security setup have been completed (see below).

NOTE 7: External network operators wanting to use PAP for authentication are warned that PAP is an obsolete protocol from a security point of view. CHAP provides stronger security than PAP.

The UE shall include in the PCO the 3GPP Packet Switched (PS) data off UE status, which indicates whether the user has activated or deactivated 3GPP PS data off.

If the UE has Universal Terrestrial Radio Access Network (UTRAN) or Global System for Mobile Communications Enhanced Data Rates for Global System for Mobile Communications Evolution Radio Access Network (GERAN) capabilities, it shall send the Network Request Support UE (NRSU) in the PCO to indicate the support of the network requested bearer control in UTRAN/GERAN. The UE sends the Extended Traffic Flow Template (TFT) Support UE (ETFTU) in the PCO to indicate the support of the extended TFT filter format. Request type is included in the ESM message container and indicates "handover" when the UE has already an activated P-GW/Home Agent (HA) due to mobility with non-3GPP accesses.

If a UE indicates support of CIoT optimizations in the RRC message, it may omit the ESM message container. If the ESM message container is omitted the MME shall not establish a PDN connection as part of the attach procedure. In this case steps 6, 12 to 16, and 23 to 26 are not executed. In addition, for the case of UEs attaching with CP CIoT EPS optimization with no UP establishment, steps 17 to 22 are replaced by S1-AP NAS transport and RRC direct transfer messages that just transport the NAS attach accept and NAS attach complete messages.

Attach type indicates whether it is an EPS attach or a combined EPS/IMSI attach or an emergency attach. Emergency attach shall not be indicated when the UE is using NB-IoT. When using C-IoT EPS optimizations, the UE may indicate EPS attach and request SMS by setting the "SMS transfer without combined attach" flag in the preferred network behavior Information Element (IE).

If a UE includes a preferred network behavior, this defines the network behavior the UE is expecting to be available in the network as defined in 3GPP TS 23.401 V15.0.0 clause 4.3.5.10.

If a UE indicated CP CIoT EPS optimization supported in preferred network behavior, and the UE included the ESM message container, and the PDN type was IPv4 or IPv6 or IPv4v6, and the UE supports header compression, it shall include the header compression configuration. The header compression configuration includes the information necessary for the Robust Header Compression (ROHC) channel setup. Optionally, the header compression configuration may include additional header compression context setup parameters if the UE already has the application traffic information, e.g. the target server IP address.

For an emergency attach, the UE shall set both the attach type and the request type to "emergency" and the IMSI shall be included if the UE does not have a valid GUTI or a valid P-TMSI available. The International Mobile Equipment Identity (IMEI) shall be included when the UE has no IMSI, no valid GUTI, and no valid P-TMSI.

Step 2: The eNB derives the MME address from the RRC parameters carrying the old GUMMEI, the indicated selected network, and the RAT (NB-IoT or WB-E-UTRAN). If that MME is not associated with the eNB or the old GUMMEI is not available, the eNB selects an MME as described in 3GPP TS 23.401 V15.0.0 clause 4.3.8.3 on "MME selection function." The eNB forwards the attach request message in a S1-MME control message (initial UE message) together with the selected network, CSG access mode, CSG ID, Local Gateway (L-GW) address, TAI+ Evolved Universal Terrestrial Radio Access Network Cell Global ID (ECGI) of the cell from where it received the message to the new MME. CSG ID is provided if the UE attaches via a CSG cell or hybrid cell. CSG access mode is provided if the UE attaches via a hybrid cell. If the CSG access mode is not provided but the CSG ID is provided, the MME shall consider the cell as a CSG cell. If the eNB has a collocated L-GW, it includes the L-GW address in the Initial UE message to the MME.

If the MME is not configured to support emergency attach, the MME shall reject any attach request that indicates attach type "emergency."

If the UE has included the preferred network behavior, and what the UE indicated it supports in preferred network behavior is incompatible with the network support, e.g. the UE indicated support only for CP CIoT EPS optimization and the MME only supports UP CIoT EPS optimization, the MME shall reject the attach request with an appropriate cause value (e.g., one that avoids retries on this PLMN).

To assist location services, the eNB indicates the UE's coverage level to the MME.

Step 3: If the UE identifies itself with GUTI and the MME has changed since detach, the new MME determines the type of the old node, i.e. MME or Serving General Packet Radio Service Support Node (SGSN), as specified in 3GPP TS 23.401 V15.0.0 clause 4.3.19, uses the GUTI received from the UE to derive the old MME/SGSN address, and sends an identification request (old GUTI, complete attach request message) to the old MME/SGSN to request the IMSI. If the request is sent to an old MME, the old MME first verifies the attach request message by NAS MAC and then responds with identification response (IMSI, MM context). If the request is sent to an old SGSN, the old SGSN first verifies the attach request message by the P-TMSI signature and then responds with identification response (MM context). If the UE is not known in the old MME/SGSN or if the integrity check or P-TMSI signature check for the attach request message fails, the old MME/SGSN responds with an appropriate error cause. The MM context contains security related information as well as other parameters (including IMSI) as described in 3GPP TS 23.401 V15.0.0 clause 5.7.2 (information storage for MME).

The additional GUTI in the attach request message allows the new MME to find any already existing UE context stored in the new MME when the old GUTI indicates a GUTI mapped from a P-TMSI and RAI.

For an emergency attach if the UE identifies itself with a temporary identity that is not known to the MME the MME immediately requests the IMSI from the UE. If the UE identifies itself with IMEI, the IMSI request shall be skipped.

NOTE 8: A SGSN always responds with the Universal Mobile Telecommunications System (UMTS) security parameters and the MME may store it for later use.

Step 4: If the UE is unknown in both the old MME/SGSN and new MME, the new MME sends an identity request to the UE to request the IMSI. The UE responds with identity response (IMSI).

Step 5A: If no UE context for the UE exists anywhere in the network, if the attach request (sent in step 1) was not integrity protected, or if the check of the integrity failed, then authentication and NAS security setup to activate integrity protection and NAS ciphering are mandatory. Otherwise it is optional. If NAS security algorithm is to be changed, the NAS security setup is performed in this step. The authentication and NAS security setup functions are defined in 3GPP TS 23.401 V15.0.0 clause 5.3.10 on "security function."

If the MME is configured to support emergency attach for unauthenticated IMSIs and the UE indicated attach type "emergency" the MME skips the authentication and security setup or the MME accepts that the authentication may fail and continues the attach procedure.

After step 5A, all NAS messages shall be protected by the NAS security functions (integrity and ciphering) indicated by the MME unless the UE is emergency attached and not successfully authenticated.

Step 5B: The ME identity (IMEISV) shall be retrieved from the UE. The ME identity shall be transferred encrypted unless the UE performs emergency attach and cannot be authenticated.

For an emergency attach, the UE may have included the IMEI in the emergency attach. If so, the ME Identity retrieval is skipped.

In order to minimize signaling delays, the retrieval of the ME identity may be combined with NAS security setup in step 5A. The MME may send the ME identity check request (ME identity, IMSI) to the EIR. The EIR shall respond with ME identity check Acknowledgement (ACK) (result). Dependent upon the result, the MME decides whether to continue with this attach procedure or to reject the UE.

For an emergency attach, the IMEI check to the EIR may be performed. If the IMEI is blocked, operator policies determine whether the emergency attach procedure continues or is stopped.

Step 6: If the UE has set the ciphered options transfer flag in the attach request message, the ciphered options, i.e. PCO or APN or both shall now be retrieved from the UE.

In order to handle situations where the UE may have subscriptions to multiple PDNs, if the protocol configuration options contains user credentials (e.g., user name/password within PAP or CHAP parameters) then the UE should also send the APN to the MME.

Step 7: If there are active bearer contexts in the new MME for this particular UE (i.e., the UE re-attaches to the same MME without having properly detached before), the new MME deletes these bearer contexts by sending delete session request (Linked Bearer ID (LBI)) messages to the gateways involved. The gateways acknowledge with delete session response (cause) message. If a Policy and Charging Rules Function (PCRF) is deployed, the P-GW employs an IP Connectivity Access Network (IP-CAN) session termination procedure to indicate that resources have been released.

Step 8: If there is a valid subscription context for the UE in the MME with a service gap timer running, the MME rejects the attach request from the UE with an appropriate cause and with a MM back-off timer set to the remaining service gap time.

If the MME has changed since the last detach, or if there is no valid subscription context for the UE in the MME, or if the UE provides an IMSI or the UE provides an old GUTI which doesn't refer to a valid context in the MME, or for some network sharing scenario (e.g., Gateway Core Network (GWCN)) if the PLMN-ID of the TAI supplied by the eNB is different from that of the GUTI in the UE's context, the MME sends an update location request (MME identity, IMSI, ME identity (IMEISV), MME capabilities, Update-Location-Request (ULR) flags, homogeneous support of IMS voice over PS sessions, UE SRVCC capability, equivalent PLMN list) message to the HSS. The MME capabilities indicate the MME's support for regional access restrictions functionality. ULR flags indicate "initial-attach-indicator" as this is an attach procedure. The inclusion of the equivalent PLMN list indicates that the MME supports the inter-PLMN handover to a CSG cell in an equivalent PLMN using the subscription information of the target PLMN. The "homogenous support of IMS voice over PS sessions" indication (see 3GPP TS 23.401 V15.0.0 clause 4.3.5.8A) shall not be included unless the MME has completed its evaluation of the support of "IMS voice over PS session" as specified in 3GPP TS 23.401 V15.0.0 clause 4.3.5.8.

NOTE 9: At this step, the MME may not have all the information needed to determine the setting of the IMS voice over PS session supported indication for this UE (see 3GPP TS 23.401 V15.0.0 clause 4.3.5.8). Hence the MME can send the "homogenous support of IMS voice over PS sessions" later on in this procedure.

If the UE performs initial or handover attach in a Visited PLMN (VPLMN) supporting autonomous CSG roaming and the Home PLMN (HPLMN) has enabled autonomous CSG roaming in the VPLMN (via service level agreement) and the MME needs to retrieve the CSG subscription information of the UE from the Closed Subscriber Group Subscriber Server (CSS), the MME initiates the update CSG location procedure with CSS as described in 3GPP TS 23.401 V15.0.0 clause 5.3.12.

If the MME determines that only the UE SRVCC capability has changed, the MME sends a notify request to the HSS to inform about the changed UE SRVCC capability.

For an emergency attach in which the UE was not successfully authenticated, the MME shall not send an update location request to the HSS.

Step 9: The HSS sends cancel location (IMSI, cancellation type) to the old MME. The old MME acknowledges with cancel location ACK (IMSI) and removes the MM and bearer contexts. If the ULR flags indicate "initial-attach-indicator" and the HSS has the SGSN registration, then the HSS sends cancel location (IMSI, cancellation type) to the old SGSN. The cancellation type indicates the old MME/SGSN to release the old S-GW resource.

Step 10: If there are active bearer contexts in the old MME/SGSN for this particular UE, the old MME/SGSN deletes these bearer contexts by sending delete session request (LBI) messages to the gateways involved. The gateways return delete session response (cause) message to the old MME/SGSN. If a PCRF is deployed, the P-GW employs an IP-CAN session termination procedure as defined in 3GPP TS 23.203 to indicate that resources have been released.

Step 11: The HSS acknowledges the update location message by sending an update location ACK (IMSI, subscription data) message to the new MME. The subscription data contain one or more PDN subscription contexts. Each PDN subscription context contains an "EPS subscribed Quality of Service (QoS) profile" and the subscribed APN Aggregate Maximum Bit Rate (AMBR) (see 3GPP TS 23.401 V15.0.0 clause 4.7.3) and the Wireless Local Area Network (WLAN) offloadability indication (see 3GPP TS 23.401 V15.0.0 clause 4.3.23). The new MME validates the UE's presence in the (new) TA. If due to regional subscription restrictions or access restrictions (e.g., CSG restrictions) the UE is not allowed to attach in the TA or due to subscription checking fails for other reasons, the new MME rejects the attach request with an appropriate cause. If all checks are successful then the new MME constructs a context for the UE. If the APN provided by the UE is not allowed by subscription, or the update location is rejected by the HSS, the new MME rejects the attach request from the UE with an appropriate cause.

The subscription data may contain CSG subscription information for the registered PLMN and for the ePLMN list requested by the MME in step 8.

The subscription data may contain an enhanced coverage restricted parameter. If received from the HSS, the MME stores this enhanced coverage restricted parameter in the MME MM context.

The subscription data may contain a service gap parameter. If received from the HSS, the MME stores this service gap parameter in the MME MM context and passes it to the UE in the attach accept message.

If the UE provided APN is authorized for Local IP Access (LIPA) according to the user subscription, the MME shall use the CSG subscription data to authorize the connection.

For an emergency attach the MME shall not check for access restrictions, regional restrictions, or subscription restrictions (e.g., CSG restrictions). For an emergency attach, the MME shall ignore any unsuccessful update location response from the HSS and continue with the attach procedure.

Step 12: If an ESM container was not included in the attach request, steps 12, 13, 14, 15, and 16 are skipped. If the attach type is not set to "emergency," and the ESM container was included in the attach request, and the UE has indicated support for attach without PDN connectivity, and the network supports attach without PDN connectivity, and the PDN connection restriction is set in the subscriber data, then the new MME shall not establish PDN connection, and steps 12, 13, 14, 15, and 16 are skipped.

For an emergency attach, the MME applies the parameters from MME emergency configuration data for the emergency bearer establishment performed in this step and any potentially stored IMSI related subscription data are ignored by the MME.

If the UE performs initial or handover attach via a CSG cell and there is no subscription for that CSG or the CSG subscription is expired, the MME shall reject the attach request with an appropriate cause. If the UE has this CSG ID and associated PLMN on its allowed CSG list, the UE shall remove the CSG ID and associated PLMN from the list when receiving this reject cause.

If a subscribed PDN address is allocated for the UE for this APN, the PDN subscription context contains the UE's IPv4 address and/or the IPv6 prefix and optionally the P-GW identity. If the PDN subscription context contains a subscribed IPv4 address and/or IPv6 prefix, the MME indicates it in the PDN address. For request type indicating "initial request," if the UE does not provide an APN, the MME shall use the P-GW corresponding to the default APN for default bearer activation. If the UE provides an APN, this APN shall be employed for default bearer activation. For request type indicating "handover," if the UE provides an APN, the MME shall use the P-GW corresponding to the provided APN for default bearer activation, If the UE does not provide an APN, and the subscription context from HSS contains a P-GW identity corresponding to the default APN, the MME shall use the P-GW corresponding to the default APN for default bearer activation. The case where the request type indicates "handover" and the UE does not provide an APN, and the subscription context from HSS does not contain a P-GW identity corresponding to the default APN constitutes an error case. If the request type indicates "initial request" and the selected PDN subscription context contains no P-GW identity the new MME selects a P-GW as described in 3GPP TS 23.401 V15.0.0 clause 4.3.8.1 on P-GW selection function (3GPP accesses). If the PDN subscription context contains a dynamically allocated P-GW identity and the request type does not indicate "handover," the MME may select a new P-GW as described in clause P-GW selection function, e.g. to allocate a P-GW that allows for more efficient routing.

For initial and handover emergency attach, the MME uses the P-GW selection function defined in 3GPP TS 23.401 V15.0.0 clause 4.3.12.4 to select a P-GW.

If the subscription context does not indicate that the APN is for a PDN connection to a SCEF, the new MME selects a S-GW as described in 3GPP TS 23.401 V15.0.0 clause 4.3.8.2 on S-GW selection function and allocates an EPS bearer identity for the default bearer associated with the UE. Then it sends a create session request (IMSI, Mobile Subscriber Integrated Services Digital Network (MSISDN), MME Tunnel Endpoint ID (TEID) for CP, P-GW address, PDN address, APN, RAT type, default EPS bearer QoS, PDN type, APN-AMBR, EPS bearer identity, PCOs, handover indication, ME identity (IMEISV), user location information (ECGI), UE time zone, user CSG information, MS information change reporting support indication, selection mode, charging characteristics, trace reference, trace type, trigger ID, Operations and Maintenance Centre (OMC) identity, maximum APN restriction, dual address bearer flag, the protocol type over S5/S8, serving network) message to the selected S-GW. If CP CIoT EPS optimization applies, then the MME shall also indicate S11-U tunneling of NAS user data and send its own S11-U IP address and MME downlink TEID for downlink data forwarding by the S-GW. User CSG information includes CSG ID, access mode, and CSG membership indication.

For PDN type "non-IP" when CP CIoT EPS optimizations are enabled for the UE, if APN subscription data indicates a SCEF connection needs to be used, then the MME allocates an EPS bearer identity for the default bearer associated with the UE and establishes a connection to the SCEF address indicated in subscription data as per 3GPP TS 23.682 and steps 12, 13, 14, 15, and 16 are not executed. The rest of the interactions with the UE apply as specified below.

If the MME determines the PDN connection shall only use the CP CIoT EPS optimization, the MME shall include a CP only PDN connection indicator in create session request.

If the request type indicates "emergency," maximum APN restriction control shall not be performed.

For emergency attached UEs, IMSI is included if available and if the IMSI cannot be authenticated then the IMSI shall be marked as unauthenticated.

The Radio Access Technology (RAT) type is provided in this message for the later PCC decision. The RAT type shall distinguish between NB-IoT and WB-E-UTRA types. The subscribed APN-AMBR for the APN is also provided in this message. The MSISDN is included if provided in the subscription data from the HSS. Handover indication is included if the request type indicates handover. Selection mode indicates whether a subscribed APN was selected, or a non-subscribed APN sent by the UE was selected. Charging characteristics indicates which kind of charging the bearer context is liable for. The MME may change the requested PDN type according to the subscription data for this APN as described in 3GPP TS 23.401 V15.0.0 clause 5.3.1.1. The MME shall set the dual address bearer flag when the PDN type is set to IPv4v6 and all SGSNs which the UE may be handed over to are Release 8 or above supporting dual addressing, which is determined based on node pre-configuration by the operator. The protocol type over S5/S8 is provided to the S-GW, which protocol should be used over S5/S8 interface.

The charging characteristics for the PS subscription and individually subscribed APNs as well as the way of handling charging characteristics and whether to send them or not to the P-GW is defined in 3GPP TS 32.251. The MME shall include trace reference, trace type, trigger ID, and OMC identity if S-GW and/or P-GW trace is activated. The MME shall copy trace reference, trace type, and OMC identity from the trace information received from the Home Location Register (HLR) or OMC.

The maximum APN restriction denotes the most stringent restriction as required by any already active bearer context. If there are no already active bearer contexts, this value is set to the least restrictive type (see clause 15.4 of 3GPP TS 23.060). If the P-GW receives the maximum APN restriction, then the P-GW shall check if the maximum APN restriction value does not conflict with the APN restriction value associated with this bearer context request. If there is no conflict the request shall be allowed, otherwise the request shall be rejected with sending an appropriate error cause to the UE.

If the MME requires the eNB to check whether the UE radio capabilities are compatible with the network configuration (e.g., whether the SRVCC or frequency support by the UE matches that of the network) to be able to set the IMS voice over PS session supported indication (see 3GPP TS 23.401 V15.0.0 clause 4.3.5.8), then the MME may send a UE radio capability match request to the eNB as defined in 3GPP TS 23.401 V15.0.0 clause 5.3.14.

Step 13: The S-GW creates a new entry in its EPS bearer table and sends a create session request (IMSI, MSISDN, APN, S-GW address for the UP, S-GW TEID of the UP, S-GW TEID of the CP, RAT type, default EPS bearer QoS, PDN type, PDN address, subscribed APN-AMBR, EPS bearer identity, PCOs, handover indication, ME identity, user location information (ECGI), UE time zone, user CSG information, MS information change reporting support indication, PDN charging pause support indication, selection mode, charging characteristics, trace reference, trace type, trigger ID, OMC identity, maximum APN restriction, dual address bearer flag, serving network) message to the P-GW indicated by the P-GW address received in the previous step. After this step, the S-GW buffers any downlink packets it may receive from the P-GW without sending a downlink data notification message to the MME until it receives the modify bearer request message in step 23 below. The MSISDN is included if received from the MME.

If the S-GW has received the CP only PDN connection indicator in step 12, the S-GW informs the P-GW this information in create session request. The S-GW and P-GW shall indicate the use of CP only on their Charging Data Records (CDRs).

P-GWs shall not perform any checks of maximum APN restriction if create default bearer request includes the emergency APN.

For emergency attached UEs, IMSI is included if available and if the IMSI cannot be authenticated then the IMSI shall be marked as unauthenticated.

In the case of handover attach, and if the P-GW detects that the 3GPP PS data off UE status has changed, the P-GW shall indicate this event to the charging system for offline and online charging.

Step 14: If dynamic PCC is deployed and the handover indication is not present, the P-GW performs an IP-CAN session establishment procedure as defined in 3GPP TS 23.203, and thereby obtains the default PCC rules for the UE. This may lead to the establishment of a number of dedicated bearers following the procedures defined in 3GPP TS 23.401 V15.0.0 clause 5.4.1 in association with the establishment of the default bearer, which is described in Annex F.

The IMSI, APN, UE IP address, user location information (ECGI), UE time zone, serving network, RAT type, APN-AMBR, default EPS bearer QoS, ETFTU (if ETFTU is not provided it means UE and/or the P-GW does not support the extended TFT filter format) are provided to the PCRF by the P-GW if received by the previous message. The user location information and UE time zone are used for location based charging. For emergency attached UEs which are unauthenticated, the P-GW provides the IMEI as the UE Identity instead of IMSI, to the PCRF. If the PCRF decides that the PDN connection may use the extended TFT filter format, it shall return the Extended Traffic Flow Template Support Network (ETFTN) indicator to the P-GW for inclusion in the protocol configuration options returned to the UE.

The PCRF may modify the APN-AMBR and the QoS parameters (Quality of Service Class ID (QCI) and ARP) associated with the default bearer in the response to the P-GW as defined in 3GPP TS 23.203.

If the PCC is configured to support emergency services and if dynamic PCC is deployed, the PCRF, based on the emergency APN, sets the ARP of the PCC rules to a value that is reserved for emergency services and the authorization of dynamic PCC rules as described in 3GPP TS 23.203. If dynamic PCC is not deployed, the P-GW uses the ARP of the default emergency EPS bearer for any potentially initiated dedicated emergency EPS bearer. The P-GW determines that emergency services are requested based on the emergency APN received in create session request message.

NOTE 10: While the P-GW/Policy and Charging Enforcement Function (PCEF) may be configured to activate predefined PCC rules for the default bearer, the interaction with the PCRF is still required to provide, e.g., the UE IP address information to the PCRF.

NOTE 11: If the IP address is not available when the P-GW performs the IP-CAN session establishment procedure with the PCRF, the P-GW initiates an IP-CAN session modification procedure to inform the PCRF about an allocated IP address as soon as the address is available. In this version of the specification, this is applicable only to IPv4 address allocation.

If dynamic PCC is deployed and the handover indication is present, the P-GW executes a PCEF initiated IP-CAN session modification procedure with the PCRF as specified in 3GPP TS 23.203 to report the new IP-CAN type. Depending on the active PCC rules, the establishment of dedicated bearers for the UE may be required. The establishment of those bearers shall take place in combination with the default bearer activation as described in Annex F. This procedure can continue without waiting for a PCRF response. If changes to the active PCC rules are required, the PCRF may provide them after the handover procedure is finished.

In both cases (handover indication is present or not), if dynamic PCC is not deployed, the P-GW may apply local QoS policy. This may lead to the establishment of a number of dedicated bearers for the UE following the procedures defined in 3GPP TS 23.401 V15.0.0 clause 5.4.1 in combination with the establishment of the default bearer, which is described in Annex F.

If the CSG information reporting triggers are received from the PCRF, the P-GW should set the CSG information reporting action IE accordingly.

The additional behavior of the P-GW for 3GPP PS data off is defined in 3GPP TS 23.203.

Step 15: The P-GW creates a new entry in its EPS bearer context table and generates a charging ID for the default bearer. The new entry allows the P-GW to route UP PDUs between the S-GW and the packet data network, and to start charging. The way the P-GW handles charging characteristics that it may have received is defined in 3GPP TS 32.251.

The P-GW returns a create session response (P-GW address for the UP, P-GW TEID of the UP, P-GW TEID of the CP, PDN type, PDN address, EPS bearer identity, EPS bearer QoS, PCOs, charging ID, prohibit payload compression, APN restriction, cause, MS information change reporting action (start) (if the P-GW decides to receive UE's location information during the session), CSG information reporting action (start) (if the P-GW decides to receive UE's user CSG information during the session), presence reporting area action (if the P-GW decides to receive notifications about a change of UE presence in presence reporting area), PDN charging pause enabled indication (if P-GW has chosen to enable the function), APN-AMBR, delay tolerant connection) message to the S-GW.

The P-GW takes into account the received PDN type, the dual address bearer flag, and the policies of operator when the P-GW selects the PDN type to be used as follows. If the received PDN type is IPv4v6 and both IPv4 and IPv6 addressing is possible in the PDN but the dual address bearer flag is not set, or only single IP version addressing for this APN is possible in the PDN, the P-GW selects a single IP version (either IPv4 or IPv6). If the received PDN type is IPv4 or IPv6 or "non IP," the P-GW uses the received PDN type if it is supported in the PDN, otherwise an appropriate error cause will be returned. For IPv4, IPv6, and IPv4v6, the P-GW allocates a PDN address according to the selected PDN type. If the P-GW has selected a PDN type different from the received PDN type, the P-GW indicates together with the PDN type IE a reason cause to the UE why the PDN type has been modified, as described in 3GPP TS 23.401 V15.0.0 clause 5.3.1.1. The P-GW shall either accept or reject (but not modify) the PDN type if the PDN type is set to "non-IP." PDN address may contain an IPv4 address for IPv4 and/or an IPv6 prefix and an interface ID, or be omitted for PDN type "non-IP." If the PDN has been configured by the operator so that the PDN addresses for the requested APN shall be allocated by usage of DHCPv4 only, or if the P-GW allows the UE to use DHCPv4 for address allocation according to the address allocation preference received from the UE, the PDN address shall be set to 0.0.0.0, indicating that the IPv4 PDN address shall be negotiated by the UE with DHCPv4 after completion of the default bearer activation procedure. For external PDN addressing for IPv6, the P-GW obtains the IPv6 prefix from the external PDN using either RADIUS or diameter client function. In the PDN address field of the create session response, the P-GW includes the interface ID and IPv6 prefix. The P-GW sends router advertisement to the UE after default bearer establishment with the IPv6 prefix information for all cases.

If the PDN address is contained in the create session request, the P-GW shall allocate the IPv4 address and/or IPv6 prefix contained in the PDN address to the UE. The IP address allocation details are described in 3GPP TS 23.401 V15.0.0 clause 5.3.1 on "IP address allocation." The P-GW derives the BCM based on the NRSU and operator policy. The P-GW derives whether the extended TFT filter format is to be used based on the ETFTU, ETFTN received from the PCRF, and operator policy. PCOs contain the Bearer Control Mode (BCM), ETFTN, as well as optional PDN parameters that the P-GW may transfer to the UE. These optional PDN parameters may be requested by the UE, or may be sent unsolicited by the P-GW. Protocol configuration options are sent transparently through the MME.

The P-GW includes a delay tolerant connection indication if the P-GW supports receiving a rejection cause from the S-GW indicating that the UE is temporarily not reachable due to power saving and holding mobile terminated procedures, until the P-GW receives a message indicating that the UE is available for end to end signaling.

When the handover indication is present, the P-GW does not yet send downlink packets to the S-GW; the downlink path is to be switched at step 23A.

If the P-GW is an L-GW, it does not forward downlink packets to the S-GW. The packets will only be forwarded to the HeNB at step 20 via the direct UP path.

Step 16: The S-GW returns a create session response (PDN type, PDN address, S-GW address for UP, S-GW TEID for S1-U UP, S-GW TEID for CP, EPS bearer identity, EPS bearer QoS, P-GW addresses and TEIDs (GTP-based S5/S8) or GRE keys (PMIP-based S5/S8) at the P-GW(s) for uplink traffic, PCOs, prohibit payload compression, APN restriction, cause, MS information change reporting action (start), presence reporting area action, CSG information reporting action (start), APN-AMBR, delay tolerant connection) message to the new MME. For CP CIoT EPS optimization, the S-GW address for S11-U UP and S-GW TEID are used by the MME to forward uplink data to the S-GW. If the 3GPP PS data off UE status was present in the create session request PCO and the P-GW supports 3GPP PS data off feature, the P-GW shall include the 3GPP PS data off support indication in the create session response PCO.

Step 17: If an APN restriction is received, then the MME shall store this value for the bearer context and the MME shall check this received value with the stored value for the maximum APN restriction to ensure there are no conflicts between values. If the bearer context is accepted, the MME shall determine a (new) value for the maximum APN restriction. If there is no previously stored value for maximum APN restriction, then the maximum APN restriction shall be set to the value of the received APN restriction. The MME shall not deactivate bearer(s) with emergency Allocation and Retention Priority (ARP), if present, to maintain valid APN restriction combination.

The P-GW shall ignore maximum APN restriction if the request includes the emergency APN.

If the MS information change reporting action (start) and/or the CSG information reporting action (start) are received for this bearer context, then the MME shall store this for the bearer context and the MME shall report to that P-GW via the S-GW whenever a UE's location and/or user CSG information change occurs that meets the P-GW request, as described in clause 15.1.1a of 3GPP TS 23.060. If presence reporting area action is received for this bearer context, the MME shall store this information for the bearer context and shall report to that P-GW via the S-GW whenever a change of UE presence in a presence reporting area is detected, as described in 3GPP TS 23.401 V15.0.0 clause 5.9.2.2.

The MME determines the UE AMBR to be used by the eNB based on the subscribed UE-AMBR and the APN-AMBR for the default APN, see 3GPP TS 23.401 V15.0.0 clause 4.7.3.

For emergency attach, the MME determines the UE-AMBR to be used by the eNB from the APN AMBR received from the S-GW.

If a new MME hasn't received, from step 12, voice support match indicator for the UE from the eNB then, based on implementation, the MME may set IMS voice over PS session supported indication and update it at a later stage.

The new MME sends an attach accept (GUTI, TAI list, session management request (APN, PDN type, PDN address, EPS bearer identity, PCOs, header compression configuration, CP only indicator), NAS sequence number, NAS-MAC, IMS voice over PS session supported indication, emergency service support indicator, Location Service (LCS) support indication, supported network behavior, service gap) message to the eNB. GUTI is included if the new MME allocates a new GUTI. PDN type and PDN address are omitted if the attach request (step 1) did not contain an ESM message container. The MME indicates the CIoT EPS optimizations it accepts in the supported network behavior information as defined in 3GPP TS 23.401 V15.0.0 clause 4.3.5.10. The service gap parameter is included if service gap is present in the subscription information (step 11) and the UE has indicated service gap capability in the UE network capability. This message is contained in an S1_MME control message initial context setup request, unless the MME has selected to use the CP CIoT EPS optimization, or, the UE did not include the ESM message container in the attach request (step 1), in which case an S1-AP downlink NAS transport message is used. The S1-AP initial context setup request message also includes the AS security context information for the UE, the handover restriction list, the EPS bearer QoS, the UE-AMBR, EPS bearer identity, as well as the TEID at the S-GW used for UP and the address of the S-GW for UP and whether UP CIoT EPS optimization is allowed for the UE. If the PDN type is set to "non-IP" the MME includes it in the S1-AP initial context setup request so that the eNB disables header compression. In addition, if the PDN connection is established for LIPA, the corresponding S1 initial context setup request message includes a correlation ID for enabling the direct UP path between the HeNB and the L-GW. If the PDN connection is established for Selected IP Traffic Offload (SIPTO) at the local network with L-GW function collocated with the (H)eNB, the corresponding S1-AP initial context setup request message includes a SIPTO correlation ID for enabling the direct UP path between the (H)eNB and the L-GW. LIPA and SIPTO do not apply to CP CIoT EPS optimization.

NOTE 12: In this release of the 3GPP specification the correlation ID and SIPTO correlation ID is set equal to the UP P-GW TEID (GTP-based S5) or GRE key (PMIP-based S5) that the MME has received in step 16.

If CP CIoT EPS optimization applies for an IP PDN connection, and the UE has sent in the attach request the header compression configuration, and the MME supports the header compression parameters, the MME shall include the header compression configuration in the PDN connectivity accept message. The MME also binds the uplink and downlink ROHC channels to support header compression feedback signaling. If the UE has included header compression context setup parameters in header compression configuration in the attach request, the MME may acknowledge the header compression context setup parameters. If the ROHC context is not established during the attach procedure for the PDN connection, before using the compressed format for sending the data, the UE and the MME need to establish the ROHC context with ROHC IR packet based on header compression configuration.

If the MME based on local policy determines the PDN connection shall only use the CP CIoT EPS optimization, the MME shall include a CP only indicator in the session management request. For PDN connections with an SCEF, the MME shall always include the CP only indicator. A UE receiving the CP only indicator, for a PDN connection shall only use the CP CIoT EPS optimization for this PDN connection.

If the ESM container was not included in the attach request in step 1, then the attach accept message shall not include PDN related parameters, and the downlink NAS transfer S1-AP message shall not include AS context related information but may include CSG related information.

If the attach type is not set to "emergency," and the ESM container was included in attach request in step 1, and the UE indicated support of attach without PDN connection in the attach request, and the MME supports attach without PDN connection, and PDN connection restriction is set in subscriber data, then the MME shall discard the ESM container in the attach request message, and shall not include PDN related parameters in the attach accept, but may include CSG related information.

In the attach accept message, the MME does not include the IPv6 prefix within the PDN address. The MME includes the EPS bearer QoS parameter QCI and APN-AMBR into the session management request. Furthermore, if the UE has UTRAN or GERAN capabilities and the network supports mobility to UTRAN or GERAN, the MME uses the EPS bearer QoS information to derive the corresponding Packet Data Protocol (PDP) context parameters QoS negotiated (R99 QoS profile), radio priority, packet flow ID and Transaction Identifier (TI) and includes them in the session management request. If the UE indicated in the UE network capability it does not support Base Station System (BSS) packet flow procedures, then the MME shall not include the packet flow ID. Handover restriction list is described in 3GPP TS 23.401 V15.0.0 clause 4.3.5.7 "mobility restrictions." The MME sets the IMS voice over PS session supported indication as described in 3GPP TS 23.401 V15.0.0 clause 4.3.5.8. LCS support indication indicates whether the network supports the Evolved Packet Core (EPC) MO Location Request (LR) and/or Circuit Switched (CS) MO-LR as described in 3GPP TS 23.271. The MME may include an indication whether the traffic of this PDN connection is allowed to be offloaded to WLAN, as described in 3GPP TS 23.401 V15.0.0 clause 4.3.23.

If the UE initiates the attach procedure at a hybrid cell, the MME shall check whether the CSG ID is contained in the CSG subscription and is not expired. The MME shall send an indication whether the UE is a CSG member to the Radio Access Network (RAN) along with the S1-MME control message. Based on this information, the RAN may perform differentiated treatment for CSG and non-CSG members.

If the MME or P-GW has changed the PDN type, an appropriate reason cause shall be returned to the UE as described in 3GPP TS 23.401 V15.0.0 clause 5.3.1.1. If the UE has indicated PDN type "non-IP," the MME and P-GW shall not change PDN type.

For an emergency attached UE, i.e. for UEs that have only emergency EPS bearers established, there is no AS security context information included in the S1 control messages and there is no NAS level security when the UE cannot be authenticated. The emergency service support indicator informs the UE that emergency bearer services are supported, i.e. the UE is allowed to request PDN connectivity for emergency services.

If the UE included extended idle mode DRX parameters information element, the MME includes extended idle mode DRX parameters information element if it decides to enable extended idle mode DRX.

If the UE included support for restriction of use of enhanced coverage, the MME sends enhanced coverage restricted parameter to the eNB in S1-AP initial context set-up request message. MME also sends enhanced coverage restricted parameter to the UE in the attach accept message.

Step 18: If the eNB received an S1-AP initial context setup request the eNB sends the RRC connection reconfiguration message including the EPS radio bearer identity to the UE, and the attach accept message or similar will be sent along to the UE. In some embodiments, the service gap parameter (c.f steps 11 and 17) is comprised by the RRC connection reconfiguration message and/or by the attach accept message.

If the eNB received an S1-AP downlink NAS transport message (e.g., containing the attach accept message), the eNB sends a RRC direct transfer message to the UE. In some embodiments, the service gap parameter (c.f steps 11 and 17) is comprised by the RRC direct transfer message.

The UE shall store the QoS negotiated, radio priority, packet flow ID and TI, which it received in the session management request, for use when accessing via GERAN or UTRAN. The APN is provided to the UE to notify it of the APN for which the activated default bearer is associated. For further details, see 3GPP TS 36.331. The UE may provide EPS bearer QoS parameters to the application handling the traffic flow(s). The application usage of the EPS bearer QoS is implementation dependent. The UE shall not reject the RRC connection reconfiguration on the basis of the EPS bearer QoS parameters contained in the session management request.

If the UE receives enhanced coverage restricted parameter in the attach accept message or similar, UE shall store this information and shall use the value of enhanced coverage restricted parameter to determine if enhanced coverage feature should be used or not. If the UE receives a service gap in the attach accept message or similar, the UE shall store this parameter and apply service gap control for MO data connection requests (see clause 4.3.x below).

If the attach procedure is initiated by manual CSG selection and occurs via a CSG cell, the UE upon receiving the attach accept shall check if the CSG ID and associated PLMN of the cell where the UE has sent the attach request message is contained in its allowed CSG list. If the CSG ID and associated PLMN are not in the UE's allowed CSG list, the UE shall add the CSG ID and associated PLMN to its allowed CSG list. Manual CSG selection is not supported when an emergency service has been initiated.

NOTE 13: If the UE receives an attach accept message via a hybrid cell, the UE does not add the corresponding CSG ID and associated PLMN to its allowed CSG list. Adding a CSG ID and associated PLMN to the UE's local allowed CSG list for a hybrid cell is performed only by Over The Air (OTA) or Open Mobile Alliance (OMA) Device Management (DM) procedures.

When receiving the attach accept message, the UE shall set its TIN to "GUTI" as no ISR activated is indicated.

If the UE receives an IPv4 address set to 0.0.0.0, it may negotiate the IPv4 address with DHCPv4 as specified in 3GPP TS 29.061. If the UE receives an IPv6 interface ID, it may wait for the router advertisement from the network with the IPv6 prefix information or it may send a router solicitation if necessary.

NOTE 14: The IP address allocation details are described in 3GPP TS 23.401 V15.0.0 clause 5.3.1 on "IP address allocation."

If CP CIoT EPS optimization applies or the UE has not included the ESM message container in the attach request in step 1, then the steps 19 and 20 are not executed.

Step 19: The UE sends the RRC connection reconfiguration complete message to the eNB. For further details, see 3GPP TS 36.331.

Step 20: The eNB sends the initial context response message to the new MME. This initial context response message includes the TEID of the eNB and the address of the eNB used for downlink traffic on the S1_U reference point.

The MME shall be prepared to receive this message either before or after the attach complete message (sent in step 22).

If the correlation ID or SIPTO correlation ID was included in the initial context setup request message, the eNB shall use the included information to establish direct UP path with the L-GW and forward uplink data for local IP access or SIPTO at the local network with L-GW function collocated with the (H)eNB accordingly.

Step 21: The UE sends a direct transfer message to the eNB, which includes the attach complete (EPS bearer identity, NAS sequence number, NAS-MAC) message. If the UE omitted the ESM message container from the attach request message in step 1, then the EPS bearer identity is omitted from the attach complete message.

Step 22: The eNB forwards the attach complete message to the new MME in an uplink NAS transport message.

If the ESM message container was included in step 1, after the attach accept message and once the UE has obtained (if applicable to the PDN type) a PDN address, the UE can then send uplink packets towards the eNB which will then be tunneled to the S-GW and P-GW. If CP CIoT EPS optimizations apply, uplink data is sent as specified in 3GPP TS 23.401 V15.0.0 clause 5.3.4B. If the UE requested for a dual address PDN type (IPv4v6) to a given APN and was granted a single address PDN type (IPv4 or IPv6) by the network with a reason cause indicating that only single IP version per PDN connection is allowed sent together with the PDN type, the UE should request for the activation of a parallel PDN connection to the same APN with a single address PDN type (IPv4 or IPv6) other than the one already activated. If the UE receives no reason cause in step 18 in response to an IPv4v6 PDN type and it receives an IPv6 interface ID apart from the IPv4 address or 0.0.0.0 in the PDN address field, it considers that the request for a dual address PDN was successful. It can wait for the router advertisement from the network with the IPv6 prefix information or it may send router solicitation if necessary.

Step 23: Upon reception of both, the initial context response message in step 20 and the attach complete message in step 22, the new MME sends a modify bearer request (EPS bearer identity, eNB address, eNB TEID, handover indication, presence reporting area information) message to the S-GW. If the CP CIoT EPS optimization applies and the PDN connection is not served by a SCEF and if the MME does not need to report a change of UE presence in Presence Reporting Area (PRA), sending of modify bearer request and steps 23A, 23B, and 24 are skipped; otherwise if the PDN connection is served by SCEF, steps 23, 24, 25, and 26 are not executed. If the MME has been requested to report a change of UE presence in PRA, the MME includes in this message the PRA information comprising the PRA identifier(s) and indication(s) on whether the UE is inside or outside the area(s). When receiving the request for reporting change of UE presence in PRA, and the MME decides not to activate reporting UE presence in one or more of the received PRA(s), the MME reports also the inactive PRA(s) in this message.

Step 23A: If the handover indication is included in step 23, the S-GW sends a modify bearer request (handover indication) message to the P-GW to prompt the P-GW to tunnel packets from non 3GPP IP access to 3GPP access system and immediately start routing packets to the S-GW for the default and any dedicated EPS bearers established. If PRA information is included in step 23, the S-GW sends a modify bearer request (PRA information) message to the P-GW.

NOTE 15: The P-GW is expected to handle the uplink packets sent by the UE via 3GPP access after step 22, even if they arrive before path switch in step 23.

NOTE 16: The P-GW forwards the PRA information to the PCRF, to the Online Charging System (OCS) or to both as defined in 3GPP TS 23.203.

Step 23B: The P-GW acknowledges by sending modify bearer response to the S-GW.

Step 24: The S-GW acknowledges by sending modify bearer response (EPS bearer identity) message to the new MME. The S-GW can then send its buffered downlink packets.

If there is an "availability after DDN failure" monitoring event or a "UE reachability" monitoring event configured for the UE in the EPS MM (EMM) context of the MME, the MME sends an event notification (see TS 23.682 for further information).

Step 25: After the MME receives modify bearer response (EPS bearer identity) message, if request type does not indicate handover and an EPS bearer was established and the subscription data indicates that the user is allowed to perform handover to non-3GPP accesses, and if the MME selected a P-GW that is different from the P-GW identity which was indicated by the HSS in the PDN subscription context, the MME shall send a notify request including the APN and P-GW identity to the HSS for mobility with non-3GPP accesses. The message shall include information that identifies the PLMN in which the P-GW is located.

If the ME identity of the UE has changed and step 8 has not been performed, the MME sends a notify request (ME identity) message to inform the HSS of the updated ME identity.

For an unauthenticated or roaming UE, if the request type of the UE requested connectivity procedure indicates "emergency," the MME shall not send any notify request to an HSS. For a non-roaming authenticated UE, based on operator configuration (e.g., on whether voice over WLAN is supported or not by the operator, on whether the operator uses a fixed P-GW for emergency calls, etc.), if the request type indicates "emergency," the MME may send a notify request to the HSS including the "P-GW currently in use for emergency services," which comprises the P-GW address and an indication that the PDN connection is for emergency services. The HSS shall store it as part of the UE context for emergency services.

After step 8, and in parallel to any of the preceding steps, the MME shall send a notify request (homogeneous support of IMS voice over PS sessions) message to the HSS:

If the MME has evaluated the support of IMS voice over PS sessions, see 3GPP TS 23.401 V15.0.0 clause 4.3.5.8, and If the MME determines that it needs to update the homogeneous support of IMS voice over PS sessions, see 3GPP TS 23.401 V15.0.0 clause 4.3.5.8A.

Step 26: In the case of non-emergency services, the HSS stores the APN and P-GW identity pair. In the case of emergency services, the HSS stores the "P-GW currently in use for emergency services." The HSS then sends a notify response to the MME.

NOTE 17: For handover from non-3GPP access, the P-GW initiates resource allocation deactivation procedure in the trusted/untrusted non-3GPP IP access as specified in 3GPP TS 23.402.

TAU Procedure with S-GW Change

NOTE 1: For a PMIP-based S5/S8, procedure steps (A) and (B) are defined in 3GPP TS 23.402. Steps 9 and 10 concern GTP based S5/S8.

NOTE 2: In case of TAU without MME change the signaling in steps 4, 5, 7 and steps 12-17 are skipped.

Figure 2A:
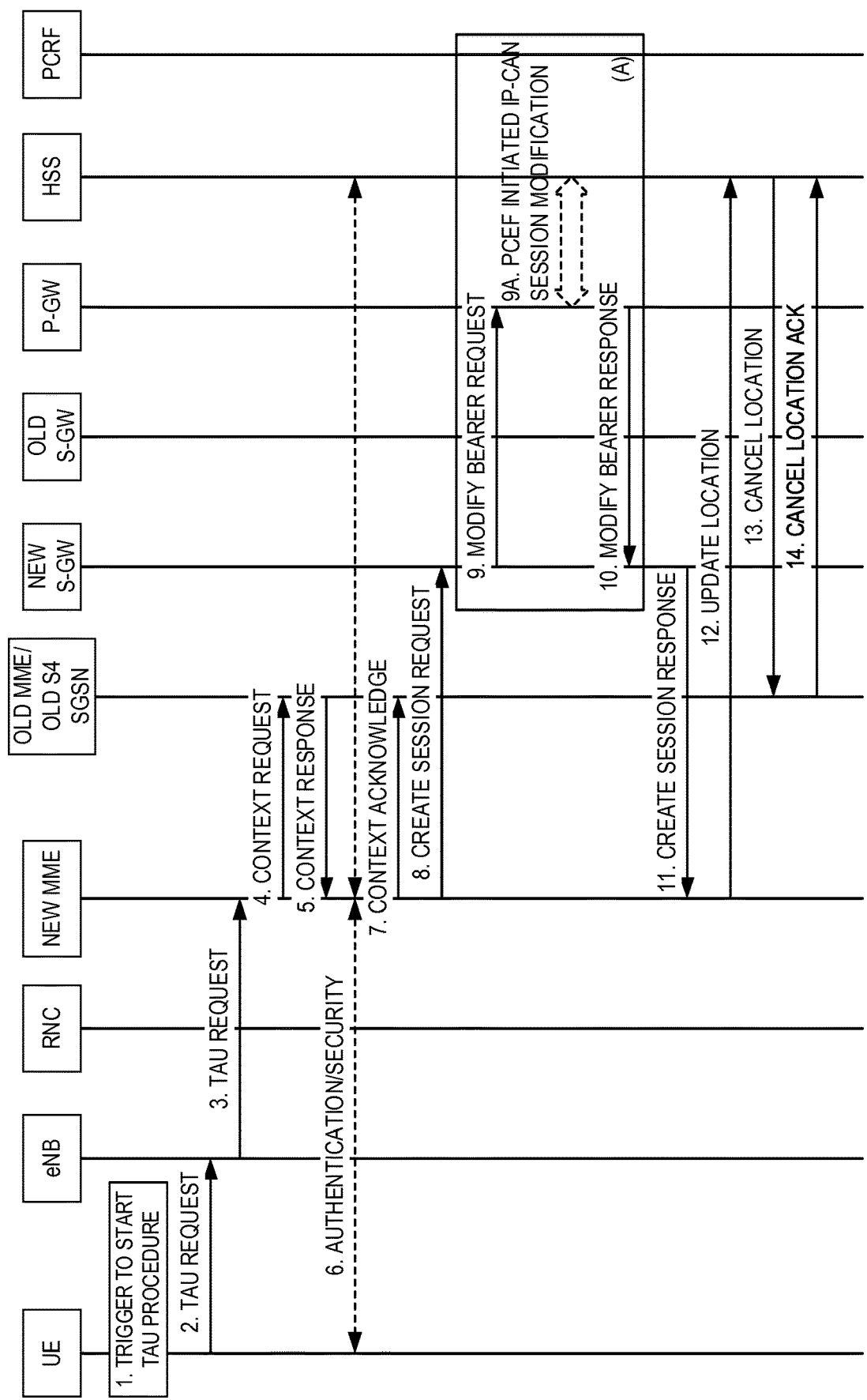
FIGS. 2A and 2B illustrate a TAU procedure in accordance with some embodiments of the present disclosure.
Figure 2B:
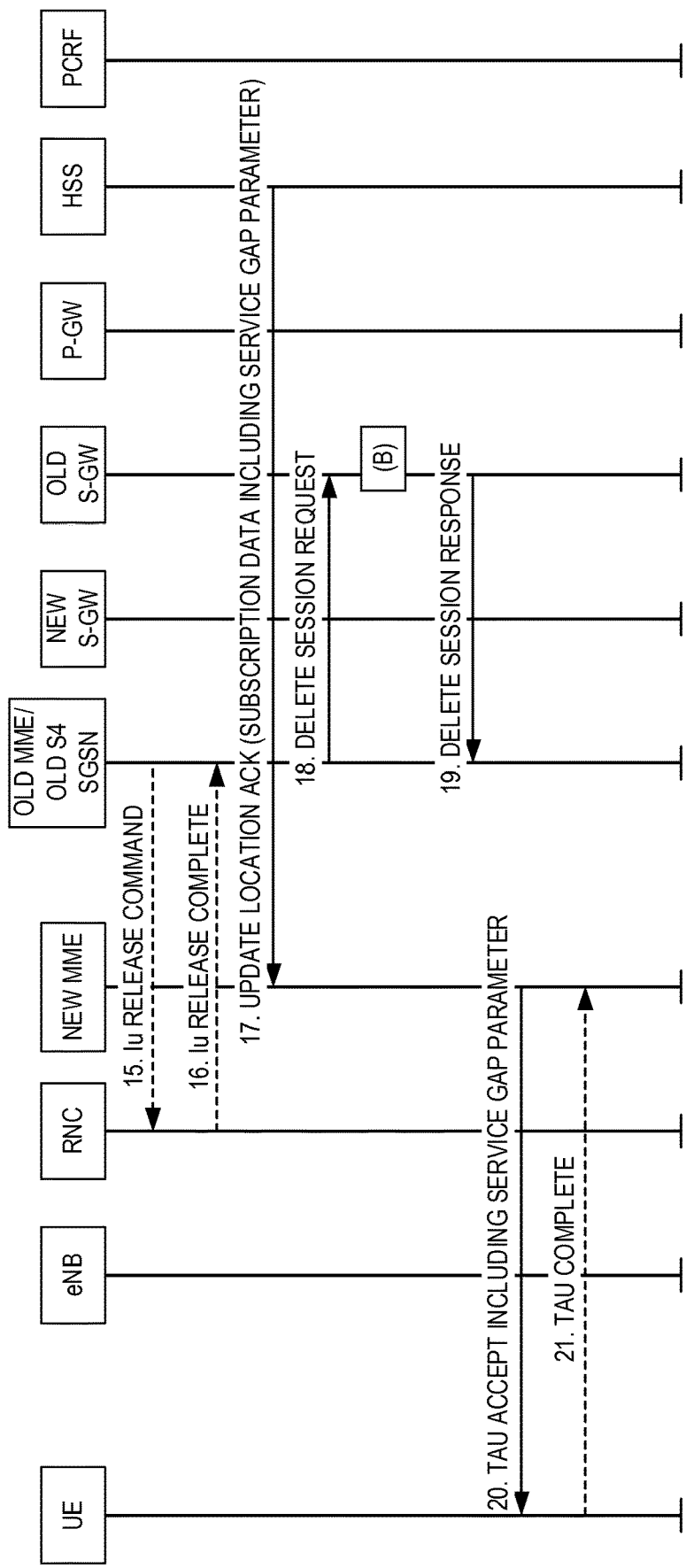

FIGS. 2A and 2B illustrate the TAU procedure with S-GW change. The steps illustrated in FIGS. 2A-2B will now be described. All references are to 3GPP TS 23.401 V15.0.0.

Step 1: One of the triggers described in TS 23.401 V15.0.0 clause 5.3.3.0 for starting the TAU procedure occurs.

Step 2: The UE initiates the TAU procedure by sending, to the eNB, a TAU request (UE core network capability, MS network capability, preferred network behavior, support for restriction of use of enhanced coverage, old GUTI, old GUTI type, last visited TAI, active flag, signaling active flag, EPS bearer status, P-TMSI signature, additional GUTI, Evolved Key Set ID (eKSI), NAS sequence number, NAS-MAC, Key Set ID (KSI), voice domain preference and UE's usage setting) message together with RRC parameters indicating the selected network and the old GUMMEI. An exception is that, if the TAU was triggered for load re-balancing purposes (see TS 23.401 V15.0.0 clause 4.3.7.3), the old GUMMEI is not included in the RRC parameters. The UE shall set the old GUTI type to indicate whether the old GUTI is a native GUTI or is mapped from a P-TMSI and RAI.

If the UE's TIN indicates "GUTI" or "RAT-related TMSI" and the UE holds a valid GUTI then the old GUTI indicates this valid GUTI. If the UE's TIN indicates "P-TMSI" and the UE holds a valid P-TMSI and related RAI then these two elements are indicated as the old GUTI. Mapping a P-TMSI and RAI to a GUTI is specified in Annex H. When the UE is in connected mode (e.g., in URA_PCH) when it reselects to E-UTRAN, the UE shall set its TIN to "P-TMSI."

If the UE holds a valid GUTI and the old GUTI indicates a GUTI mapped from a P-TMSI and RAI, then the UE indicates the GUTI as additional GUTI. If the old GUTI indicates a GUTI mapped from a P-TMSI and RAI, and the UE has a valid P-TMSI signature, the P-TMSI signature shall be included.

The additional GUTI in the TAU request message allows the new MME to find any already existing UE context stored in the new MME when the old GUTI indicates a value mapped from a P-TMSI and RAI.

Alternatively, when a UE only supports E-UTRAN, it identifies itself with the old GUTI and sets the old GUTI type to "native."

The RRC parameter "old GUMMEI" takes its value from the identifier that is signaled as the old GUTI according to the rules above. For a combined MME/SGSN, the eNB is configured to route the MME-code(s) of this combined node to the same combined node. This eNB is also configured to route MME-code(s) of GUTIs that are generated by the UE's mapping of the P-TMSIs allocated by the combined node. Such an eNB configuration may also be used for separate nodes to avoid changing nodes in the pool caused by inter RAT mobility.

The last visited TAI shall be included in order to help the MME produce a good list of TAIs for any subsequent TAU accept message. Selected network indicates the network that is selected. Active flag is a request by UE to activate the radio and S1 bearers for all the active EPS bearers by the TAU procedure when the UE is in ECM-IDLE state. Signaling active flag is a request by UE using CP CIoT EPS optimization to maintain the NAS signaling connection after TAU procedure is completed in order to transmit pending data using the data transport in CP CIoT EPS optimization or NAS signaling. The EPS bearer status indicates each EPS bearer that is active in the UE. The TAU request message shall be integrity protected by the NAS-MAC as described in 3GPP TS 33.401. eKSI, NAS sequence number, and NAS-MAC are included if the UE has valid EPS security parameters. NAS sequence number indicates the sequential number of the NAS message. KSI is included if the UE indicates a GUTI mapped from a P-TMSI in the information element "old GUTI."

For UE using CIoT EPS optimization without any activated PDN connection, there is no active flag or EPS bearer status included in the TAU request message. For a UE with a service gap timer is running in the UE, the active flag and the signaling active flag shall not be set in the TAU request message (see clause 4.3.x below).

If the UE has PDN connection of PDN type ""non-IP," the UE shall indicate EPS bearer status included in the TAU request message.

The UE sets the voice domain preference and UE's usage setting according to its configuration, as described in TS 23.401 V15.0.0 clause 4.3.5.9.

The UE includes extended idle mode DRX parameters information element if it needs to enable extended idle mode DRX, even if extended idle mode DRX parameters were already negotiated before.

If a UE includes a preferred network behavior, this defines the network behavior the UE is expecting to be available in the network as defined in TS 23.401 V15.0.0 clause 4.3.5.10.

Step 3: The eNB derives the MME address from the RRC parameters carrying the old GUMMEI, the indicated selected network, and the RAT (NB-IoT or WB-E-UTRAN). If that MME is not associated with that eNB or the GUMMEI is not available or the UE indicates that the TAU procedure was triggered by load re-balancing, the eNB selects an MME as described in TS 23.401 V15.0.0 clause 4.3.8.3 on "MME selection function."

The eNB forwards the TAU request message together with the CSG access mode, CSG ID, TAI+ECGI of the cell from where it received the message and with the selected network to the new MME. CSG ID is provided by RAN if the UE sends the TAU request message via a CSG cell or a hybrid cell. CSG access mode is provided if the UE sends the TAU request message via a hybrid cell. If the CSG access mode is not provided but the CSG ID is provided, the MME shall consider the cell as a CSG cell. For SIPTO at the local network with stand-alone GW architecture the eNB includes the local home network ID in the initial UE message and in uplink NAS transport message if the target cell is in a local home network.

To assist location services, the eNB indicates the UE's coverage level to the MME.

Step 4: The new MME differentiates the type of the old node, i.e. MME or SGSN, as specified in TS 23.401 V15.0.0 clause 4.3.19, uses the GUTI received from the UE to derive the old MME/S4 SGSN address, and sends a context request (old GUTI, complete TAU request message, P-TMSI signature, MME address, UE validated, CIoT EPS optimization support indication) message to the old MME/old S4 SGSN to retrieve user information. UE validated indicates that the new MME has validated the integrity protection of the TAU message, e.g. based on native EPS security context for the UE. To validate the context request the old MME uses the complete TAU request message and the old S4 SGSN uses the P-TMSI signature and responds with an appropriate error if integrity check fails in old MME/S4 SGSN. This shall initiate the security functions in the new MME. If the security functions authenticate the UE correctly, the new MME shall send a context request (IMSI, complete TAU request message, MME address, UE validated) message to the old MME/S4 SGSN with the UE validated set. If the new MME indicates that it has authenticated the UE or if the old MME/old S4 SGSN correctly validates the UE, then the old MME/old S4 SGSN starts a timer.

If the UE with emergency bearers is not authenticated in the old MME/old S4 SGSN (in a network supporting unauthenticated UEs) the old MME/old S4 SGSN continues the procedure with sending a context response and starting the timer also when it cannot validate the context request.

If the new MME supports CIoT EPS optimization, CIoT EPS optimization support indication is included in the context request indicating support for various CIoT EPS optimizations (e.g., support for header compression for CP optimization, etc.).

Step 5: If the context request is sent to an old MME, the old MME responds with a context response (IMSI, ME identity (IMEISV), MM context, EPS bearer context(s), S-GW signaling address and TEID(s), Idle State Signaling Reduction (ISR) supported, MS information change reporting action (if available), CSG information reporting action (if available), UE time zone, UE core network capability, UE specific DRX parameters) message. If the new MME supports CIoT EPS optimization and the use of header compression has been negotiated between the UE and the old MME, the context response also includes the header compression configuration which includes the information necessary for the ROHC channel setup but not the RoHC context itself.

If the context request is sent to an old S4 SGSN the old S4 SGSN responds with a context response (MM context, EPS bearer context(s), S-GW signaling address and TEID(s), ISR supported, MS information change reporting action (if available), CSG information reporting action (if available), UE time zone, UE core network capability, UE specific DRX parameters). If the source MME has not yet reported a non-zero MO exception data counter to the P-GW, the context response also includes the MO exception data counter as described in 3GPP TS 29.274.

The MM context contains security related information as well as other parameters (including IMSI and ME identity (if available)) as described in TS 23.401 V15.0.0 clause 5.7.2 (information storage for MME). The unused authentication quintets in the MM context are also maintained in the SGSN. 3GPP TS 33.401 gives further details on the transfer of security related information.

If the MM context received with the context response message did not include IMEISV and the MME does not already store the IMEISV of the UE, the MME shall retrieve the ME identity (IMEISV) from the UE.

The P-GW address and TEID(s) (for GTP-based S5/S8) or Generic Routing Encapsulation (GRE) keys (PMIP-based S5/S8 at the P-GW(s) for uplink traffic) and the TI(s), is part of the EPS bearer context. If the UE is not known in the old MME/old S4 SGSN or if the integrity check for the TAU request message fails, the old MME/old S4 SGSN responds with an appropriate error cause. ISR supported is indicated if the old MME/old S4 SGSN and associated S-GW are capable to activate ISR for the UE.

If the UE receives emergency bearer services from the old MME/old S4 SGSN and the UE is Universal Integrated Circuit Card (UICC)-less, IMSI cannot be included in the context response. For emergency attached UEs, if the IMSI cannot be authenticated, then the IMSI shall be marked as unauthenticated. Also, in this case, security parameters are included only if available.

If SIPTO at the local network is active for a PDN connection in the architecture with a stand-alone gateway, the old MME/old S4 SGSN shall include the local home network ID of the old cell in the EPS bearer context corresponding to the SIPTO at the local network PDN connection.

For UE using CIoT EPS optimization without any activated PDN connection, there is no EPS bearer context(s) included in the context response message.

Based on the CIoT EPS optimization support indication, old MME only transfers the EPS bearer context(s) that the new MME supports. If the new MME does not support CIoT EPS optimization, EPS bearer context(s) of non-IP PDN connection are not transferred to the new MME. If the EPS bearer context(s) of a PDN connection has not been transferred, the old MME shall consider all bearers of that PDN connection as failed and release that PDN connection by triggering the MME requested PDN disconnection procedure specified in TS 23.401 V15.0.0 clause 5.10.3. The buffered data in the old MME is discarded after receipt of context ACK.

Step 6: If the integrity check of TAU request message (sent in step 2) failed, then authentication is mandatory. The authentication functions are defined in TS 23.401 V15.0.0 clause 5.3.10 on "security function." Ciphering procedures are described in TS 23.401 V15.0.0 clause 5.3.10 on "security function." If GUTI allocation is going to be done and the network supports ciphering, the NAS messages shall be ciphered.

If this TAU request is received for a UE which is already in ECM_CONNECTED state and the PLMN-ID of the TAI sent by the eNB in step 3 is different from that of the GUTI, included in the TAU request message, the MME shall delay authenticating the UE until after step 21 (TAU complete message).

NOTE 3: The MME delays the authentication such that the UE first updates its registered PLMN-ID to the new PLMN-ID selected by the RAN during handover. The new PLMN-ID is provided by the MME to the UE as part of the GUTI in the TAU accept message in step 20. Doing this ensures that the same PLMN-ID is used in the derivation of the Kasme key by both the network and the UE.

If the new MME is configured to allow emergency bearer services for unauthenticated UE the new MME behave as follows:
  where a UE has only emergency bearer services, the MME either skips the authentication and security procedure or accepts that the authentication may fail and continues the TAU procedure; or
  where a UE has both emergency and non emergency bearer services and authentication fails, the MME continues the TAU procedure and deactivates all the non-emergency PDN connections as specified in TS 23.401 V15.0.0 clause 5.10.3.

Step 7: The MME (if the MME has changed then it is the new MME) determines to relocate the S-GW. The S-GW is relocated when the old S-GW cannot continue to serve the UE. The MME (if the MME has changed then it is the new MME) may also decide to relocate the S-GW if a new S-GW is expected to serve the UE longer and/or with a more optimal UE to P-GW path, or if a new S-GW can be co-located with the P-GW. Selection of a new S-GW is performed according to TS 23.401 V15.0.0 clause 4.3.8.2 on "S-GW selection function."

If the MME has changed the new MME sends a context ACK (S-GW change indication) message to the old MME/old S4 SGSN. S-GW change indication indicates a new S-GW has been selected. The old MME/old S4 SGSN marks in its UE context that the information in the gateways is invalid. And, if the old node is an MME, the old MME marks in its UE context that the information in the HSS is invalid. This ensures that the old MME/old S4 SGSN updates the gateways, and the old MME updates the HSS, if the UE initiates a TAU or RAU procedure back to the old MME/old S4 SGSN before completing the ongoing TAU procedure.

NOTE 4: Updating the gateways refers to deletion of session(s) on the S-GW followed by re-creation of session(s) on the S-GW. The re-creation of session(s) on the S-GW will result in successful re-establishment of the S5/S8 tunnel between the selected S-GW and the P-GW.

If the security functions do not authenticate the UE correctly, then the TAU shall be rejected, and the new MME shall send a reject indication to the old MME/old S4 SGSN. The old MME/old S4 SGSN shall continue as if the identification and context request was never received.

ISR is not indicated in the context ACK as ISR is not activated due to the S-GW change.

For UE using CIoT EPS optimization without any activated PDN connection, the steps 8, 9, 10, 11, 18, and 19 are skipped.

Step 8: If the MME has changed the new MME verifies the EPS bearer status received from the UE with the bearer contexts received from the old MME/old S4 SGSN. If the MME has not changed the MME verifies EPS bearer status from the UE with the bearer contexts available in the MM context. The MME releases any network resources related to EPS bearers that are not active in the UE. If there is no bearer context at all, the MME rejects the TAU request.

If the MME selected a new S-GW it sends a create session request (IMSI, bearer contexts, MME address and TEID, type, the protocol type over S5/S8, RAT type, serving network, UE time zone, MO exception data counter) message per PDN connection to the selected new S-GW. The P-GW address and TFT (for PMIP-based S5/S8) are indicated in the bearer contexts. Type indicates to the S-GW to send the modify bearer request to the P-GW. The protocol type over S5/S8 is provided to S-GW which protocol should be used over S5/S8 interface. RAT type indicates a change in radio access. If it is a mobility from a SGSN to a MME and if the MME supports location information change reporting, the MME shall include the user location information (according to the supported granularity) in the create session request, regardless of whether location information change reporting had been requested in the previous RAT by the P-GW. If it is an inter MME mobility and if the P-GW requested location information change reporting, the MME includes the user location information IE in this message if it is different compared to the previously sent information. If the P-GW requested user CSG information, the MME also includes the user CSG information IE in this message. If CP CIoT EPS optimization applies, the MME may also indicate S11-U tunneling of NAS user data and send its own S11-U IP address and MME downlink TEID for downlink data forwarding by the S-GW. The MME shall include the MO exception data counter if it has received the counter for RRC cause "MO exception data" in the context response message.

If only the CP CIoT EPS optimization is used, the MME shall include a CP only PDN connection indicator in create session request.

If the new MME receives the EPS bearer context with SCEF, then the new MME updates the SCEF as defined in 3GPP TS 23.682.

Step 9: The S-GW informs the P-GW(s) about the change of for example the RAT type that, e.g., can be used for charging, by sending the message modify bearer request (S-GW address and TEID, RAT type, serving network, PDN charging pause support indication) per PDN connection to the P-GW(s) concerned. User location information IE and/or UE time zone IE and/or user CSG information IE and/or MO exception data counter are also included if they are present in step 8. The S-GW and P-GW indicate each use of the RRC establishment cause "MO exception data" by the related counter on its CDR.

If the S-GW has received the CP only PDN connection indicator in step 8, the S-GW indicates the use of CP only on its CDR.

Step 9A: If dynamic PCC is deployed, and RAT type information needs to be conveyed from the P-GW to the PCRF, then the P-GW shall send RAT type information to the PCRF by means of an IP-CAN session modification procedure as defined in 3GPP TS 23.203.

NOTE 5: The P-GW does not need to wait for the PCRF response, but continues in the next step. If the PCRF response leads to an EPS bearer modification the P-GW should initiate a bearer update procedure.

Step 10: The P-GW updates its bearer contexts and returns a modify bearer response (MSISDN, charging ID, PDN charging pause enabled indication (if P-GW has chosen to enable the function)) message. The MSISDN is included if the P-GW has it stored in its UE context. If there has been a RAT change towards E-UTRAN and location information change reporting is required and supported in the target MME, the P-GW shall provide MS information change reporting action in the modify bearer response.

If the S-GW is relocated, the P-GW shall send one or more "end marker" packets on the old path immediately after switching the path in order to assist the reordering function in the target eNB. If the S-GW has no downlink UP established, the S-GW shall discard the "end marker" received from the P-GW and shall not send downlink data notification. Otherwise the S-GW shall forward the "end marker" packets to the source eNB or source S4 SGSN.

Step 11: The S-GW updates its bearer context. This allows the S-GW to route bearer PDUs to the P-GW when received from eNB.

The S-GW returns a create session response (S-GW address and TEID for UP and CP and P-GW TEIDs (for GTP-based S5/S8) or GRE keys (for PMIP-based S5/S8) for uplink traffic and CP, MS information change reporting action) message to the new MME. If CP CIoT EPS optimization applies, the S-GW address for S11-U UP and S-GW TEID are used by the MME to forward uplink data to the S-GW.

When the MME receives the create session response message, the MME checks if there is an "availability after Downlink Data Notification (DDN) failure" monitoring event or a "UE Reachability" monitoring event configured for the UE in the MME and in such a case sends an event notification (see 3GPP TS 23.682 for further information).

Step 12: The new MME verifies whether it holds subscription data for the UE identified by the GUTI, the additional GUTI or by the IMSI received with the context data from the old core network node.

If there are no subscription data in the new MME for this UE, or for some network sharing scenario (e.g., GWCN) if the PLMN-ID of the TAI supplied by the eNB is different from that of the GUTI in the UE's context, then the new MME sends an update location request (MME identity, IMSI, ULR flags, MME capabilities, homogeneous support of IMS voice over PS sessions, UE SRVCC capability, equivalent PLMN list, ME identity (IMEISV)) message to the HSS. ULR flags indicate that update location is sent from an MME and the MME registration shall be updated in HSS. The HSS does not cancel any SGSN registration. The MME capabilities indicate the MME's support for regional access restrictions functionality. The inclusion of the equivalent PLMN list indicates that the MME supports the inter-PLMN handover to a CSG cell in an ePLMN using the subscription information of the target PLMN. The "homogenous support of IMS voice over PS sessions" indication (see TS 23.401 V15.0.0 clause 4.3.5.8A) shall not be included unless the MME has completed its evaluation of the support of "IMS voice over PS session" as specified in TS 23.401 V15.0.0 clause 4.3.5.8. The ME identity is included if step 5 caused the MME to retrieve the IMEISV from the UE.

NOTE 6: At this step, the MME may not have all the information needed to determine the setting of the IMS voice over PS session supported indication for this UE (see TS 23.401 V15.0.0 clause 4.3.5.8). Hence the MME can send the "homogenous support of IMS voice over PS sessions" later on in this procedure.

If the UE initiates the TAU procedure in a VPLMN supporting autonomous CSG roaming and the HPLMN has enabled autonomous CSG roaming in the VPLMN (via service level agreement) and the MME needs to retrieve the CSG subscription information of the UE from the CSS, the MME initiates the update CSG location procedure with CSS as described in TS 23.401 V15.0.0 clause 5.3.12.

If the MME determines that only the UE SRVCC capability has changed, the MME sends a notify request to the HSS to inform about the changed UE SRVCC capability.

If all the EPS bearers of the UE have emergency ARP value, the new MME may skip the update location procedure or proceed even if the update location fails.

Step 13: The HSS sends the message cancel location (IMSI, cancellation type) to the old MME with cancellation type set to update procedure.

Step 14: If the timer started in step 4 is not running, the old MME removes the MM context. Otherwise, the contexts are removed when the timer expires. It also ensures that the MM context is kept in the old MME for the case the UE initiates another TAU procedure before completing the ongoing TAU procedure to the new MME. The old MME acknowledges with the message cancel location ACK (IMSI).

Step 15: When old S4 SGSN receives the context acknowledge message and if the UE is in Iu connected, the old S4 SGSN sends an Iu release command message to the RNC after the timer started in step 4 has expired.

Step 16: The RNC responds with an Iu release complete message.

Step 17: The HSS acknowledges the update location request message by sending an update location ACK (IMSI, subscription data) message to the new MME. The subscription data may contain the CSG subscription data for the registered PLMN and for the equivalent PLMN list requested by MME in step 12.

The subscription data may contain enhanced coverage restricted parameter. If received from the HSS, MME stores this enhanced coverage restricted parameter in the MME MM context.

The subscription data may contain Service gap parameter. If received from the HSS, MME stores this Service gap parameter in the MME MM context and passes it to the UE in the Tracking Area Update Accept message.

If the update location is rejected by the HSS, the new MME rejects the TAU request from the UE with an appropriate cause. In such cases, the new MME releases any local MME EPS bearer contexts for this particular UE, and additionally deletes the EPS bearer resources in the new S-GW by sending the delete session request (cause, operation indication) messages to the new S-GW. The operation indication flag shall not be set. Therefore, the new S-GW receiving this request shall not initiate a delete procedure towards the P-GW.

If the UE initiates the TAU procedure at a CSG cell, the new MME shall check whether the CSG ID and associated PLMN is contained in the CSG subscription and is not expired. If the CSG ID and associated PLMN is not present or expired, the MME shall send a TAU reject message to the UE with an appropriate cause value. The UE shall remove the CSG ID and associated PLMN from its allowed CSG list, if present. If the UE has ongoing emergency bearer services no CSG access control shall be performed.

If all checks are successful then the new MME constructs a context for the UE.

Step 18: If the MME has changed, when the timer started in step 4 expires the old MME/old S4 SGSN releases any local MME or SGSN bearer resources and additionally the old MME/old S4 SGSN deletes the EPS bearer resources by sending the delete session request (cause, operation indication) messages to the old S-GW if it received the S-GW change indication in the context acknowledge message in step 7. When the operation indication flag is not set, that indicates to the old S-GW that the old S-GW shall not initiate a delete procedure towards the P-GW. If ISR is activated the cause indicates to the old S-GW that the old S-GW shall delete the bearer resources on the other old core network node by sending delete bearer request message(s) to that core network node.

If the MME has not changed, step 11 triggers the release of the EPS bearer resources at the old S-GW.

Step 19: The S-GW acknowledges with delete session response (cause) messages. The S-GW discards any packets buffered for the UE.

Step 20: If due to regional subscription restrictions or access restrictions (e.g., CSG restrictions) the UE is not allowed to access the TA:

The MME rejects the TAU request with an appropriate cause to the UE.

For UEs with emergency EPS bearers, i.e. at least one EPS bearer has an ARP value reserved for emergency services, the new MME accepts the TAU request and deactivates all non-emergency PDN connections as specified in TS 23.401 V15.0.0 clause 5.10.3. If the TAU procedure is initiated in ECM-IDLE state, all non-emergency EPS bearers are deactivated by the TAU procedure without bearer deactivation signaling between the UE and the MME.

The MME sends a TAU accept (GUTI, TAI list, EPS bearer status, NAS sequence number, NAS-MAC, IMS voice over PS session supported, emergency service support indicator, LCS support indication, supported network behavior, service gap) message to the UE. If the active flag is set the MME may provide the eNB with handover restriction list. GUTI is included if the MME allocates a new GUTI. If the active flag is set in the TAU request message the UP setup procedure can be activated in conjunction with the TAU accept message. If the downlink data buffer expiration time for the UE in the MME has not expired, the UP setup procedure is activated even if the MME did not receive the active flag in the TAU request message. If the new MME receives the downlink data notification message or any downlink signaling message while the UE is still connected, the UP setup procedure may be activated even if the new MME did not receive the active flag in the TAU request message. The procedure is described in detail in 3GPP TS 36.300. The message sequence should be the same as for the UE triggered service request procedure specified in TS 23.401 V15.0.0 clause 5.3.4.1 from the step when MME establishes the bearer(s). The MME indicates the EPS bearer status IE to the UE. The UE removes any internal resources related to bearers that are not marked active in the received EPS bearer status. If the EPS bearer status information was in the TAU request, the MME shall indicate the EPS bearer status to the UE. Handover restriction list is described in TS 23.401 V15.0.0 clause 4.3.5.7 "Mobility Restrictions." The MME sets the IMS voice over PS session supported as described in TS 23.401 V15.0.0 clause 4.3.5.8.

For UE using CIoT EPS optimization without any activated PDN connection, there is no EPS bearer status included in the TAU accept message.

The MME indicates the CIoT optimizations it supports and prefers in the supported network behavior information as defined in TS 23.401 V15.0.0 clause 4.3.5.10.

If there is a service gap timer running for the UE in the MME, the active flag and signaling active flag received in the TAU request message shall be ignored and any actions triggered by the active flag or signaling active flag in this procedure shall not be performed.

The service gap parameter is included in the TAU accept message if the UE has indicated service gap capability in the UE network capability and either if service gap was received in step 17 from HSS in the subscription information or if the service gap in the subscription information has earlier been updated by HSS user profile management (i.e., the insert subscriber data procedure in TS 23.401 V15.0.0 clause 5.3.9.2). Note that the MME may include the service gap timer even without explicit indications of support.

If the UE included support for restriction of use of enhanced coverage, the MME sends enhanced coverage restricted parameter to the eNB in the S1-AP message as defined in TS 23.401 V15.0.0 clause 4.3.28. The MME also sends the enhanced coverage restricted parameter to the UE in the TAU accept message. UE shall store enhanced coverage restricted parameter and shall use the value of enhanced coverage restricted parameter to determine if enhanced coverage feature should be used or not.

If the MME successfully obtained header compression configuration parameters in step 5 it indicates the continued use of previous negotiated configuration to the UE in the header compression context status for each EPS bearer of the UE. When header compression context status indicates that the previous negotiated configuration can no longer be used for some EPS bearers, the UE shall stop performing header compression and decompression, when sending or receiving data using CP CIoT EPS optimization on these EPS bearers.

If the MME did not receive the voice support match indicator in the MM context, then the MME may send a UE radio capability match request to the eNB as described in TS 23.401 V15.0.0 clause 5.3.14. If the MME hasn't received voice support match indicator from the eNB then, based on implementation, MME may set IMS voice over PS session supported indication and update it at a later stage. After step 12, and in parallel to any of the preceding steps, the MME shall send a notify request (homogeneous support of IMS voice over PS sessions) message to the HSS:

If the MME has evaluated the support of IMS voice over PS sessions, see TS 23.401 V15.0.0 clause 4.3.5.8, and If the MME determines that it needs to update the homogeneous support of IMS voice over PS sessions, see TS 23.401 V15.0.0 clause 4.3.5.8A.

The emergency service support indicator informs the UE that emergency bearer services are supported. LCS support indication indicates whether the network supports the EPC-MO-LR and/or CS-MO-LR as described in 3GPP TS 23.271.

If the UE included extended idle mode DRX parameters information element, the MME includes extended idle mode DRX parameters information element if it decides to enable extended idle mode DRX.

When receiving the TAU accept message and there is no ISR activated indication the UE shall set its TIN to "GUTI."

For a S-GW change, ISR activated is never indicated by the MME as it needs a Routing Area Update (RAU) with the same S-GW first to activate ISR. For an MME change, ISR is not activated by the new MME to avoid context transfer procedures with two old core network nodes.

If the TAU procedure is initiated by manual CSG selection and occurs via a CSG cell, the UE upon receiving the TAU accept message shall add the CSG ID and associated PLMN to its allowed CSG list if it is not already present. Manual CSG selection is not supported if the UE has emergency bearers established.

If the UP setup is performed in conjunction with the TAU accept message and the TAU is performed via a hybrid cell, then the MME shall send an indication whether the UE is a CSG member to the RAN along with the S1-MME control message. Based on this information the RAN may perform differentiated treatment for CSG and non-CSG members.

NOTE 7: If the UE receives a TAU accept message via a hybrid cell, the UE does not add the corresponding CSG ID and associated PLMN to its allowed CSG list. Adding a CSG ID and associated PLMN to the UE's local allowed CSG list for a hybrid cell is performed only by OTA or OMA DM procedures.

If the UE receives a service gap in the TAU accept message, the UE shall store this parameter and apply service gap control for MO data connection requests (see clause 4.3.x below).

Step 21: If GUTI was included in the TAU accept, the UE acknowledges the received message by returning a TAU complete message to the MME.

When the "active flag" is not set in the TAU request message and the TAU was not initiated in ECM-CONNECTED state, the new MME releases the signaling connection with UE, according to TS 23.401 V15.0.0 clause 5.3.5. For a UE using CP CIoT EPS optimization, when the "signaling active flag" is set, the new MME shall not release the NAS signaling connection with the UE immediately after the TAU procedure is completed.

NOTE 8: The new MME may initiate E-UTRAN Radio Access Bearer (E-RAB) establishment (see 3GPP TS 36.413) after execution of the security functions, or wait until completion of the TA update procedure. For the UE, E-RAB establishment may occur any time after the TA update request is sent.

In the case of a rejected TAU operation, due to regional subscription, roaming restrictions or access restrictions (see 3GPP TS 23.221 and 3GPP TS 23.008) the new MME should not construct a MM context for the UE. In the case of receiving the subscriber data from HSS, the new MME may construct an MM context and store the subscriber data for the UE to optimize signaling between the MME and the HSS. A reject shall be returned to the UE with an appropriate cause and the S1 connection shall be released. Upon return to idle, the UE shall act according to 3GPP TS 23.122.

The new MME shall determine the maximum APN restriction based on the received APN restriction of each bearer context in the context response message and then store the new maximum APN restriction value.

The bearer contexts shall be prioritized by the new MME. If the new MME is unable to support the same number of active bearer contexts as received from old MME/SGSN, the prioritization is used to decide which bearer contexts to maintain active and which ones to delete. In any case, the new MME shall first update all contexts in one or more P-GWs and then deactivate the bearer context(s) that it cannot maintain as described in the clause "MME initiated dedicated bearer deactivation procedure." This shall not cause the MME to reject the TAU.

The new MME shall not deactivate emergency service related EPS bearers, i.e. EPS bearers with ARP value reserved for emergency services.

NOTE 9: If MS (UE) was in PMM-CONNECTED state the bearer contexts are sent already in the forward relocation request message as described in the clause "Serving RNS relocation procedures" of 3GPP TS 23.060.

If the TAU procedure fails a maximum allowable number of times, or if the MME returns a TAU reject (cause) message, the UE shall enter EMM DEREGISTERED state.

If the new MME identifies that the RAT type has changed, the MME checks the subscription information to identify for each APN whether to maintain the PDN connection, disconnect the PDN connection with a reactivation request, or disconnect the PDN connection without reactivation request. If the MME decides to deactivate a PDN connection it performs MME-initiated PDN connection deactivation procedure after the TAU procedure is completed but before the S1/RRC interface connection is released. Existing ESM cause values as specified in 3GPP TS 24.301 (e.g. #39, "reactivation requested;" #66 "Requested APN not supported in current RAT and PLMN combination;" and for a dedicated bearer, possibly #37 "EPS QoS not accepted") are used to cause predictable UE behavior. If all the PDN connections are disconnected and the UE does not support "attach without PDN connectivity," the MME shall request the UE to detach and reattach.

Service Request Procedures
UE Triggered Service Request

The service request procedure in this clause is triggered by the UE in ECM-IDLE status to establish UP radio bearers for the UE.

The UE in ECM-IDLE state can also use this procedure to establish UP radio bearers even if the UE applies CP CIoT EPS optimization, when the UE and MME supports S1-U data transfer or UP EPS optimization in addition to CP CIoT EPS optimization.

If the UE has a service gap timer running and the service request is not a response to a MT paging, the UE shall not initiate this procedure (see clause 4.3.x below).

NOTE 1: For a PMIP-based S5/S8, procedure steps (A) are defined in 3GPP TS 23.402. Steps 9 and 11 concern GTP-based S5/S8.

Figure 3:
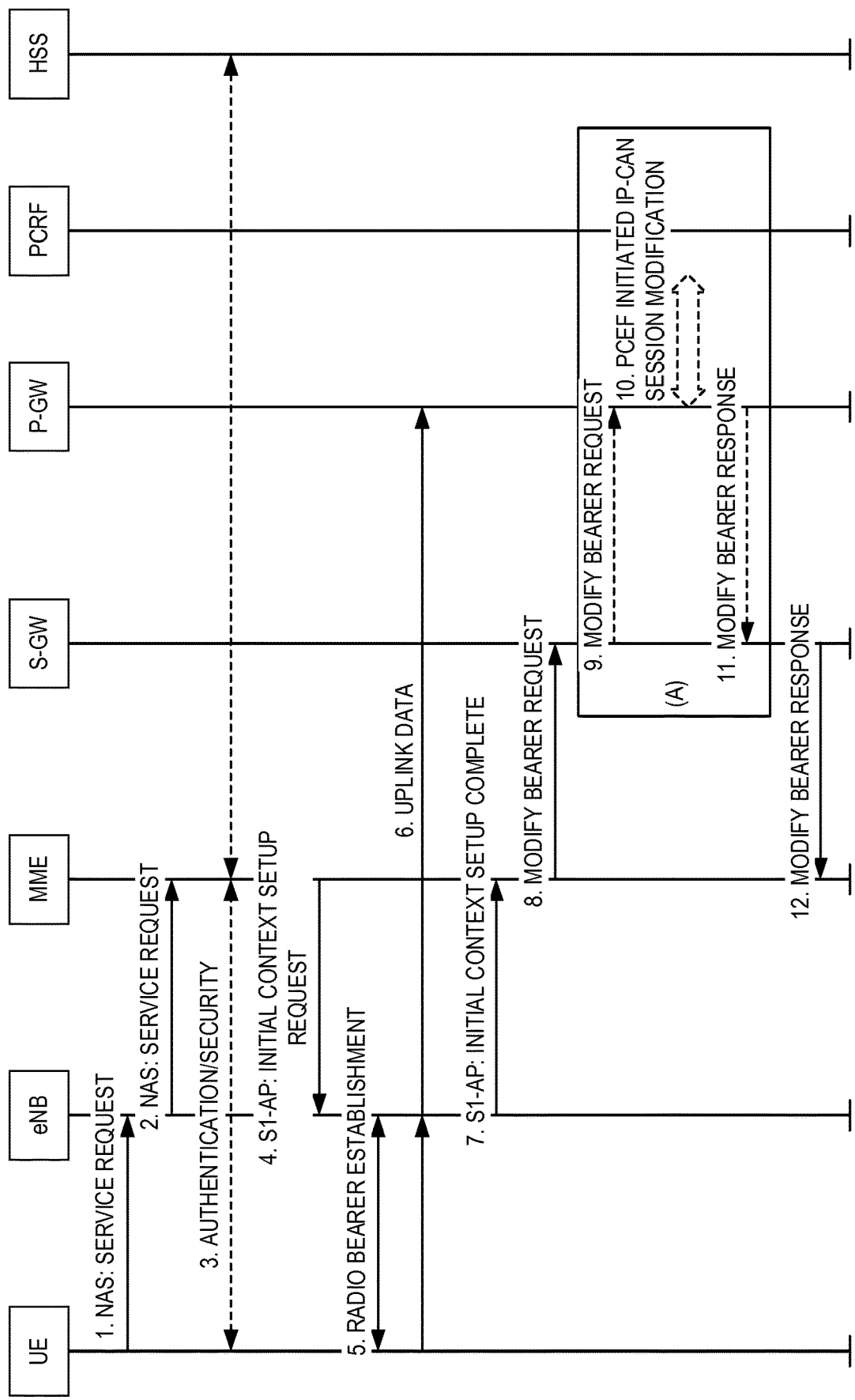
FIG. 3 illustrates a service request procedure in accordance with some embodiments of the present disclosure.

FIG. 3 illustrates the UE triggered service request procedure. The steps of this procedure illustrated in FIG. 3 will now be described. All references are to 3GPP TS 23.401 V15.0.0.

Step 1: The UE sends NAS message service request towards the MME encapsulated in an RRC message to the eNB. The RRC message(s) that can be used to carry the S-TMSI and this NAS message are described in 3GPP TS 36.300.

Step 2: The eNB forwards NAS message to MME. The NAS message is encapsulated in an S1-AP: initial UE message (NAS message, TAI+ECGI of the serving cell, S-TMSI, CSG ID, CSG access mode, RRC establishment cause). Details of this step are described in 3GPP TS 36.300. If the MME can't handle the service request it will reject it. CSG ID is provided if the UE sends the service request message via a CSG cell or a hybrid cell. CSG access mode is provided if the UE sends the service request message via a hybrid cell. If the CSG access mode is not provided but the CSG ID is provided, the MME shall consider the cell as a CSG cell.

If a CSG ID is indicated and CSG access mode is not provided, and there is no subscription data for this CSG ID and associated PLMN or the CSG subscription is expired, the MME rejects the service request with an appropriate cause. The UE shall remove the CSG ID and associated PLMN of the cell where the UE has initiated the service request procedure from the allowed CSG list, if present.

For UEs with emergency EPS bearers, i.e. at least one EPS bearer has an ARP value reserved for emergency services, if CSG access restrictions do not allow the UE to get normal services the MME shall deactivate all non-emergency bearers and accept the service request.

If LIPA is active for a PDN connection and if the cell accessed by the UE does not link to the L-GW where the UE initiated the LIPA PDN connection, the MME shall not request the establishment of the bearers of the LIPA PDN connection from the eNB in step 4 and shall request disconnection of the LIPA PDN connection according to TS 23.401 V15.0.0 clause 5.10.3. If the UE has no other PDN connection then the MME shall reject the service request with an appropriate cause value resulting in the UE detaching, skip the following steps of the procedure and initiate the release of the core network resources with the implicit MME-initiated detach procedure according to TS 23.401 V15.0.0 clause 5.3.8.3.

If there is an "availability after DDN failure" monitoring event or a "UE reachability" monitoring event configured for the UE in the MME, the MME sends an event notification (see 3GPP TS 23.682 for further information).

To assist location services, the eNB indicates the UE's coverage level to the MME.

Step 3: NAS authentication/security procedures as defined in TS 23.401 V15.0.0 clause 5.3.10 on "security function" may be performed.

Step 4: If there is a service gap timer running in the MME MM context for the UE and the service request is not a response to a preceding MT paging, the MME rejects the service request with an appropriate cause and (e.g., optionally) with a back-off timer (e.g., a MM back-off timer) set to the remaining service gap time.

The MME deletes S11-U related information in UE context if there is any, including TEID(DL) for the S11-U for CP CIoT EPS optimization if data buffering is in the MME, ROHC context for CP CIoT EPS optimization, etc., but not the header compression configuration. The MME sends S1-AP initial context setup request (S-GW address, S1-TEID(s) (uplink), EPS bearer QoS(s), security context, MME signaling connection ID, handover restriction list, CSG membership indication) message to the eNB. If there is a PDN connection established for LIPA, this message includes a correlation ID for enabling the direct UP path between the HeNB and the L-GW. If there is a PDN connection established for SIPTO at the local network with L-GW function collocated with the (H)eNB, this message includes a SIPTO correlation ID for enabling the direct UP path between the (H)eNB and the L-GW. This step activates the radio and S1 bearers for all the active EPS bearers. The eNB stores the security context, MME signaling connection ID, EPS bearer QoS(s), and S1-TEID(s) in the UE RAN context. The step is described in detail in 3GPP TS 36.300. Handover restriction list is described in TS 23.401 V15.0.0 clause 4.3.5.7 "Mobility Restrictions."

NOTE 2: In this release of the 3GPP specification the correlation ID and SIPTO correlation ID is set equal to the UP P-GW TEID (GTP-based S5) or GRE key (PMIP-based S5) which is specified in TS 23.401 V15.0.0 clause 5.3.2.1 and clause 5.10.2.

If the UE included support for restriction of use of enhanced coverage, the MME sends enhanced coverage restricted parameter to the eNB in the S1-AP message.

The MME shall only request to establish emergency EPS bearer if the UE is not allowed to access the cell where the UE initiated the service request procedure due to CSG access restriction.

If the service request is performed via a hybrid cell, CSG membership indication indicating whether the UE is a CSG member shall be included in the S1-AP message from the MME to the RAN. Based on this information the RAN can perform differentiated treatment for CSG and non-CSG members.

Step 5: The eNB performs the radio bearer establishment procedure. The UP security is established at this step, which is described in detail in 3GPP TS 36.300. When the UP radio bearers are setup. EPS bearer state synchronization is performed between the UE and the network, i.e. the UE shall locally remove any EPS bearer for which no radio bearers are setup and, if the radio bearer for a default EPS bearer is not established, the UE shall locally deactivate all EPS bearers associated to that default EPS bearer.

Step 6: The uplink data from the UE can now be forwarded by eNB to the S-GW. The eNB sends the uplink data to the S-GW address and TEID provided in the step 4. The S-GW forwards the uplink data to the P-GW.

Step 7: The eNB sends an S1-AP message initial context setup complete (eNB address, list of accepted EPS bearers, list of rejected EPS bearers, S1 TEID(s) (downlink)) to the MME. This step is described in detail in 3GPP TS 36.300. If the correlation ID or SIPTO correlation ID is included in step 4, the eNB shall use the included information to establish a direct UP path to the L-GW and forward uplink data for LIPA or SIPTO at the local network with L-GW function collocated with the (H)eNB accordingly.

Step 8: The MME sends a modify bearer request message (eNB address, S1 TEID(s) (downlink) for the accepted EPS bearers, Delay downlink packet notification request, RAT type, MO exception data counter) per PDN connection to the S-GW. If the S-GW supports modify access bearers request procedure and if there is no need for the S-GW to send the signaling to the P-GW, the MME may send modify access bearers request (eNB address(es) and TEIDs for downlink UP for the accepted EPS bearers, delay downlink packet notification request) per UE to the S-GW to optimize the signaling. The S-GW is now able to transmit downlink data towards the UE. The usage of the delay downlink packet notification request IE is specified in TS 23.401 V15.0.0 clause 5.3.4.2 below. If the P-GW requested UE's location and/or user CSG information and the UE's location and/or user CSG information has changed, the MME also includes the user location information IE and/or user CSG information IE in this message. If ISR is activated or if the serving network IE has changed compared to the last reported serving network IE then the MME also includes the serving network IE in this message. If the UE time zone has changed compared to the last reported UE time zone then the MME shall include the UE time zone IE in this message. If the internal flag pending network initiated PDN connection signaling is set, the MME indicates UE available for end to end signaling in the modify bearer request message and reset the flag.

The MME only includes the MO exception data counter if the RRC establishment cause is set to "MO exception data" and the UE is accessing via the NB-IoT RAT. The MME maintains the MO exception data counter for serving PLMN rate control purposes (see TS 23.401 V15.0.0 clause 4.7.7.2). In order for the P-GW to properly apply APN rate control to MO exception data, the MME may immediately send the MO exception data counter to the S-GW. Alternatively, in order to reduce signaling, the MME may send the MO exception data counter to the S-GW as described in 3GPP TS 29.274.

The MME and the S-GW clears the downlink data buffer expiration time in their UE contexts if it was set, to remember that any downlink data buffered for a UE using power saving functions has been delivered and to avoid any unnecessary UP setup in conjunction with a later TAU.

If a default EPS bearer is not accepted by the eNB, all the EPS bearers associated to that default bearer shall be treated as non-accepted bearers. The MME releases the non-accepted bearers by triggering the bearer release procedure as specified in TS 23.401 V15.0.0 clause 5.4.4.2. If the S-GW receives a downlink packet for a non-accepted bearer, the S-GW drops the downlink packet and does not send a downlink data notification to the MME.

Step 9: If the RAT type has changed compared to the last reported RAT type or if the UE's location and/or information IEs and/or UE time zone and/or if ISR is not activated and serving network ID and/or the indication UE available for end to end signaling are present in step 8, the S-GW shall send the modify bearer request message (RAT type, MO exception data counter) per PDN connection to the P-GW. User location information IE and/or user CSG information IE and/or serving network IE and/or UE time zone and/or the indication UE available for end to end signaling are also included if they are present in step 8.

If the modify bearer request message is not sent because of above reasons and the P-GW charging is paused, then the S-GW shall send a modify bearer request message with PDN charging pause stop indication to inform the P-GW that the charging is no longer paused. Other IEs are not included in this message.

If the modify bearer request message is not sent because of above reasons but the MME indicated the MO exception data counter, then the S-GW should notify the P-GW that this RRC establishment cause has been used by the MO exception data counter (see 3GPP TS 29.274). The S-GW indicates each use of this RRC establishment cause by the related counter on its CDR.

Step 10: If dynamic PCC is deployed, the P-GW interacts with the PCRF to get the PCC rule(s) according to the RAT Type by means of a PCEF initiated IP-CAN session modification procedure as defined in 3GPP TS 23.203. If dynamic PCC is not deployed, the P-GW may apply local QoS policy.

The P-GW indicates each use of the RRC establishment cause "MO exception data" by the related counter on its CDR.

Step 11: The P-GW sends the modify bearer response to the S-GW.

Step 12: The S-GW shall return a modify bearer response (S-GW address and TEID for uplink traffic) to the MME as a response to a modify bearer request message, or a modify access bearers response (S-GW address and TEID for uplink traffic) as a response to a modify access bearers request message. If the S-GW cannot serve the MME request in the modify access bearers request message without S5/S8 signaling other than to unpause charging in the P-GW or without corresponding Gxc signaling when PMIP is used over the S5/S8 interface, it shall respond to the MME with indicating that the modifications are not limited to S1-U bearers, and the MME shall repeat its request using a modify bearer request message per PDN connection.

If SIPTO at the local network is active for a PDN connection with stand-alone gateway deployment and the local home network ID for stand-alone accessed by the UE differs from the local home network ID where the UE initiated the SIPTO@LN PDN connection, the MME shall request disconnection of the SIPTO at the local network PDN connection(s) with the "reactivation requested" cause value according to TS 23.401 V15.0.0 clause 5.10.3. If the UE has no other PDN connection, the MME initiated "explicit detach with reattach required" procedure according to TS 23.401 V15.0.0 clause 5.3.8.3.

If SIPTO at the local network is active for a PDN connection with collocated L-GW deployment and the L-GW CN address of the cell accessed by the UE differs from the L-GW CN address of the cell where the UE initiated the SIPTO at the local network PDN connection, the MME shall request disconnection of the SIPTO at the local network PDN connection(s) with the "reactivation requested" cause value according to TS 23.401 V15.0.0 clause 5.10.3. If the UE has no other PDN connection, the MME initiated "explicit detach with reattach required" procedure according to TS 23.401 V15.0.0 clause 5.3.8.3.

Connection Resume Procedure

This procedure is used by the UE to resume the ECM-connection if the UE and the network support UP CIoT EPS optimization and the UE has stored the necessary information to conduct the connection resume procedure (see 3GPP TS 36.300) otherwise the service request procedures are used, see clause 5.3.4.

If the UE has a service gap timer running and the connection resume procedure is not a response to a MT paging, the UE shall not initiate this procedure (see clause 4.3.x below).

Figure 4:
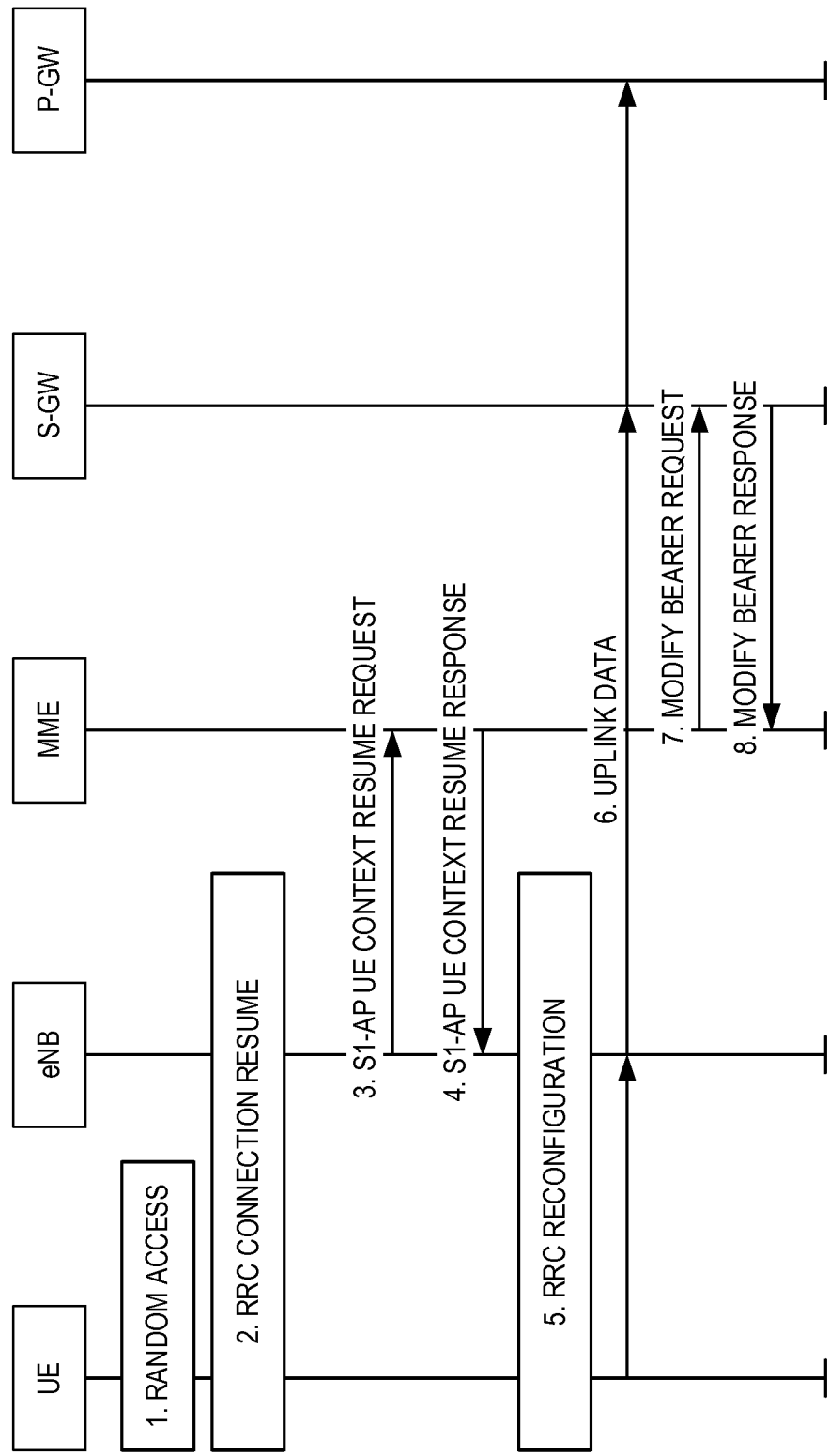
FIG. 4 illustrates a connection resume procedure in accordance with some embodiments of the present disclosure.

FIG. 4 illustrates the connection resume procedure. The steps of this procedure illustrated in FIG. 4 will now be described. All references are to 3GPP TS 23.401 V15.0.0.

Step 1: The UE triggers the random access procedure to the eNB, see 3GPP TS 36.300.

Step 2: The UE triggers the RRC connection resume procedure including information needed by the eNB to access the UE's stored AS context, see 3GPP TS 36.300. The E-UTRAN performs security checks. EPS bearer state synchronization is performed between the UE and the network, i.e. the UE shall locally remove any EPS bearer for which no radio bearer is setup and which is not a CP CIoT EPS bearer. If the radio bearer for a default EPS bearer is not established, the UE shall locally deactivate all EPS bearers associated to that default EPS bearer.

Step 3: The eNB notifies the MME that the UE's RRC connection is resumed in the S1-AP UE context resume request message which includes an RRC resume cause. If the eNB is not able to admit all suspended bearers, the eNB shall indicate this in the list of rejected EPS bearers, see TS 36.413. If there is a service gap timer running in the MME MM context for the UE and the MME is not waiting for a MT paging response from the UE and the connection resume request is not a potential TAU (derived based on the RRC establishment cause parameter equals mo-signaling), the MME rejects the context resume request with an appropriate cause and (e.g., optionally) with a back-off timer set to the remaining service gap time. The eNB shall release the RRC connection with an extended wait time equal to the back-off time.

The MME enters the ECM-CONNECTED state. The MME identifies that the UE returns at the eNB for which MME has stored data related to the S1AP association, UE context, and bearer context including the downlink TEID(s), necessary to resume the connection, see connection suspend procedure in TS 23.401 V15.0.0 clause 5.3.4A.

If a default EPS bearer is not accepted by the eNB, all the EPS bearers associated to that default bearer shall be treated as non-accepted bearers. The MME releases the non-accepted and non-established bearers by triggering the bearer release procedure as specified in TS 23.401 V15.0.0 clause 5.4.4.2.

To assist location services, the eNB indicates the UE's coverage level to the MME.

Step 3A: If the S1-U connection is resumed and the UE is accessing via the NB-IoT RAT with the RRC resume cause set to "MO exception data," the MME should notify the S-GW of each use of this establishment cause by the MO exception data counter. The MME maintains the MO exception data counter and sends it to the S-GW as indicated in 3GPP TS 29.274.

Step 3B: The S-GW should notify the P-GW if the RRC establishment cause "MO exception data" has been used by the MO exception data counter (see TS 29.274). The S-GW indicates each use of this RRC establishment cause by the related counter on its CDR.

Step 3C: The P-GW indicates each use of the RRC establishment cause "MO exception data" by the related counter on its CDR.

Step 4: MME acknowledges the connection resumption in S1-AP UE context resume response message. If the MME is not able to admit all suspended E-RABs the MME shall indicate this in the E-RABs failed to resume list IE.

Step 5: If the MME included in step 4 a list of E-RABs failed to resume, the eNB reconfigures the radio bearers.

Step 6: The uplink data from the UE can now be forwarded by eNB to the S-GW. The eNB sends the uplink data to the S-GW address and TEID stored during the connection suspend procedure, see TS 23.401 V15.0.0 clause 5.3.4A. The S-GW forwards the uplink data to the P-GW.

Step 7: The MME sends a modify bearer request message (eNB address, S1 TEID(s) (downlink) for the accepted EPS bearers, Delay downlink packet notification request, RAT type) per PDN connection to the S-GW. If the S-GW supports modify access bearers request procedure and if there is no need for the S-GW to send the signaling to the P-GW, the MME may send modify access bearers request (eNB address(es) and TEIDs for downlink UP for the accepted EPS bearers, delay downlink packet notification request) per UE to the S-GW to optimize the signaling. The S-GW is now able to transmit downlink data towards the UE.

The MME and the S-GW clears the downlink data buffer expiration time in their UE contexts if it was set, to remember that any downlink data buffered for a UE using power saving functions has been delivered and to avoid any unnecessary UP setup in conjunction with a later TAU.

Step 8: The S-GW shall return a modify bearer response (S-GW address and TEID for uplink traffic) to the MME as a response to a modify bearer request message, or a modify access bearers response (S-GW address and TEID for uplink traffic) as a response to a modify access bearers request message. If the S-GW cannot serve the MME request in the modify access bearers request message without S5/S8 signaling other than to unpause charging in the P-GW or without corresponding Gxc signaling when PMIP is used over the S5/S8 interface, it shall respond to the MME with indicating that the modifications are not limited to S1-U bearers, and the MME shall repeat its request using a modify bearer request message per PDN connection.

If SIPTO at the local network is active for a PDN connection with stand-alone GW deployment and the local home network ID for stand-alone accessed by the UE differs from the local home network ID where the UE initiated the SIPTO@LN PDN connection, the MME shall request disconnection of the SIPTO at the local network PDN connection(s) with the "reactivation requested" cause value according to TS 23.401 V15.0.0 clause 5.10.3. If the UE has no other PDN connection, the MME initiated "explicit detach with reattach required" procedure according to TS 23.401 V15.0.0 clause 5.3.8.3.

If SIPTO at the local network is active for a PDN connection with collocated L-GW deployment and the L-GW core network address of the cell accessed by the UE differs from the L-GW core network address of the cell where the UE initiated the SIPTO at the local network PDN connection, the MME shall request disconnection of the SIPTO at the local network PDN connection(s) with the "reactivation requested" cause value according to TS 23.401 V15.0.0 clause 5.10.3. If the UE has no other PDN connection, the MME initiated "explicit detach with reattach required" procedure according to clause 5.3.8.3.

Additional Examples how Requirements are Implemented in the Following Procedures:

S1-AP initial UE message with a NAS data PDU, see clause 5.3.4B.2;
MO NIDD procedure. see TS 23.682, clause 5.13.4;
Short message MO, see TS 23.040, clause 10.2.

The service gap is handled within the NAS layer/MM sublayer which is both the receiver and the user of the service gap timer information.

Possible to base the service gap control on the CONNECTED-TO-IDLE transitions which are existing mechanisms within the NAS layer/MM sublayer, but also use additional input available within the NAS layer/MM sublayer such as handling of paging at MT events, other NAS/MM signaling such as MM, etc.

Example System and Device Embodiments

Figure 5:
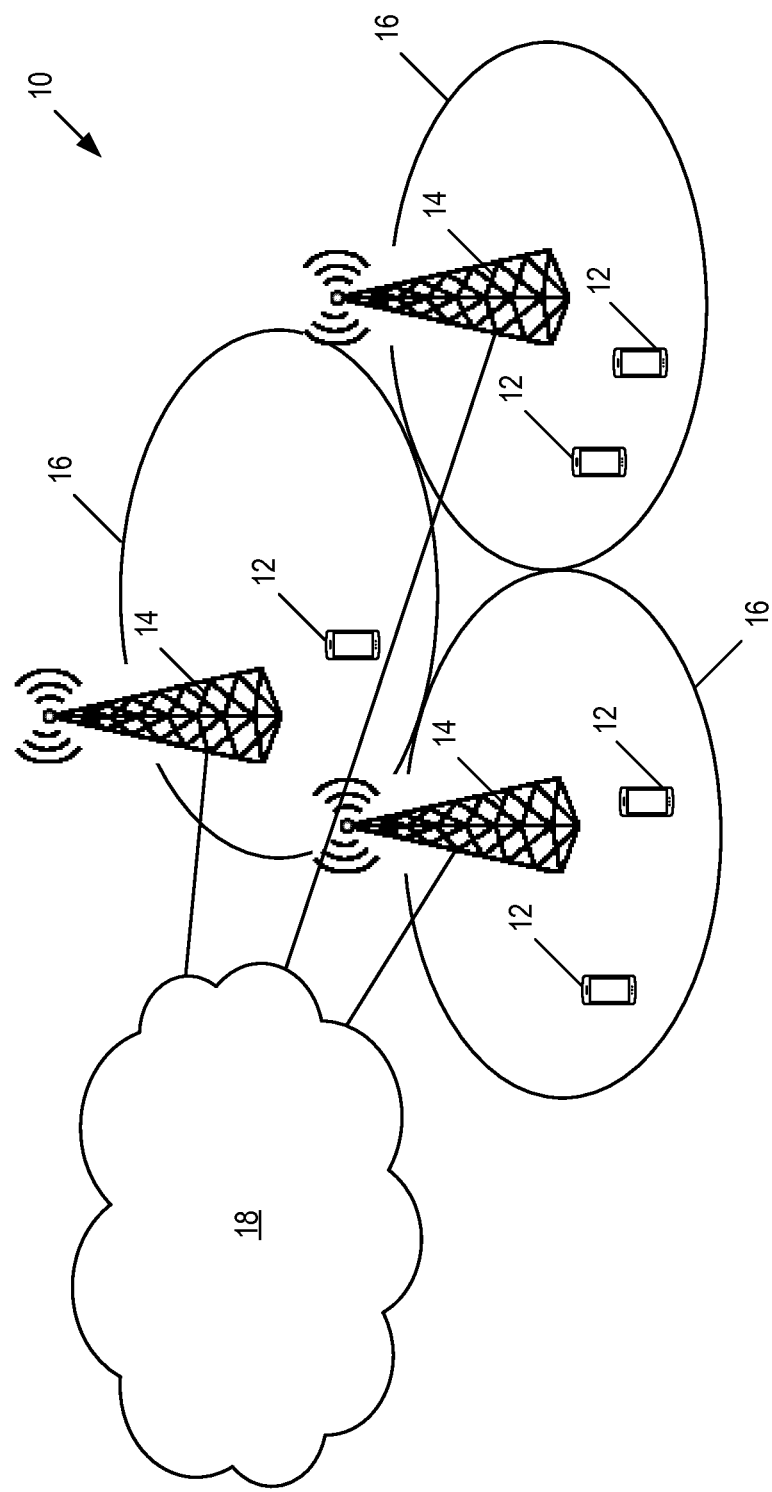
FIG. 5 illustrates one example of a wireless communication system in which embodiments of the present disclosure may be implemented.

FIG. 5 illustrates one example of a wireless communication system 10 in which embodiments of the present disclosure may be implemented. In this example, the wireless communication system 10 is a cellular communications network and, in particular, is a 3GPP LTE or NR cellular communications network that supports, e.g., CIoT devices.

As illustrated, the wireless communication system 10 includes a number of wireless devices 12 (i.e., wireless communication devices 12). In addition, the wireless communication system 10 includes a RAN that includes a number of radio access nodes 14 (e.g., eNBs or gNBs) serving corresponding coverage areas or cells 16. The radio access nodes 14 are connected to a core network 18, which includes a number of core network nodes (not shown) such as, e.g., MME(s), SGSN(s), S-GW(s), P-GW(s), PCRF(s), HSS(s), EIR(s), and/or the like.

In some embodiments, the wireless devices 12, the radio access nodes 14, and the core network nodes operate in accordance with any one or more of the embodiments described above to provide service gap control in the NAS layer/MM sublayer.

Figure 6:
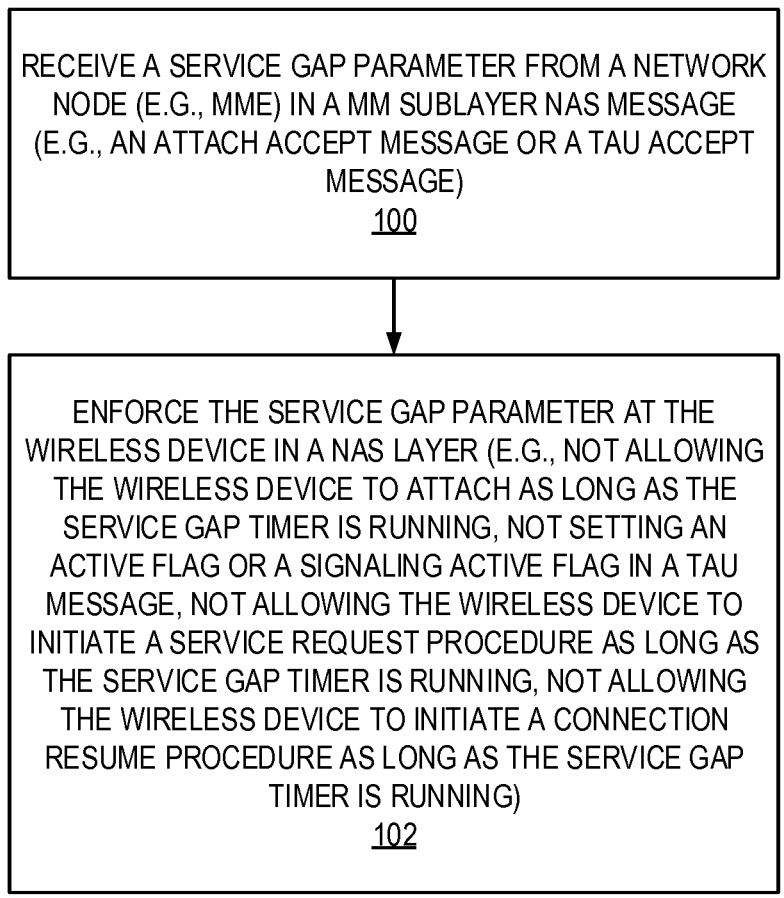
FIG. 6 is a flow chart that illustrates the operation of a wireless communication device in accordance with some embodiments of the present disclosure.

FIG. 6 is a flow chart that illustrates the operation of the wireless device 12 in accordance with at least some of the embodiments disclosed herein. As illustrated, the wireless device 12 receives a service gap parameter from a network node (e.g., a MME or similar) in a MM sublayer NAS message (e.g., an attach request message or a TAU accept message) (step 100). For example, see step 18 of FIG. 1C and step 20 of FIG. 2B). The wireless device 12 then enforces the service gap parameter at the wireless device 12 in the NAS layer (step 102).

For instance, as described above:
in a first embodiment the wireless device 12 may not allow the wireless device 12 to attach to any PLMN as long as the service gap timer is running,
in a second embodiment the wireless device 12 may, in addition or as an alternative to the first embodiment, not set the active flag or the signaling active flag in any TAU message as long as the service gap timer is running,
in a third embodiment the wireless device 12 may, in addition or as an alternative to the first and/or the second embodiment, not allow the wireless device 12 to initiate a service request procedure (e.g., send a service request) as long as the service gap timer is running (and, in some embodiments, the service request is not a response to a MT paging), and/or
the wireless device 12 may not allow the wireless device 12 to initiate a connection resume procedure (e.g., send a connection resume request) as long as the service gap timer is running (and, in some embodiments, the service request is not a response to a MT paging).

Figure 7:
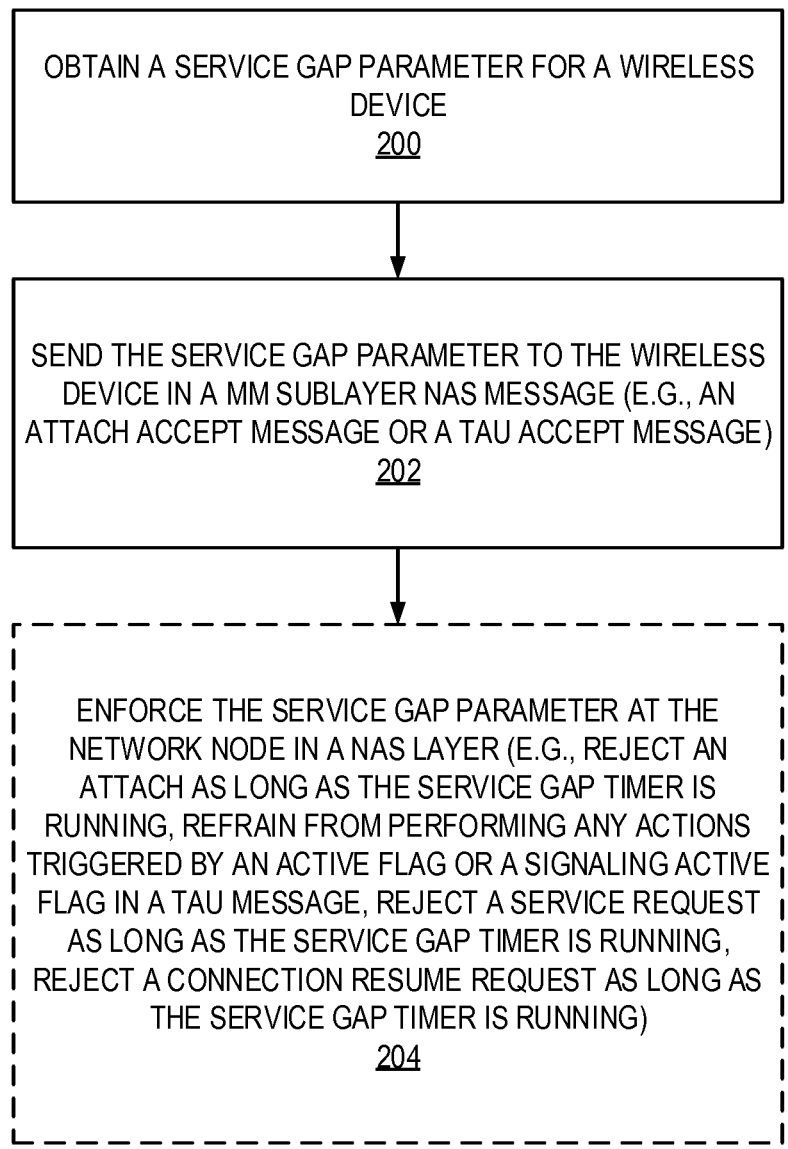
FIG. 7 is a flow chart that illustrates the operation of a network node in accordance with some embodiments of the present disclosure.

FIG. 7 is a flow chart that illustrates the operation of a network node in accordance with at least some of the embodiments disclosed herein. Optional steps are indicated by dashed lines. Here, it is assumed that the network node is the MME or similar, but is not limited thereto. As illustrated, the network node obtains a service gap parameter for a wireless device 12 (step 200). For example, the network node may obtain or receive the service gap parameter for the wireless device 12 from the HSS, e.g. as described above with reference to step 11 in FIG. 1B and/or step 17 in FIG. 2B. The network node sends the service gap parameter to the wireless device 12 in a MM sublayer NAS message (e.g., an attach accept message or a TAU accept message) e.g., as in step 18 in FIG. 1C and/or in step 20 in FIG. 2B (step 202). Optionally, the network node enforces the service gap parameter at the network node in the NAS layer (step 204). For instance, as described above, the network node may reject attach requests from the wireless device 12 as long as the service gap timer for the wireless device 12 is running, and/or refrain from performing any actions triggered by the active flag or the signaling active flag in a TAU message from the wireless device as long as the service gap timer for the wireless device 12 is running, and/or reject service requests from the wireless device 12 as long as the service gap timer for the wireless device 12 is running (and, in some embodiments, the service request is not a response to a MT paging), and/or reject connection resume requests from the wireless device 12 as long as the service gap timer for the wireless device 12 is running (and, in some embodiments, the service request is not a response to a MT paging).

Figure 8:
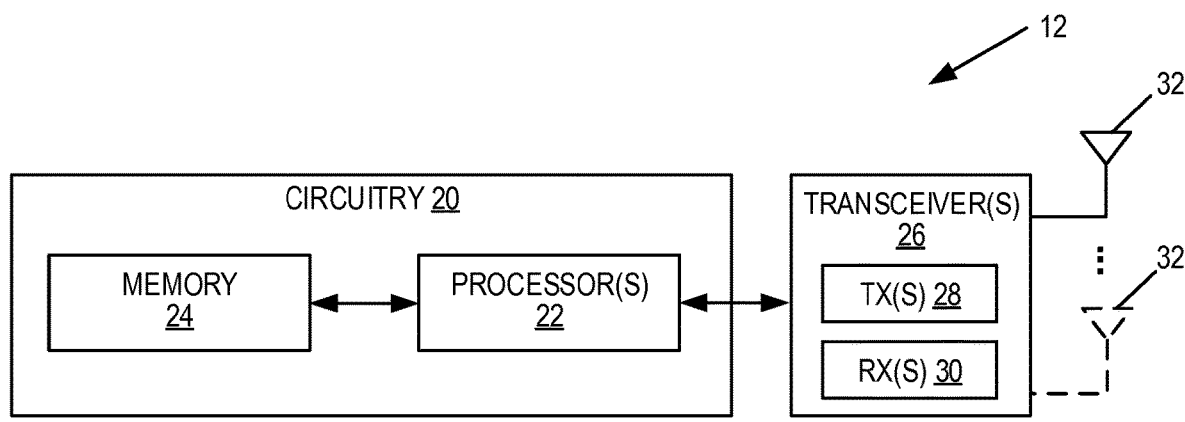
FIGS. 8 and 9 illustrate example embodiments of a wireless communication device.

FIG. 8 is a schematic block diagram of the wireless communication device 12, or UE, according to some embodiments of the present disclosure. As illustrated, the wireless communication device 12 includes circuitry 20 comprising one or more processors 22 (e.g., Central Processing Units (CPUs), Application Specific Integrated Circuits (ASICs), Field Programmable Gate Arrays (FPGAs), Digital Signal Processors (DSPs), and/or the like) and memory 24. The wireless communication device 12 also includes one or more transceivers 26 each including one or more transmitters 28 and one or more receivers 30 coupled to one or more antennas 32. In some embodiments, the functionality of the wireless communication device 12 described herein may be implemented in hardware (e.g., via hardware within the circuitry 20 and/or within the processor(s) 22) or be implemented in a combination of hardware and software (e.g., fully or partially implemented in software that is, e.g., stored in the memory 24 and executed by the processor(s) 22).

In some embodiments, a computer program including instructions which, when executed by the at least one processor 22, causes the at least one processor 22 to carry out at least some of the functionality of the wireless communication device 12 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as memory).

Figure 9:
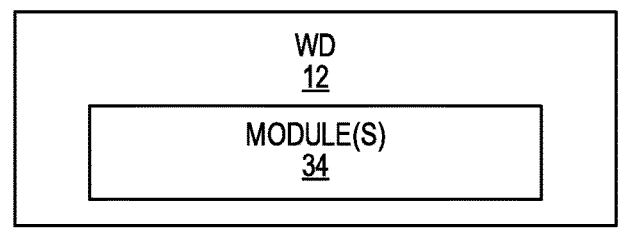

FIG. 9 is a schematic block diagram of the wireless communication device 12, or UE, according to some other embodiments of the present disclosure. The wireless communication device 12 includes one or more modules 34, each of which is implemented in software. The module(s) 34 provide the functionality of the wireless communication device 12 described herein (e.g., as described with respect to FIGS. 1A through 1D, FIGS. 2A and 2B, FIG. 3, FIG. 4, and/or FIG. 6).

Figure 10:
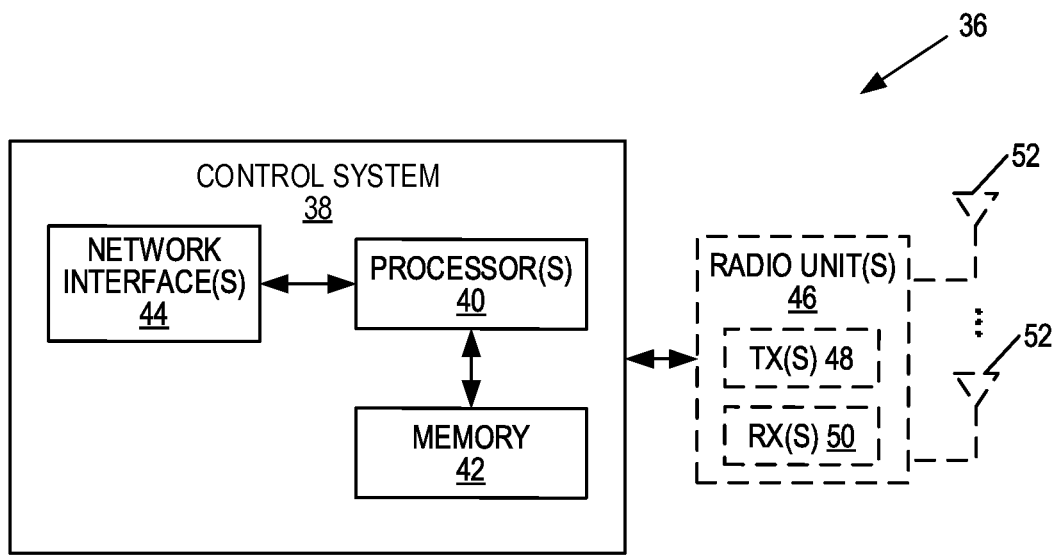
FIGS. 10 through 12 illustrate example embodiments of a network node.

FIG. 10 is a schematic block diagram of a network node 36 (e.g., a radio access node 14 such as, for example, an eNB or gNB or a core network node such as, for example, a MME) according to some embodiments of the present disclosure. As illustrated, the network node 36 includes a control system 38 that includes circuitry comprising one or more processors 40 (e.g., CPUs, ASICs, DSPs, FPGAs, and/or the like) and memory 42. The control system 38 also includes a network interface 44. In embodiments in which the network node 36 is a radio access node 14, the network node 36 also includes one or more radio units 46 that each include one or more transmitters 48 and one or more receivers 50 coupled to one or more antennas 52. In some embodiments, the functionality of the network node 36 (e.g., the functionality of the MME, S-GW, P-GW, SGSN, PCRF, or HSS) described above may be fully or partially implemented in software that is, e.g., stored in the memory 42 and executed by the processor(s) 40.

Figure 11:
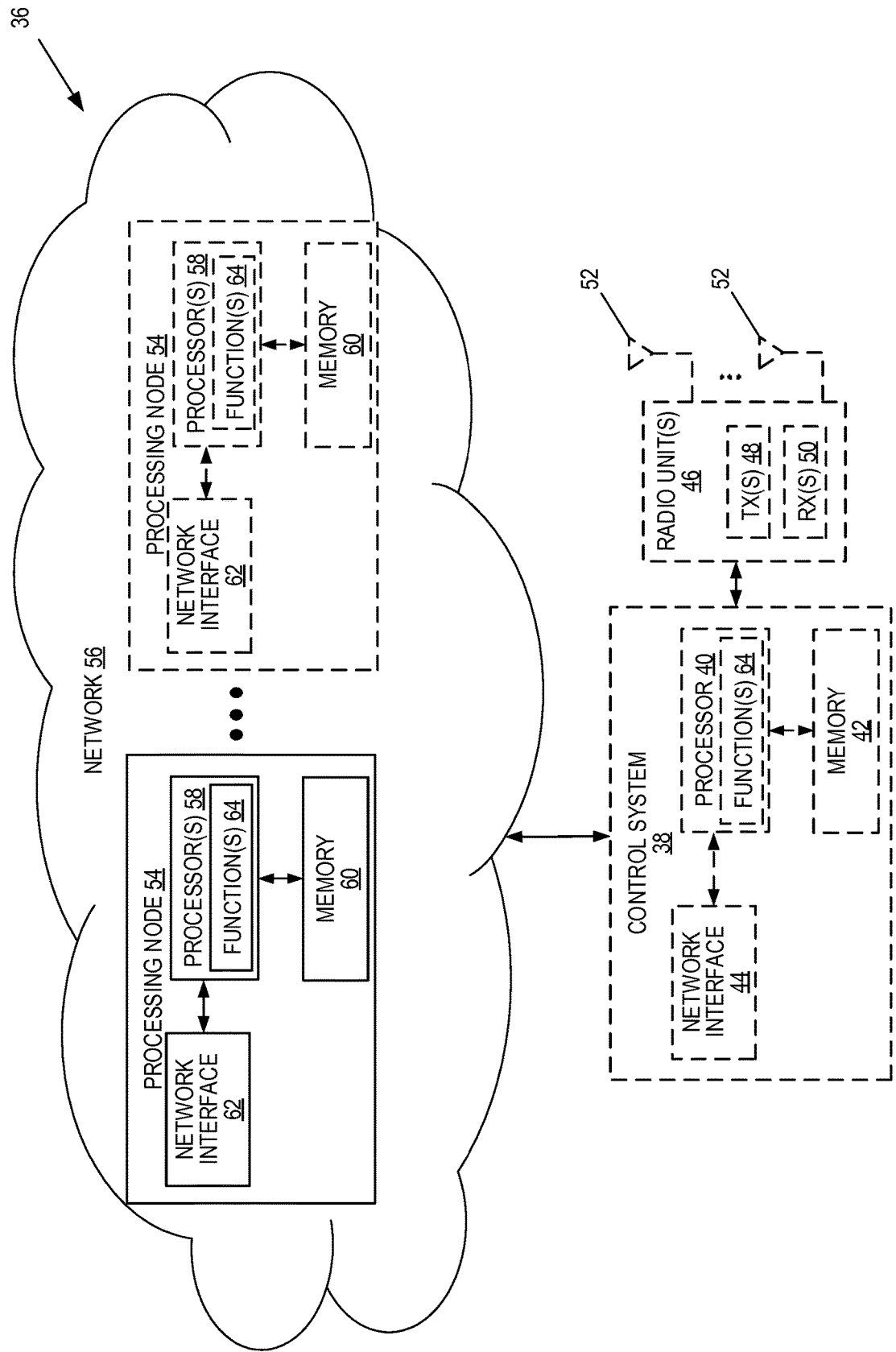

FIG. 11 is a schematic block diagram that illustrates a virtualized embodiment of the network node 36 (e.g., the radio access node 14 or a core network node) according to some embodiments of the present disclosure. As used herein, a "virtualized" network node 36 is a network node 36 in which at least a portion of the functionality of the network node 36 is implemented as a virtual component (e.g., via a virtual machine(s) executing on a physical processing node(s) in a network(s)). As illustrated, the network node 36 optionally includes the control system 38, as described with respect to FIG. 10. In addition, if the network node 36 is the radio access node 14, the network node 36 also includes the one or more radio units 46, as described with respect to FIG. 10. The control system 38 (if present) is connected to one or more processing nodes 54 coupled to or included as part of a network(s) 56 via the network interface 44. Alternatively, if the control system 38 is not present, the one or more radio units 46 (if present) are connected to the one or more processing nodes 54 via a network interface(s). Alternatively, all of the functionality of the network node 36 described herein may be implemented in the processing nodes 54. Each processing node 54 includes one or more processors 58 (e.g., CPUs, ASICs, DSPs, FPGAs, and/or the like), memory 60, and a network interface 62.

In this example, functions 64 of the network node 36 (e.g., the functions of the eNB, RNC, MME, S-GW, P-GW, HSS, or PCRF) described herein are implemented at the one or more processing nodes 54 or distributed across the control system 38 (if present) and the one or more processing nodes 54 in any desired manner. In some particular embodiments, some or all of the functions 64 of the network node 36 described herein are implemented as virtual components executed by one or more virtual machines implemented in a virtual environment(s) hosted by the processing node(s) 54. As will be appreciated by one of ordinary skill in the art, additional signaling or communication between the processing node(s) 54 and the control system 38 (if present) or alternatively the radio unit(s) 46 (if present) is used in order to carry out at least some of the desired functions. Notably, in some embodiments, the control system 38 may not be included, in which case the radio unit(s) 46 (if present) communicates directly with the processing node(s) 54 via an appropriate network interface(s).

In some particular embodiments, higher layer functionality (e.g., layer 3 and up and possibly some of layer 2 of the protocol stack) of the network node 36 may be implemented at the processing node(s) 54 as virtual components (i.e., implemented "in the cloud") whereas lower layer functionality (e.g., layer 1 and possibly some of layer 2 of the protocol stack) may be implemented in the radio unit(s) 46 and possibly the control system 38.

In some embodiments, a computer program including instructions which, when executed by the at least one processor 40, 58, causes the at least one processor 40, 58 to carry out the functionality of the network node 36 or a processing node 54 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as the memory 42, 60).

Figure 12:
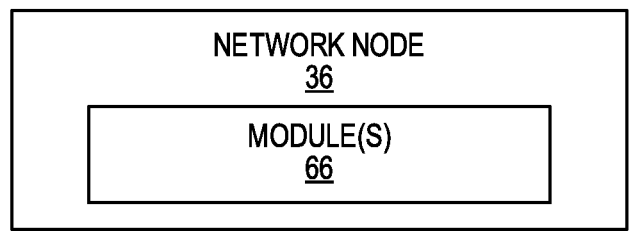

FIG. 12 is a schematic block diagram of the network node 36 according to some other embodiments of the present disclosure. The network node 36 includes one or more modules 66, each of which is implemented in software. The module(s) 66 provide the functionality of the network node 36 described herein (e.g., the functionality of a corresponding one of the network nodes described in relation to FIGS. 1A through 1D, FIGS. 2A and 2B, FIG. 3, FIG. 4, and/or FIG. 7).

4.3.x Service Gap Control

Service Gap control is an optional feature intended for CIoT devices when the frequency of data communication is to be controlled. That is, to control that a minimum time elapses after Mobile Originated user data has been communicated with a UE (i.e. MO user plane data, MO control plane data or MO SMS). The intention is to put a limit on how often network resources are used for a UE. This means the load from large number of CIoT devices can be evened out and that the contribution to the network peak load from such CIoT devices can be reduced. That is, network resources are used in a more optimal way. Service Gap would typically be used for "small data allowance plans" for CIoT subscriptions that are low revenue and where the applications are tolerant to potential service latency.

Service gap is a subscription parameter and enforced on a per UE level (i.e. common for all PDN connections) in the UE and in the MME. The MME passes the Service gap parameter to the UE in the Attach Accept message and/or Tracking Area Update Accept message for UE that has indicated in the UE Network Capabilities that it supports the Service gap feature. The Service gap control shall be applied for a UE when a Service gap parameter is stored in the UE context in the UE and the MM context in the MME.

Service gap applies to idle mode, i.e. it requires the UE to stay a minimum time in ECM-IDLE mode. The service gap timer shall be started each time a UE moves from ECM-CONNECTED to ECM-IDLE. Only exceptions are when the connection was initiated after a paging of an MT event, or after MO TAU signalling without any active flag set (i.e. active flag or signalling active flag), which shall not trigger a new or extended service gap interval.

Detach shall be allowed at any time. When Detach is done in ECM-CONNECTED, the service gap timer shall be started at the Detach. Exceptions are when the connection was initiated after a paging of an MT event, or after MO TAU signalling without any active flag set (i.e. active flag or signalling active flag), which shall not trigger a new or extended service gap interval. Detach at ECM-IDLE does not affect the Service gap timer.

The UE shall enforce the service gap by not allowing MO user plane data, MO control plane data and MO SMS connection requests and Attach Requests when a service gap timer is running. The application in the UE shall be informed by the NAS layer when data can be sent, i.e. notified when the the service gap timer is started and stopped. Details are left for implementation (see TS 24.301 [46]).

The MME should enforce the service gap by rejecting MO user plane data, MO control plane data and MO SMS connection requests and Attach Requests when a service gap timer is running. When rejecting MO data connection requests, the MME shall include a Mobility Management back-off timer corresponding to the time left of the current service gap.

When the MME starts the Service gap timer, the MME shall use a value that is a few seconds shorter than the Service gap parameter received from HSS in the subscription information (i.e. used by the UE). This ensures that the MME doesn't reject any UE requests just before the Service gap timer expires e.g. because of slightly unsynchronized UE and MME timers.

Additional Aspects of Service Gap:
  Service gap apply in roaming and non-roaming cases.
  Service gap applies to MO data (i.e. MO control plane data, MO user plane data and MO SMS).
  When the service gap timer is running and the UE receives paging, the UE should respond as normal.
  Service gap control apply to low priority (delayTolerant), normal traffic and exception reporting (for NB-IoT).
    NOTE: The Service gap should not be used for subscriptions with applications sensitive to service latency e.g. when exception reporting is used or UEs using emergency services.
  Service gap control should be effective for devices performing detach/reattach or full power cycling. That is, a running Service gap timer in the UE and the MME should survive the detach or power cycling.
  Tracking Area Update with active flag or signalling active flag is not allowed when a service gap timer is running.
  Attach during a surviving running service gap timer is not allowed. The Service gap at PLMN selection:
    a) Reattach to the same PLMN: The Service gap timer survives and controls the reattach.
    b) Attach or Tracking Area Update to a different PLMN with the same USIM: The Service gap timer survives and controls the Attach/Tracking Area Update to the new PLMN.
    c) USIM swap: The Service gap timer is stopped and the Service gap is reset.
  Multiple uplink packets and downlink packets are allowed during one RRC connection for UE operating within its APN Rate Control limits.

While not being limited thereto, some example embodiments described above may be summarized in the following manner:

1. A method of operation of a wireless device (12) to provide service gap control in a wireless communication system (10), comprising:
   receiving (100) at the wireless device (12) a service gap parameter from a network entity (e.g. Radio Access Network (RAN) node or function, or a core network node or function) in a mobility management sublayer non-access stratum message, the service gap parameter being indicative of a value for a service gap timer for the wireless device (12); and
   enforcing (102) the service gap parameter at the wireless device (12) in a non-access stratum layer.

2. The method of embodiment 1 wherein the mobility management sublayer non-access stratum message is an attach accept message.

3. The method of embodiment 1 wherein the mobility management sublayer non-access stratum message is a tracking area update accept message.

4. The method of any one of embodiments 1 to 3 wherein enforcing (102) the service gap parameter at the wireless device (12) comprises starting the service gap timer when the wireless device (12) transitions to idle mode.

5. The method of any one of embodiments 1 to 3 wherein enforcing (102) the service gap parameter at the wireless device (12) comprises starting the service gap timer each time the wireless device (12) transitions to idle mode other than for one or more exceptions.

6. The method of embodiment 5 wherein the one or more exceptions comprise an exception where the service gap timer is already running.

7. The method of any one of embodiments 1 to 6 wherein enforcing (102) the service gap parameter at the wireless device (12) comprises not allowing mobile originating user data, mobile originating control plane data, and/or mobile originating SMS connection requests and/or attach requests when the service gap timer is running.

8. The method of any one of embodiments 1 to 6 wherein enforcing (102) the service gap parameter at the wireless device (12) comprises not allowing the wireless device (12) to attach to a PLMN as long as the service gap timer is running.

9. The method of any one of embodiments 1 to 6 wherein enforcing (102) the service gap parameter at the wireless device (12) comprises transmitting a tracking area update message in which an active flag and a signaling active flag are not set if the service gap timer is running.
10. The method of any one of embodiments 1 to 6 wherein enforcing (102) the service gap parameter at the wireless device (12) comprises not allowing the wireless device (12) to initiate a service request procedure as long as the service gap timer is running.
11. The method of any one of embodiments 1 to 6 wherein enforcing (102) the service gap parameter at the wireless device (12) comprises not allowing the wireless device (12) to initiate a control plane service request procedure as long as the service gap timer is running.
12. The method of any one of embodiments 1 to 6 wherein enforcing (102) the service gap parameter at the wireless device (12) comprises not allowing the wireless device (12) to initiate a connection resume procedure as long as the service gap timer is running.
13. The method of any one of embodiments 1 to 12 wherein the wireless communication system (10) is a 3GPP LTE or 3GPP NR system.
14. A wireless device (12) that provides service gap control in a wireless communication system (10), the wireless device (12) adapted to perform the method of any one of embodiments 1 to 13.
15. A wireless device (12) that provides service gap control in a wireless communication system (10), comprising:
one or more transceivers (26); and
circuitry (20) connected to the one or more transceivers (26), the circuitry (20) operable to cause the wireless device (12) to perform the method of any one of embodiments 1 to 13.
16. A wireless device (12) that provides service gap control in a wireless communication system (10), comprising:
one or more modules (34) operable to perform the method of any one of embodiments 1 to 13.
17. A method of operation of a core network entity (e.g. a core network node or a core network function) in a core network of a wireless communication system (10) to provide service gap control, comprising:
obtaining (200) by the core network entity a service gap parameter for a wireless device (12), the service gap parameter being indicative of a value for a service gap timer for the wireless device (12); and
sending (202) by the core network entity the service gap parameter to the wireless device (12) via a mobility management sublayer non-access stratum message.
18. The method of embodiment 17 wherein the mobility management sublayer non-access stratum message is an attach accept message.
19. The method of embodiment 17 or 18 wherein the mobility management sublayer non-access stratum message is a tracking area update accept message.
20. The method of any one of embodiments 17 to 19 further comprising enforcing (204) the service gap parameter at the network node in a non-access stratum layer.
21. The method of embodiment 20 wherein enforcing (204) the service gap parameter at the network node comprises rejecting mobile originating user plane data, mobile originating control plane data, and/or mobile originating SMS connection requests and/or attach requests for the wireless device (12) when the service gap timer for the wireless device (12) is running.
22. The method of embodiment 20 wherein enforcing (204) the service gap parameter at the network node comprises:
receiving an attach request for the wireless device (12); and
rejecting the attach request if the service gap timer for the wireless device (12) is running.
23. The method of embodiment 22 wherein rejecting the attach request comprises sending an attach reject message to the wireless device (12), the attach reject message comprising an appropriate cause and/or a back-off timer set to a remaining value of the service gap timer for the wireless device (12).
24. The method of embodiment 20 wherein enforcing (204) the service gap parameter at the network node comprises:
receiving a tracking area update message from the wireless device (12); and
refraining from performing any actions triggered by an active flag or a signaling active flag comprised in the tracking area update message if the service gap timer for the wireless device (12) is running.
25. The method of embodiment 20 wherein enforcing (204) the service gap parameter at the network node comprises:
receiving a service request for the wireless device (12); and
rejecting the service request if the service gap timer for the wireless device (12) is running.
26. The method of embodiment 20 wherein enforcing (204) the service gap parameter at the network node comprises:
receiving a control plane service request for the wireless device (12); and
rejecting the service request if the service gap timer for the wireless device (12) is running.
27. The method of embodiment 20 wherein enforcing (204) the service gap parameter at the network node comprises:
receiving a service request or control plane service request for the wireless device (12); and
rejecting the service request or control plane service request if the service gap timer for the wireless device (12) is running and if the service request or control plane service request is not a response to a preceding mobile terminated paging.
28. The method of any one of embodiments 25 to 27 wherein rejecting the service request comprises rejecting the service request or control plane service request with an appropriate cause and/or with a back-off timer set to a remaining value of the service gap timer for the wireless device (12).
29. The method of embodiment 20 wherein enforcing (204) the service gap parameter at the network node comprises:
receiving a connection resume request for the wireless device (12); and
rejecting the connection resume request if the service gap timer for the wireless device (12) is running.
30. The method of embodiment 20 wherein enforcing (204) the service gap parameter at the network node comprises:
receiving a connection resume request for the wireless device (12); and
rejecting the connection resume request if the service gap timer for the wireless device (12) is running and if the connection resume request is not a response to a preceding mobile terminated paging.
31. The method of embodiment 29 or 30 wherein rejecting the connection resume request comprises rejecting the connection resume request with an appropriate cause and/or with a back-off timer set to a remaining value of the service gap timer for the wireless device (12).

32. The method of any one of embodiments 17 to 31 wherein obtaining (200) the service gap parameter for the wireless device (12) comprises:
sending an update location request to a HSS; and
receiving subscription data from the HSS in an update location acknowledgment, the subscription data comprising the service gap parameter for the wireless device (12).

33. The method of any one of embodiments 17 to 32 wherein the network node is a MME or AMF.

34. The method of any one of embodiments 17 to 33 wherein the wireless communication system (10) is a 3GPP LTE or NR system.

35. A core network node or core network function in a core network of a wireless communication system (10) to provide service gap control, the core network node or core network function adapted to perform the method of any one of embodiments 17 to 34.

36. A core network node or core network function for a core network of a wireless communication system (10) to provide service gap control, comprising:
a network interface (44, 62);
one or more processors (40, 58); and
memory (42, 60) comprising instructions executable by the one or more processors (40, 58) whereby the network node or network function is operable to perform the method of any one of embodiments 17 to 34.

37. A core network node or core network function for a core network of a wireless communication system (10) to provide service gap control, comprising:
one or more modules (66) operable to perform the method of any one of embodiments 17 to 34.

The following acronyms are used throughout this disclosure.

3GPP Third Generation Partnership Project
5G Fifth Generation
ACK Acknowledgement
AMBR Aggregate Maximum Bit Rate
AMF Access and Mobility Management Function
APN Access Point Name
ARP Allocation and Retention Priority
AS Access Stratum
ASIC Application Specific Integrated Circuit
BCM Bearer Control Mode
BSS Base Station System
CDR Charging Data Record
CHAP Challenge Handshake Authentication Protocol
CIoT Cellular Internet of Things
CP Control Plane
CPU Central Processing Unit
CSG Closed Subscriber Group
CS Circuit Switched
CSS Closed Subscriber Group Subscriber Server
DDN Downlink Data Notification
DHCPv4 Dynamic Host Configuration Protocol Version 4
DM Device Management
DoNAS Data Over Non Access Stratum
DRX Discontinuous Reception
DSP Digital Signal Processor
ECGI Evolved Universal Terrestrial Radio Access Network Cell Global Identifier
EIR Equipment Identity Register
eKSI Evolved Key Set Identifier
EMM Evolved Packet System Mobility Management
eNB Enhanced or Evolved Node B
EPC Evolved Packet Core
ePLMN Equivalent Public Land Mobile Network
EPS Evolved Packet System
E-RAB Evolved Universal Terrestrial Radio Access Network Radio Access Bearer
ESM Evolved Packet System Session Management
ETFTN Extended Traffic Flow Template Support Network
ETFTU Extended Traffic Flow Template Support User Equipment
E-UTRAN Evolved Universal Terrestrial Radio Access Network
FPGA Field Programmable Gate Array
GERAN Global System for Mobile Communications Enhanced Data Rates for Global System for Mobile Communications Evolution Radio Access Network
gNB New Radio Base Station
GRE Generic Routing Encapsulation
GTP General Packet Radio Service Tunneling Protocol
GUMMEI Globally Unique Mobility Management Entity Identifier
GUTI Global Unique Temporary Identifier
GWCN Gateway Core Network
HA Home Agent
HeNB Home Enhanced or Evolved Node B
HLR Home Location Register
HPLMN Home Public Land Mobile Network
HSS Home Subscriber Service
ID Identifier
IE Information Element
IETF Internet Engineering Task Force
IMEI International Mobile Equipment Identity
IMEISV International Mobile Equipment Identity Software Version
IMS Internet Protocol Multimedia Subsystem
IMSI International Mobile Subscriber Identity
IoT Internet of Things
IP Internet Protocol
IP-CAN Internet Protocol Connectivity Access Network
ISR Idle State Signaling Reduction
KSI Key Set Identifier
LBI Linked Bearer Identifier
LCS Location Service
L-GW Local Gateway
LIPA Local Internet Protocol Access
LR Location Request
LTE Long Term Evolution
M2M Machine-to-Machine
MAC Medium Access Control
ME Mobile Equipment
MM Mobility Management
MME Mobility Management Entity
MO Mobile Originated
MS Mobile Station
MSISDN Mobile Subscriber Integrated Services Digital Network
MT Mobile Terminated
MTC Machine Type Communication
NAS Non Access Stratum
NB-IoT Narrowband Internet of Things
NIDD Non-Internet Protocol Data Delivery
NR New Radio
NRSU Network Request Support User Equipment
OCS Online Charging System
OMA Open Mobile Alliance
OMC Operations and Maintenance Centre
OTA Over The Air
PAP Password Authentication Protocol
PCC Policy and Charging Control
PCEF Policy and Charging Enforcement Function PCO Protocol Configuration Option
PCRF Policy and Charging Rules Function
PDN Packet Data Network
PDP Packet Data Protocol
PDU Protocol Data Unit
P-GW Packet Data Network Gateway
PLMN Public Land Mobile Network
PMIP Proxy Mobile Internet Protocol Version 6
PRA Presence Reporting Area
PS Packet Switched
P-TMSI Packet Temporary Mobile Subscriber Identity
QCI Quality of Service Class Identifier
QoS Quality of Service
RAI Routing Area Identification
RAN Radio Access Network
RAT Radio Access Technology
RAU Routing Area Update
ROHC Robust Header Compression
RRC Radio Resource Control
SCEF Service Capability Exposure Function
SGSN Serving General Packet Radio Service Support Node
S-GW Serving Gateway
SIPTO Selected Internet Protocol Traffic Offload
SM Session Management
SMS Short Message Service
SRVCC Single Radio Voice Call Continuity
TA Tracking Area
TAI Tracking Area Identity
TAU Tracking Area Update
TEID Tunnel Endpoint Identifier
TFT Traffic Flow Template
TI Transaction Identifier
TIN Temporary Identity
TS Technical Specification
UE User Equipment
UICC Universal Integrated Circuit Card
ULR Update-Location-Request
UMTS Universal Mobile Telecommunications System
UP User Plane
USIM Universal Subscriber Identity Module
UTRAN Universal Terrestrial Radio Access Network
VPLMN Visited Public Land Mobile Network
WB-E-UTRAN Wideband Evolved Universal Terrestrial Radio Access Network
WLAN Wireless Local Area Network Those skilled in the art will recognize improvements and modifications to the embodiments of the present disclosure. All such improvements and modifications are considered within the scope of the concepts disclosed herein.

The invention claimed is:

1. A method of operation of a User Equipment (UE) to provide service gap control in a wireless communication system, comprising:
receiving at the UE a subscription data containing a service gap parameter from a network entity in an attach accept message during an initial attach procedure, the service gap parameter being indicative of a value for a service gap timer for the UE; and
enforcing the received service gap parameter at the UE on a per UE level in a non-access stratum layer by starting the service gap timer when the UE transitions from connected mode to idle mode;
wherein enforcing the service gap parameter at the UE comprises starting the service gap timer each time the UE transitions to idle mode other than for one or more exceptions comprising an exception where the service gap timer is already running.

2. The method according to claim 1 wherein enforcing the service gap parameter at the UE comprises not allowing mobile originating user data, mobile originating control plane data, and/or mobile originating SMS connection requests and/or attach requests when the service gap timer is running.

3. The method according to claim 1 wherein enforcing the service gap parameter at the UE comprises not allowing the UE to attach to a PLMN as long as the service gap timer is running.

4. The method according to claim 1 wherein enforcing the service gap parameter at the UE comprises transmitting a tracking area update message in which an active flag and a signaling active flag are not set if the service gap timer is running.

5. The method according to claim 1 wherein enforcing the service gap parameter at the UE comprises not allowing the UE to initiate a service request procedure as long as the service gap timer is running.

6. The method according to claim 1 wherein enforcing the service gap parameter at the UE comprises not allowing the UE to initiate a control plane service request procedure as long as the service gap timer is running.

7. The method according to claim 1 wherein enforcing the service gap parameter at the UE comprises not allowing the UE to initiate a connection resume procedure as long as the service gap timer is running.

8. The method according to claim 1 wherein the wireless communication system is a 3GPP LTE or 3GPP NR system.

9. A User Equipment (UE) that provides service gap control in a wireless communication system, comprising:
one or more transceivers; and
circuitry connected to the one or more transceivers, the circuitry operable to cause the UE to:
receive, at the UE, a subscription data containing a service gap parameter from a network entity in an attach accept message during an initial attach procedure, the service gap parameter being indicative of a value for a service gap timer for the UE; and
enforce the received service gap parameter at the UE on a per UE level in a non-access stratum layer by starting the service gap timer when the UE transitions from connected mode to idle mode;
wherein enforcing the service gap parameter at the UE comprises the circuitry operable to cause the UE to start the service gap timer each time the UE transitions to idle mode other than for one or more exceptions comprising an exception where the service gap timer is already running.

10. A method of operation of a core network entity in a core network of a wireless communication system to provide service gap control, comprising:
obtaining by the core network entity a service gap parameter for a User Equipment (UE), the service gap parameter being indicative of a value for a service gap timer for the UE; and
sending by the core network entity a subscription data containing the service gap parameter to the UE via an attach accept message during an initial attach procedure;
wherein the service gap parameter is enforced at the UE by starting the service gap timer each time the UE transitions to idle mode other than for one or more exceptions comprising an exception where the service gap timer is already running.

11. The method according to claim 10 further comprising enforcing the service gap parameter at the network entity in a non-access stratum layer.

12. The method according to claim 11 wherein enforcing the service gap parameter at the network entity comprises rejecting mobile originating user plane data, mobile originating control plane data, and/or mobile originating SMS connection requests and/or attach requests for the UE when the service gap timer for the UE is running.

13. The method according to claim 11 wherein enforcing the service gap parameter at the network entity comprises:
receiving an attach request for the UE; and
rejecting the attach request if the service gap timer for the UE is running.

14. The method according to claim 13 wherein rejecting the attach request comprises sending an attach reject message to the UE, the attach reject message comprising an appropriate cause and/or a back-off timer set to a remaining value of the service gap timer for the UE.

15. The method according to claim 11 wherein enforcing the service gap parameter at the network entity comprises:
receiving a tracking area update message from the UE; and
refraining from performing any actions triggered by an active flag or a signaling active flag comprised in the tracking area update message if the service gap timer for the UE is running.

16. The method according to claim 11 wherein enforcing the service gap parameter at the network entity comprises:
receiving a service request for the UE; and
rejecting the service request if the service gap timer for the UE is running.

17. The method according to claim 16 wherein rejecting the service request comprises rejecting the service request or control plane service request with an appropriate cause and/or with a back-off timer set to a remaining value of the service gap timer for the UE.

18. The method according to claim 11 wherein enforcing the service gap parameter at the network entity comprises:
receiving a control plane service request for the UE; and
rejecting the service request if the service gap timer for the UE is running.

19. The method according to claim 11 wherein enforcing the service gap parameter at the network entity comprises:
receiving a service request or control plane service request for the UE; and
rejecting the service request or control plane service request if the service gap timer for the UE is running and if the service request or control plane service request is not a response to a preceding mobile terminated paging.

20. The method according to claim 11 wherein enforcing the service gap parameter at the network entity comprises:
receiving a connection resume request for the UE; and
rejecting the connection resume request if the service gap timer for the UE is running.

21. The method according to claim 20 wherein rejecting the connection resume request comprises rejecting the connection resume request with an appropriate cause and/or with a back-off timer set to a remaining value of the service gap timer for the UE.

22. The method according to claim 11 wherein enforcing the service gap parameter at the network entity comprises:
receiving a connection resume request for the UE; and
rejecting the connection resume request if the service gap timer for the UE is running and if the connection resume request is not a response to a preceding mobile terminated paging.

23. The method according to claim 10 wherein obtaining the service gap parameter for the UE comprises:
sending an update location request to a HSS; and
receiving subscription data from the HSS in an update location acknowledgment, the subscription data comprising the service gap parameter for the UE.

24. The method according to claim 10 wherein the network entity is a MME or AMF.

25. The method according to claim 10 wherein the wireless communication system is a 3GPP LTE or NR system.

26. A core network entity or core network function for a core network of a wireless communication system to provide service gap control, comprising:
a network interface;
one or more processors; and
memory comprising instructions executable by the one or more processors whereby the network entity or network function is operable to:
obtain, by the core network entity, a service gap parameter for a User Equipment (UE), the service gap parameter being indicative of a value for a service gap timer for the UE; and
send, by the core network entity, a subscription data containing the service gap parameter to the UE via an attach accept message during an initial attach procedure;
wherein the service gap parameter is enforced at the UE by starting the service gap timer each time the UE transitions to idle mode other than for one or more exceptions comprising an exception where the service gap timer is already running.

* * * * *

UNITED STATES PATENT AND TRADEMARK OFFICE
CERTIFICATE OF CORRECTION

PATENT NO. : 11,405,854 B2
APPLICATION NO. : 16/633268
DATED : August 2, 2022
INVENTOR(S) : Rönneke et al.

It is certified that error appears in the above-identified patent and that said Letters Patent is hereby corrected as shown below:

On the Title Page

On Page 2, in Item (56), under "OTHER PUBLICATIONS", in Column 2, Line 36, delete "U Known," and insert -- Unknown, --, therefor.

On Page 2, in Item (56), under "OTHER PUBLICATIONS", in Column 2, Line 50, delete "(GPRS/Tunnelling Protocol tor" and insert -- (GPRS) Tunnelling Protocol for --, therefor.

In the Specification

In Column 4, Line 17, delete "used herein may" and insert -- used herein, a "network entity" may --, therefor.

In Column 9, Line 43, delete ""non-1P"" and insert -- "non-IP" --, therefor.

In Column 21, Line 23, delete "capability it does" and insert -- capability does --, therefor.

In Column 26, Line 14, delete "type ""non-IP," the" and insert -- type "non-IP," the --, therefor.

Signed and Sealed this
Fourth Day of April, 2023

Katherine Kelly Vidal
*Director of the United States Patent and Trademark Office*